United States Patent [19]

Andersen et al.

[11] 4,409,656
[45] Oct. 11, 1983

[54] SERIAL DATA BUS COMMUNICATION SYSTEM

[75] Inventors: Steven C. Andersen, Prior Lake; Thomas P. Penkauskas, Eagan; James W. Kassel, St. Paul; Stephen O. Newcomer, Apple Valley, all of Minn.

[73] Assignee: Her Majesty the Queen, in right of Canada as represented by the Minister of National Defense, Ottawa, Canada

[21] Appl. No.: 333,068

[22] Filed: Dec. 21, 1981

Related U.S. Application Data

[63] Continuation of Ser. No. 130,125, Mar. 13, 1980, abandoned.

[51] Int. Cl.[3] .................. G06F 3/04; G06F 5/04; G06F 9/22; G06F 11/20
[52] U.S. Cl. .................................................. 364/200
[58] Field of Search ............................. 364/200, 900

[56] References Cited

U.S. PATENT DOCUMENTS

| | | | |
|---|---|---|---|
| 3,771,134 | 11/1973 | Huettner et al. | 364/200 |
| 4,086,627 | 4/1978 | Bennett et al. | 364/200 |
| 4,106,091 | 8/1978 | Hepworth et al. | 364/200 |
| 4,208,714 | 7/1980 | Eklund et al. | 364/200 |
| 4,237,534 | 12/1980 | Felix | 364/200 |
| 4,257,100 | 3/1981 | Syrbe et al. | 364/200 |
| 4,262,357 | 4/1981 | Shima | 364/200 |

Primary Examiner—Harvey E. Springborn
Attorney, Agent, or Firm—Orrin M. Haugen; Thomas J. Nikolai

[57] ABSTRACT

A node device for use in a digital data processing and communications system of the type utilizing a bus organization for facilitating the interconnection of a large plurality of digital data processing devices (user devices) in which redundant cables are employed. The node devices are interposed between the user devices and the redundant cables to permit automatic reconfiguration of the interconnection of the user devices in the event of malfunctioning or severing of one or more of the cable sets within a minimum period of time. The node devices provide the user devices with the structure needed to detect and diagnose system problems and to effect recovery procedures. In accordance with the invention, one of the plurality of nodes functions as the Bus Controller and by sampling the remaining nodes in the system, it determines the priority with which user devices may transmit or receive data over the bus. Each of the nodes employed is substantially identical and any one may be selected to function as the Bus Controller. Each includes a Microprogrammed Controller and necessary firmware to permit the controller to function in conjunction with special purpose hardware including a Programmable Logic Array (PLA) configured to perform a pre-processing function on control line inputs so that poll/response traffic on the active cables can continue with a minimum of delay.

25 Claims, 71 Drawing Figures

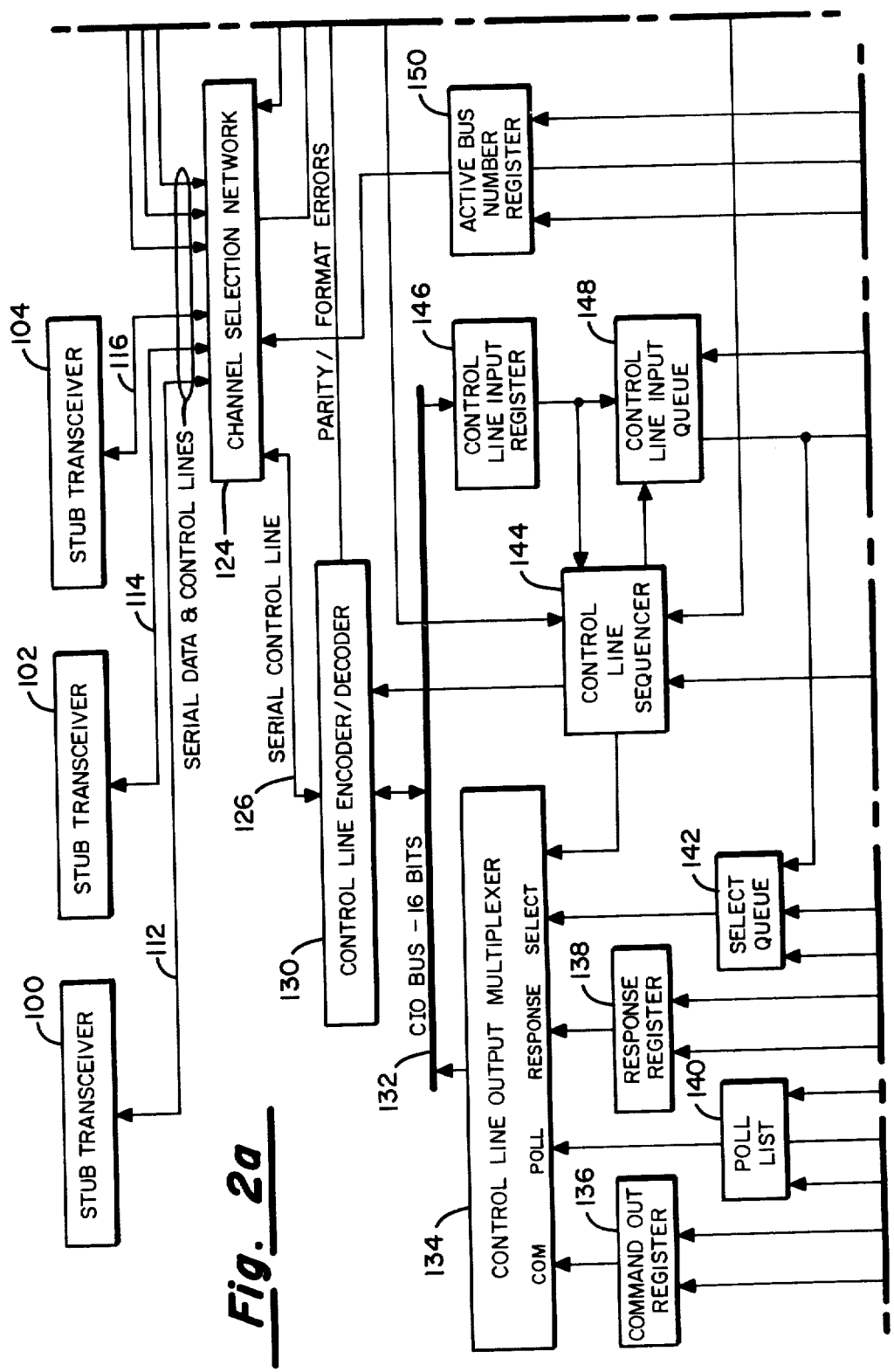

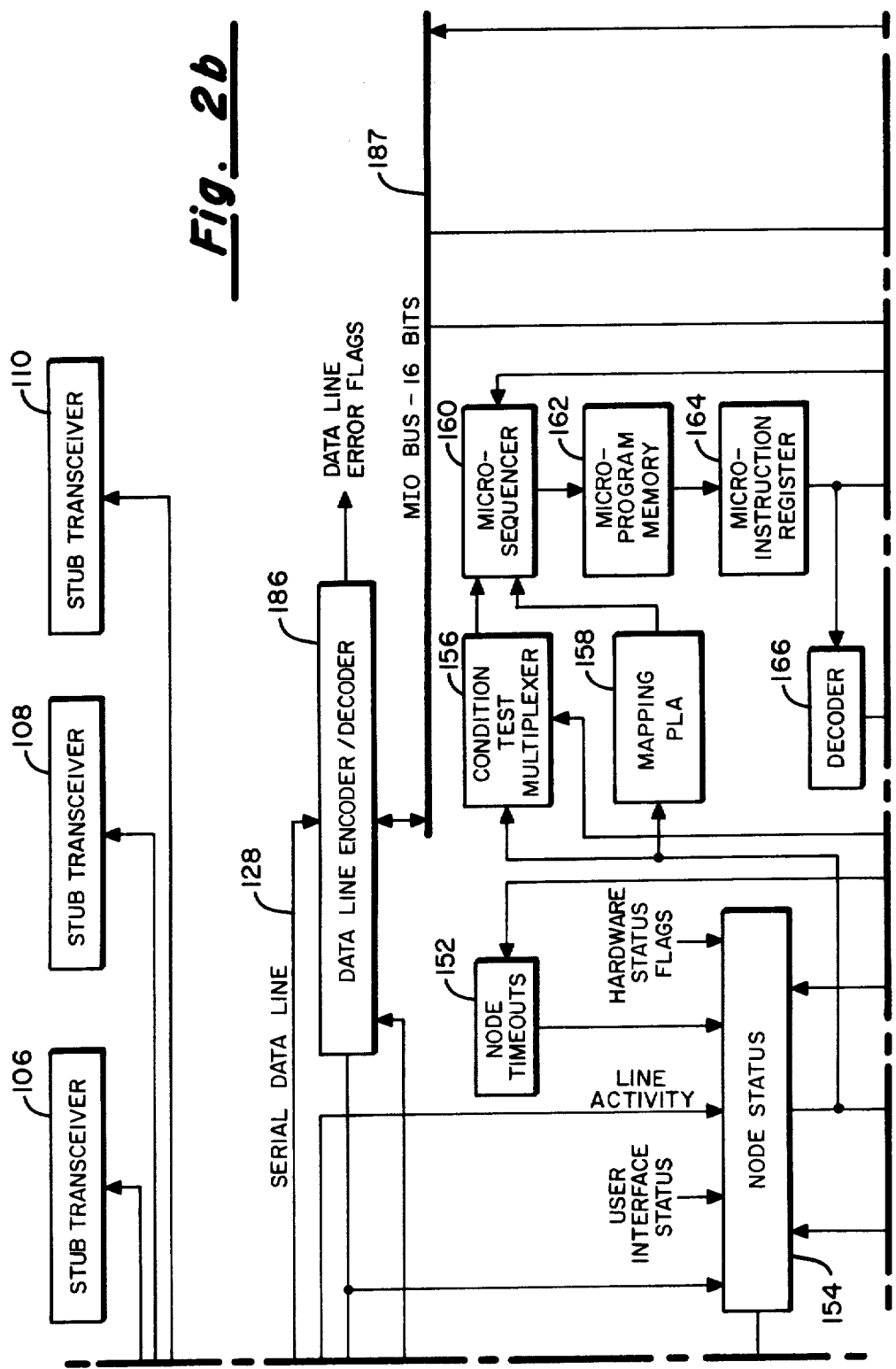

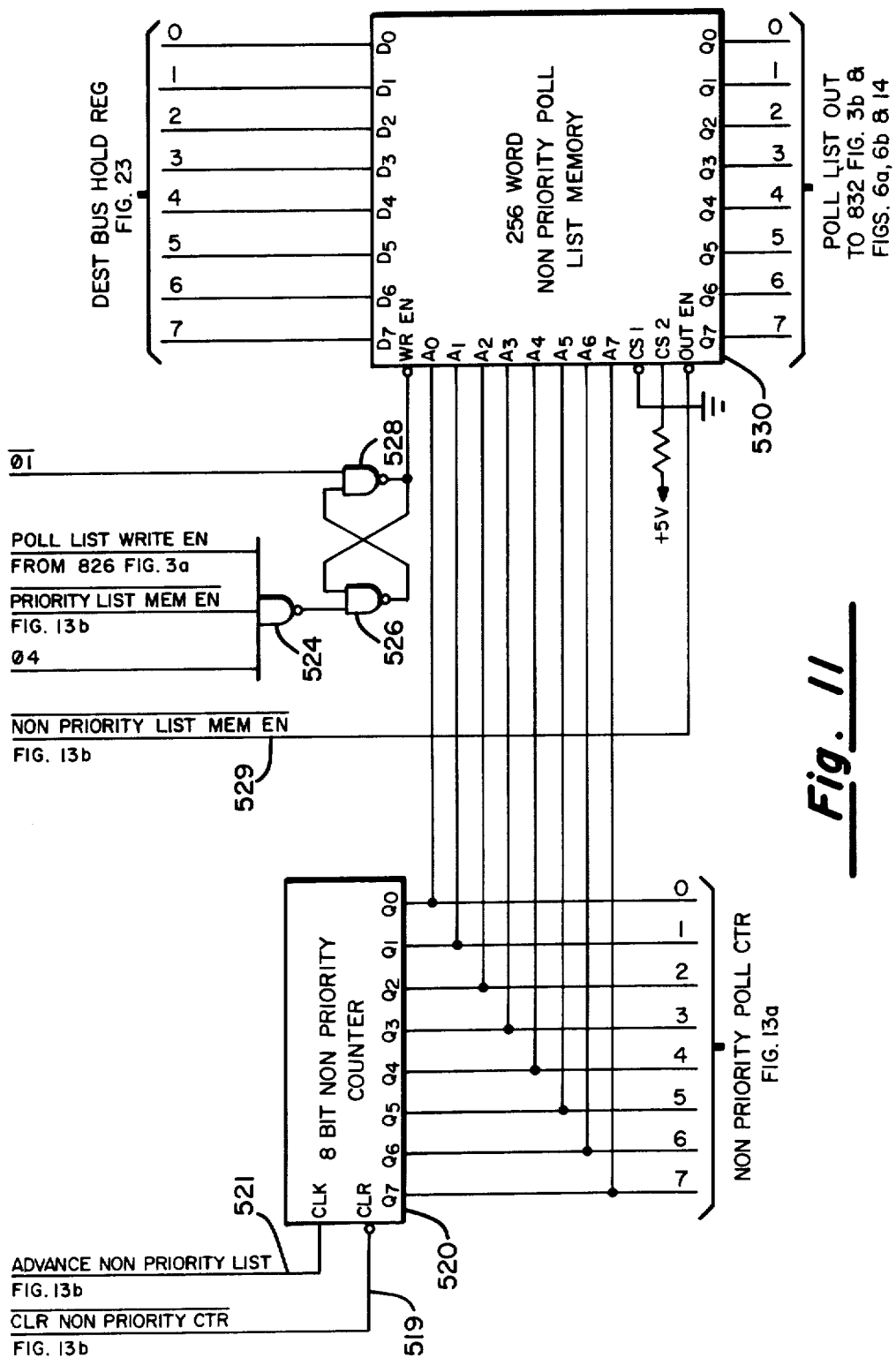

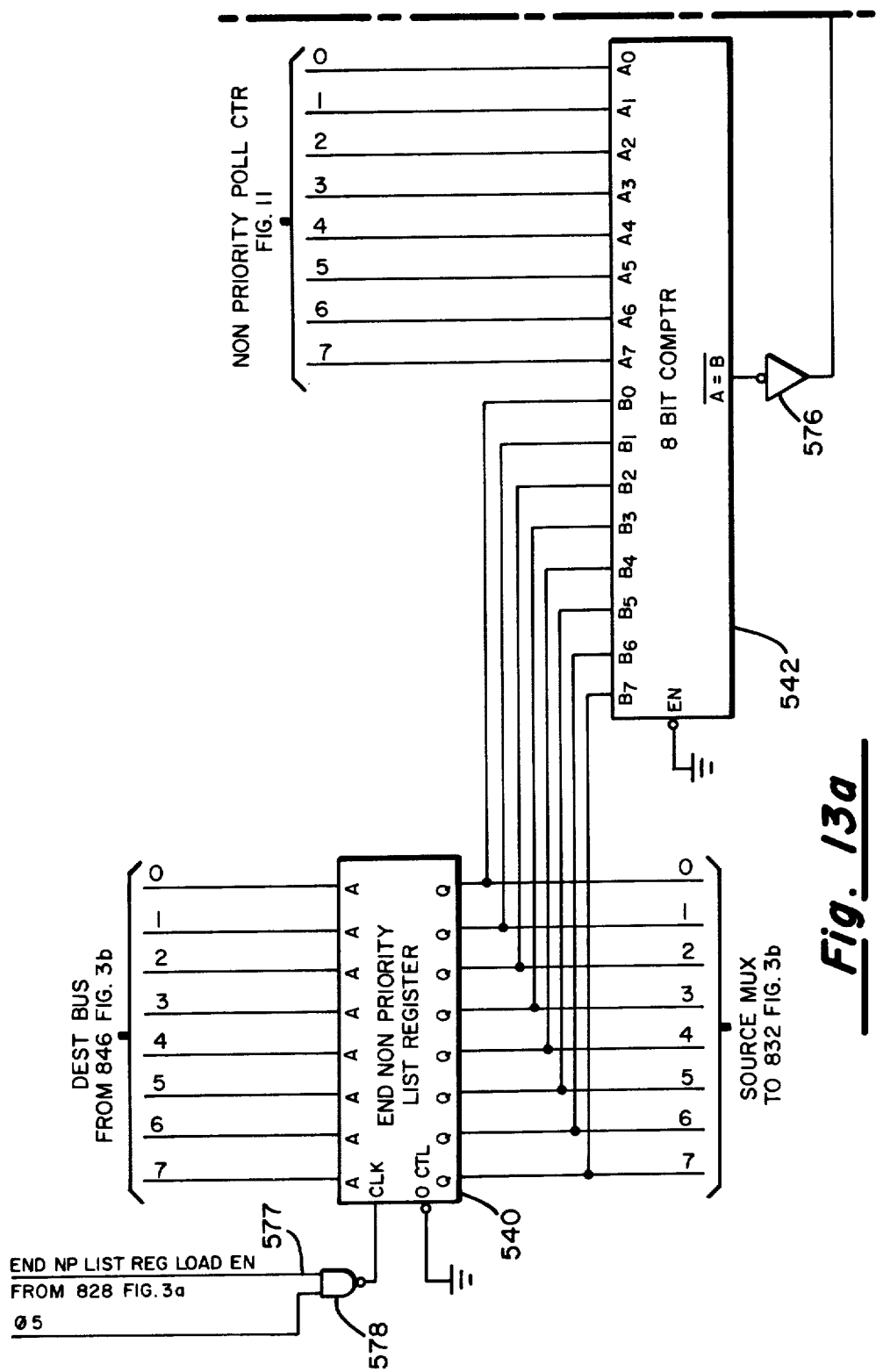

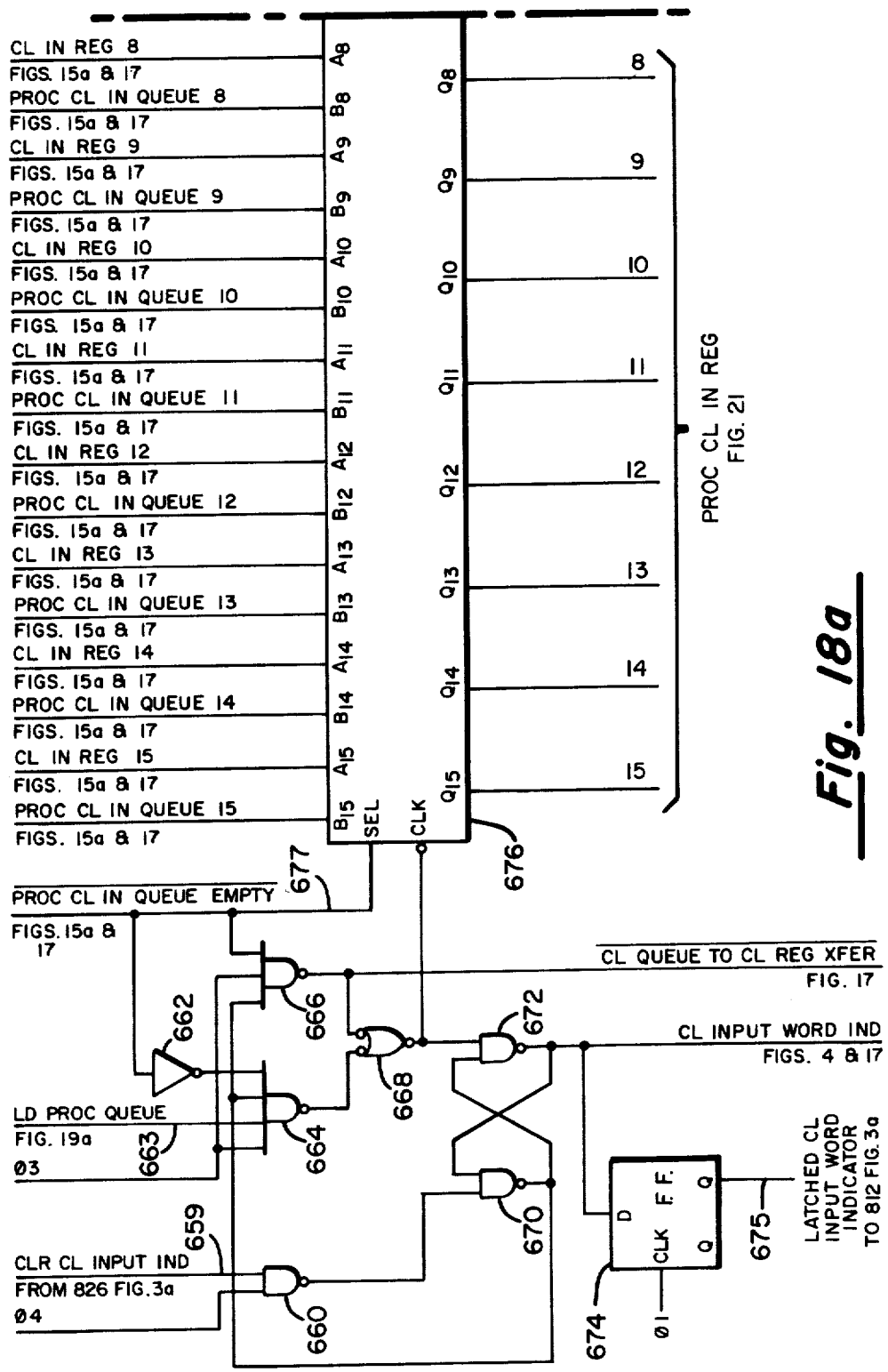

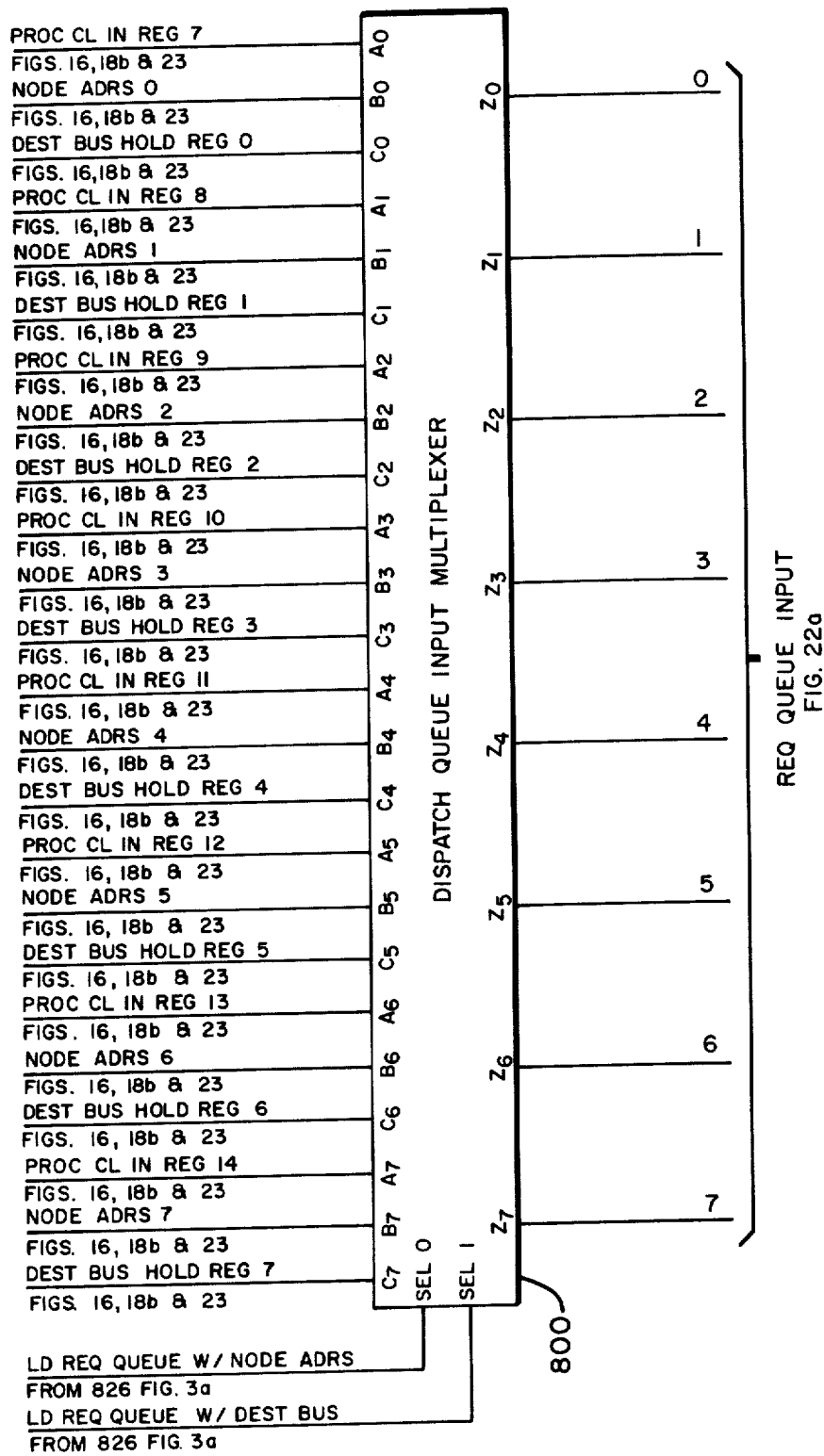

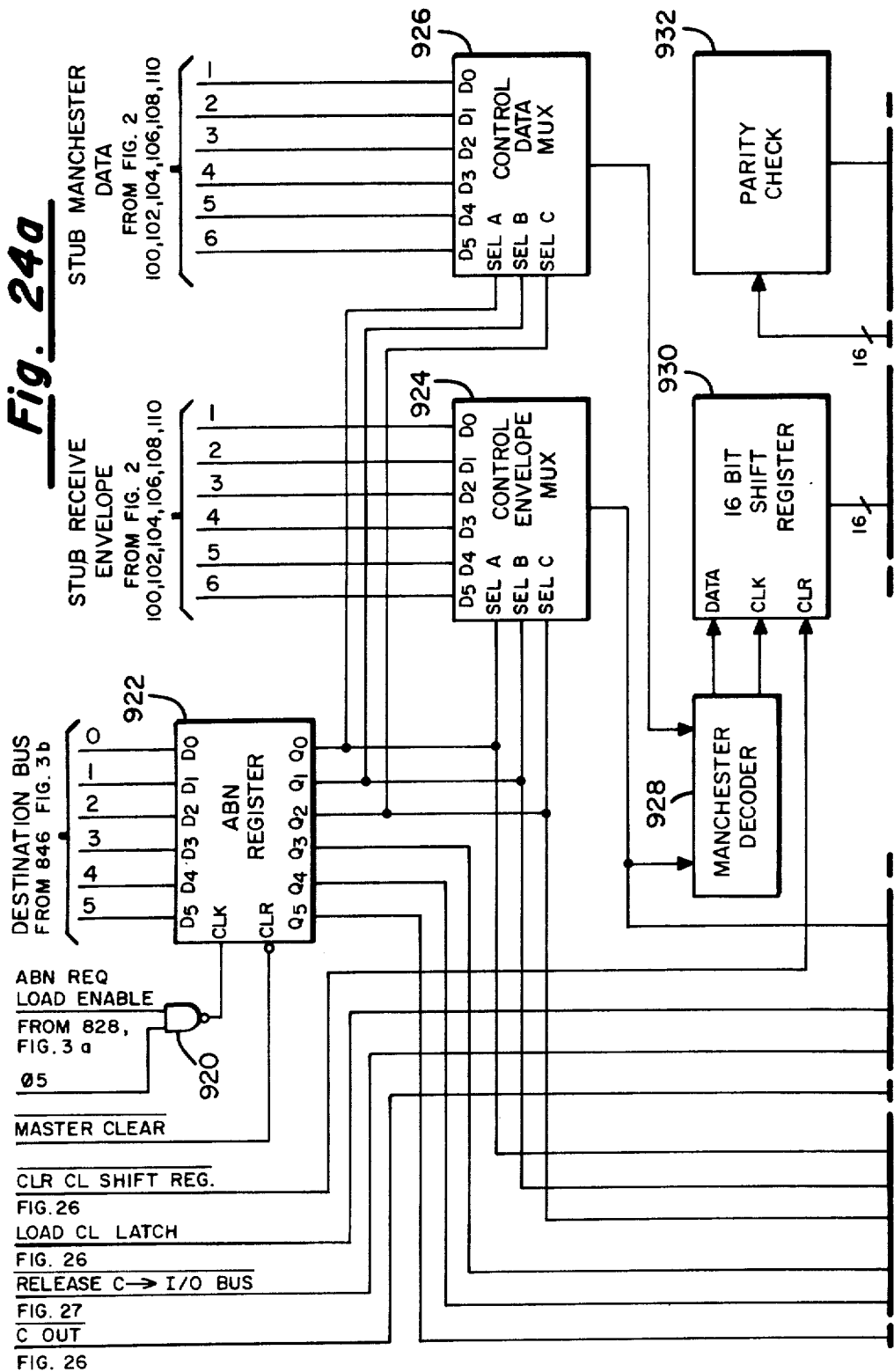

SERIAL DATA BUS COMMUNICATION SYSTEM

This is a continuation of application Ser. No. 130,125 filed Mar. 13, 1980 and now abandoned.

BACKGROUND OF THE INVENTION

This invention relates generally to a serial data bus for interconnecting large numbers of computers or other digital data processing equipment in a local area and more specifically to the design of the nodes used in such a system for coupling the user devices to the serial data bus whereby the throughput of the system is enhanced.

DISCUSSION OF THE PRIOR ART

The interconnection of large numbers of computers in a local area is a need which is quite different from computer interconnection requirements perceived in the past. Prior art approaches at local processing networks involved the so-called star configurations wherein peripheral equipments and computers were connected directly to a computer having centralized control over the resources comprising the network. It has been found that the rapid increase in the use of digital processing in all areas of a network in the form of microcomputers embedded in a process, mini computers for specialized front-end processing and large computers for large-scale operations has created at need for a flexible and extensible method of interconnecting processing elements. Interconnecting large numbers of processing elements for complete intercommunication can be accomplished, of course, by direct transmissions to all elements connected to a data bus or by indirect transmissions relayed by point-to-point interconnections. It is found, however, that the use of only point-to-point connections to establish a local processing network composed of a large number of computers is quite complex and cumbersome and does not easily satisfy the need for flexibility and extensibility.

The serial data bus in which the present invention finds application provides the medium for the complete interconnection of processing elements in a local processing network. The term "local" is intended to mean that the user devices are physically located within a well defined area such as a building, a ship or an aircraft as distinguished from remote communication systems which may be spread over many miles.

To be effective, a serial data bus network interconnection scheme should take into account the throughput requirements and bottlenecks due to a saturated transmission system or non-uniform flow of data are to be avoided. In accordance with the present invention, the control of information flow on the serial data bus is programmable and thereby allows the fitting of the bus to a specific application.

A drawback of prior art local porcessing networks and especially the interconnection scheme used therewith relates to the fact that they tended not to be particularly fault tolerant. Fault tolerance is the attribute of the local processing network to continue its operation after the occurrence of faults. The system of the present invention overcomes that drawback through the judicious use of redundancy and a built-in self-monitoring capability for detecting and isolating faults. The nodal structure comprising the present invention enhances the overall fault tolerance of the serial data bus system with which they are used by allowing redundant cables, isolated connections to the cables and programmable time-out interrupts for calling into play fault recovery software.

Closely associated with the need for fault tolerance is the requirement that the interconnection system be able to accommodate incremental change without deleteriously impacting other parts of the network. Stated otherwise, the occurrence of faults represents a change in the system configuration and corrective action by way of removal of system parts from the network must be tolerated while still maintaining a continuous information flow to suit particular modes of operation or system applications.

The node structure of the present invention permits user programs to change the organization of information flow which is controlled through a polling operation. Also, user software can be employed to inhibit specific messages from flowing to a particular user device.

Another attribute of local data processing network and its interconnect shceme, especially where military and other highly critical real-time operations must continue even upon the occurrence of catastrophic events is that it exhibits survivability. For example, it is essential that the user devices be able to communicate even when one or more interconnect cables is severed or when one of the system modules is destroyed. The local communication system in which the present invention finds use exhibits this property, primarily due to the fact that redundant cables are employed which cables are physically distributed throughout the local area along different paths and because the nodes of the present invention are modularly arranged and function such that any one may assume the role of Bus Controller in the event of a catastrophic failure of the type indicated.

The node device of the present invention which is used to interface a user device to the serial data bus employs a system monitor to control the initialization and reconfiguration and the system monitor function is assigned to one of the user processors with backup as required. During initialization, the Bus Controller node and the active primary bus cables are selected, message screens are loaded into each node, and each node is checked through a built-in test routine. During operation, the node hardware monitors the system for invalid formats, parity, missing responses/polls, and other fault indicators. On detection of a fault, a reconfiguration mode is initiated through the user processor which contains the system monitor function. For redundancy, other user processors can assume the system monitor function and perform the reconfiguration process. Using this technique, the level of reconfiguration becomes a function of the type or types of fault(s) detected which may include the following:

Switching a node to an alternate Bus Access Module stub in the event of a failure in this transmission path;

Switching all nodes to a backup primary bus cable in the event of breakage of this cable; and Assigning the Bus Controller functions of a user/node to an alternate user/node in the event of failure including the user/node that contains the System Monitor/Bus Controller function.

To facilitate the configuration process, each node continuously monitors data on the alternate stub cables and if data is detected on a previously inactive cable, it will, under certain conditions, interpret such data as commands for initiating reconfiguration.

SUMMARY OF THE INVENTION

The preferred embodiment being described herein permits a local data processing network to involve up to 256 separate users (computers) each being associated with a node device having a plurality of ports for connection to the primary bus cables, thereby accommodating the desired redundancy requirements. That is, a plurality of primary bus cables are provided for redundancy purposes and at all times, two of the plurality are designated the control cable which carries control type data words and a message cable for carrying message data. The system is configured such that if one or the other of the active control or message cables is interrupted, the user devices are automatically reconfigured to cooperate with a different (previously inactive) one of the plural primary bus cables. Communications within the data bus system are implemented by assigning control of the active bus to one of the node devices, which then controls transmission of messages on the data cable. Contention between bus users is resolved by selectively polling the users and then granting bus access to the highest priority user. Addressing within the data bus system uses both physical and logical addresses with each node having a manually selectable address register.

One of the nodes in the data bus system has the responsibility for bus control. Users with time-critical communication requirements are polled more frequently than other non-priority users. The priority structure is controlled by user defined parameters so that it can be modified to adapt to the particular application in process.

When a particular node is polled, a response is transmitted to the Bus Controller, Indicating the needs of the node as well as the current status. As such, a bus malfunction can be detected within the time required for a full system polling cycle. Poll commands, responses, and other types of system commands are arranged to be transmitted on a control cable of the bus. The data cable is reserved for information messages only. The traffic on both cables is asynchronous, enabling polling and queuing of user devices concurrently with information messages being transmitted on the data cable.

OBJECTS

It is accordingly the principal object of the present invention to provide means for interconnecting a large plurality of digital data processing devices to one another via a serial transmission data bus.

Another object of the invention is to provide an improved node device for coupling a digital data processor to one of a plurality of data channels.

Still another object of the invention is to provide a node for coupling a digital data processor such as a user computer to a two cable system wherein one cable is arranged to carry polling/command signals and the second cable carries data messages.

A further and related object of the invention is to provide a node device for coupling a user computer to transmission cables such that concurrent polling and data transmission can be performed so as to minimize access time.

A yet further object of the invention is to provide a node system in which message traffic on a serial bus to which the node is coupled is controlled by one of a plurality of nodes which has been designated as the Bus Controller.

A still further object of the invention is to provide in a serial data bus transmission system a plurality of node devices, any one of which can function as the Bus Controller at any given time.

A still further object of the invention is to provide in a serial data bus communication system a plurality of distributed cables, each capable of carrying serial binary data between nodes and which allows for switching of all nodes to a backup primary bus cable in the event of breakage of the bus cable over which data and control signals had previously been conveyed.

Still another object of the invention is to provide in a node device hardware and firmware whereby each node in the system can continuously monitor data on alternate stub cables such that if data is detected on a previously inactive cable, the node may interpret such data as calling for bus reconfiguration.

Another object of the invention is to provide a node structure for a serial data bus system which includes special purpose hardware and firmware in a general purpose microprogram controller for maximizing the polling rate.

A yet still further object of the invention is to provide a node for a serial data bus transmission system employing a dynamic reconfiguration method whereby one of the nodes in the system, namely, the Bus Controller node, sends commands to the remaining nodes in the system so that those remaining nodes reconfigure automatically to a new cable.

Yet another object of the invention is to provide a node for use in a serial data bus transmission system whereby real-time reassignment of the so-called Bus Control function can be attained.

A still further and related object is to provide a node design for use in a serial data bus communication system whereby real-time channel change can be accomplished to facilitate recovery from faults in the transmission system.

Yet another object of the invention is to provide a high speed resource allocation mechanism which achieves a maximum bus access time of less than $\frac{1}{8}$ millisecond for up to 16 different nodes on a serial data bus communication system.

These and other objects and advantages of the invention will become apparent to those skilled in the art from the following detailed description of the preferred embodiment, especially when considered in conjunction with the accompanying drawings.

DESCRIPTION OF THE DRAWINGS

FIG. 11 depicts by a logic diagram the Non-priority Poll Lists;

FIG. 21 shows the implementation of the Dispatch Queue Input Multiplexer portion of the Control Line Input Queue;

DESCRIPTION OF THE PREFERRED EMBODIMENT

Figure 1:
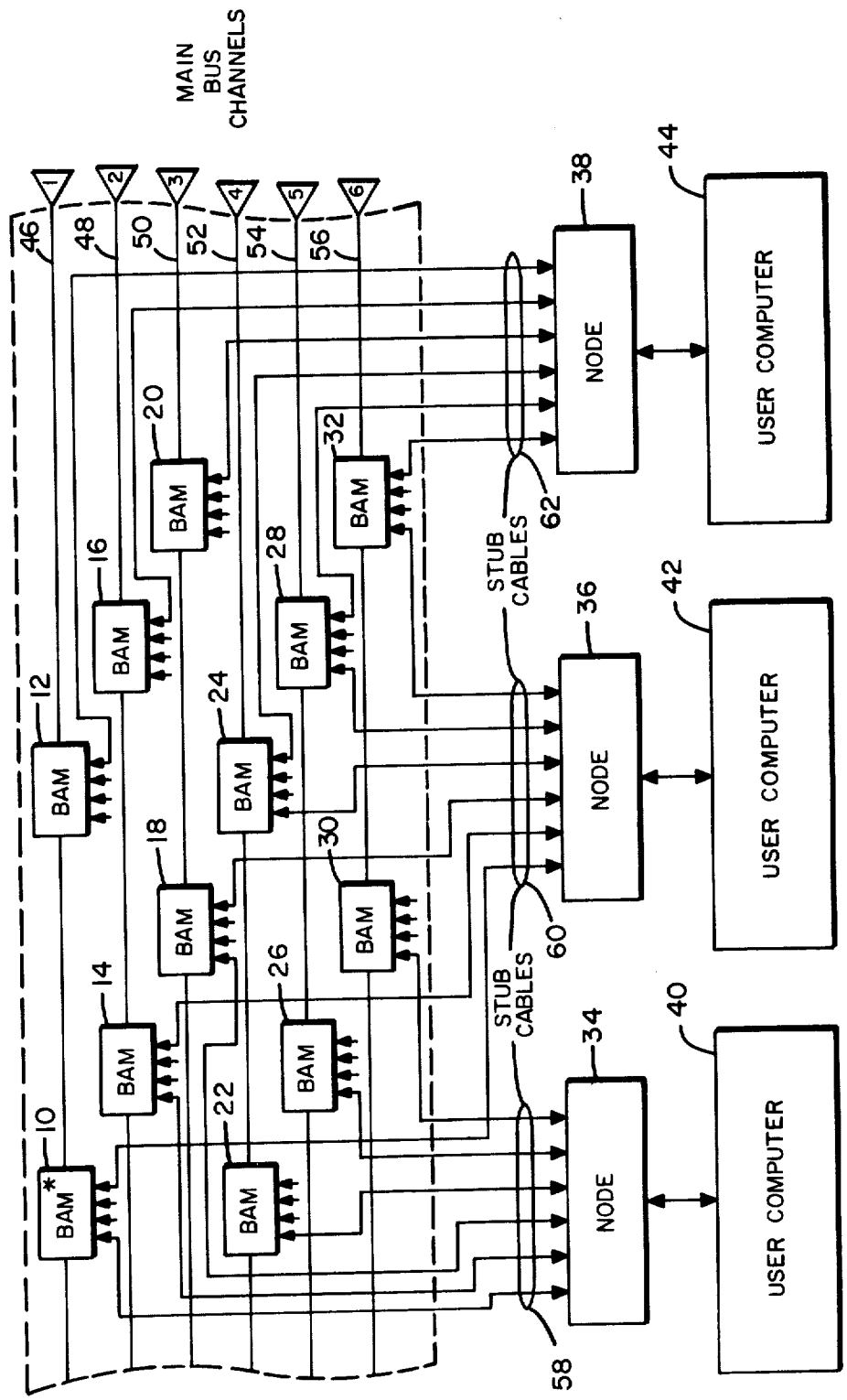
FIG. 1 is a system block diagram of a serial data bus in which the node structure of the present invention finds use.

Before explaining the overall construction and mode of operation of the node devices comprising the present invention, it is deemed expedient to explain in summary fashion the overall system configuration in which the node devices find application. In this regard, reference is made to the general block diagram of FIG. 1 which depicts graphically the serial data bus architecture. User devices such as the user computers 40, 42 and 44 are but three of a large plurality of user devices which are adapted to communicate, one with the other, on the bus system. In a system actually constructed, up to 256 user devices were allowed for. Associated with each user device is a so-called node, node 34 being associated with user computer 40, node 36 with user computer 42 and node 38 with user computer 44. The serial data bus system functions to permit two-way, point-to-point communication between any pair of user computers or, alternatively, to permit any one user computer to broadcast simultaneously to all other users in the system. Interuser communication is accomplished via the main bus channels, here shown as including six such channels labeled 46–56, respectively. By utilizing plural channels, the desired redundancy is provided in that any two of the six are sufficient to support communication between all user devices.

Each of the channels 46–56 may comprise a triaxial cable capable of supporting Manchester encoded serial data at a 10 megabit per second rate. The six cables 46–56 will hereinafter be referred to as the primary bus system.

As is illustrated in the drawing of FIG. 1, each node 34, 36, etc., communicates with the primary bus system via stub cables 58, 60 and 62. The stub cables associated with each node correspond in number to the number of main bus channels employed in the data bus system. The interconnection between a node stub cable and one of the main bus channels is via a so-called Bus Access Module or BAM. Those desiring an explanation of the construction and operation of the BAM devices used herein are referred to a paper entitled "A Triaxial Bus Transmission System" by R. O. Starkson which was published on Oct. 23, 1979 in the *IEEE Proceedings, 4th Conference on Local Computer Networks*, pp. 82–85, which subject matter is incorporated herein by reference.

As is explained in the aforereferenced article, the BAM provides a zero length stub connection to the primary bus system and provides local signal regeneration to drive the stub cables. In a practical system that has been put into use, up to 64 BAM's can be accommodated on each of the primary bus cables 46, 48 . . . 56 without degrading the electrical performance of the system. Further, each BAM is capable of driving up to four stub cables such that it can serve a maximum of four separate nodes. The BAM may be positioned anywhere along the length of the primary bus cables which may, for example, each be approximately 300 meters in length. The stub cables 58, 60, etc., may typically be up to 30 meters in length, but no limitation to this particular dimension is intended. However, it is readily understandable, then, that these typical dimensions allow a system designer considerable flexibility in choosing the physical location of the channels of the primary bus system and the associated Bus Access Modules. Maximum fault tolerance is achieved by providing a significant number of redundant communications paths which may be physically disbursed. It is to be noted, for example, that nodes 34 and 36 gain access to the primary bus cable 46 by way of common BAM 10 while they gain access to the primary bus cable 54 via BAM's 26 and 28, respectively.

It is generally intended that each node 34, 36, etc., will communicate with all six of the main bus channels 46-56, although it is to be understood that some of these redundant cables can be eliminated in the interests of ecomony and only two cables are essential for operation. That is to say, the serial data depicted schematically in FIG. 1 requires two channels to be available in the bus transmission system at any given time. One of the two channels, called the "Control Channel", is used solely for the purpose of system control and reconfiguration. Bus arbitration is carried out on this channel with the net result being a controlled allocation of the other channel for the purpose of sending data messages. The second of the two active channels is called the "Data Channel" and is reserved entirely for message traffic. This feature makes it possible for the serial data bus to sample the requirements of the nodes in the system asynchronously and in parallel with the data transfers taking place.

High bus performance (low access time and high message throughput) is achieved through the use of a 10 megabit/second transmission rate. The two cable system, with one cable for bus polling/command signals and the second cable for data transmission also enhances the performance. It allows concurrent polling and data transmission on the bus system and minimizes access time. While data is being transmitted on one cable, the queue for the next user may be established. The two cable system also facilitates recovery from casualty or system failures in that at least one active alternate cable is available for reconfiguring the system in the event of cable breakage.

Message traffic is controlled through a single node which performs the polling cycle. Messages are transmitted sequentially on the data cable based on a priority algorithm of the poll cycle. In this manner, positive control and status of the bus system is maintained. This attribute is essential to those operations, such as military systems, where positive and timely transmission of critical messages must be guaranteed.

As was pointed out in the introductory portion of this specification, to guarantee reliable operation, both commercial and military bus systems must strive to eliminate or at least minimize single points of failure. The use of passive rather than active taps on the primary bus is the key to achieving this desired requirement. In addition, alternate cables are provided as backup in case of cable breakage or casualty. As is shown in FIG. 1, it is also important, especially in military systems, that the cable system, i.e., cables 46-56, be disbursed and that stubs 58-62 which physically separate the primary bus from the node/user by employed. In the system depicted in the block diagram of FIG. 1, each node 34, 36, etc. may be connected up to six primary bus cables, any two of which provide a full system capability.

In that the bus control function is duplicated in several nodes, failure of the particular node which happens to be in command at any given time, i.e., the Bus Controller, does not disable the bus. Rather, the bus control function is handed off to one of the other nodes based on a predetermined sequence. In this manner, single points of failure are virtually eliminated in the overall system. The manner in which this is accomplished will be set forth in considerably more detail hereinbelow when the overall design and operation of the node, per se, is set out.

NODE CONSTRUCTION

Figure 2:
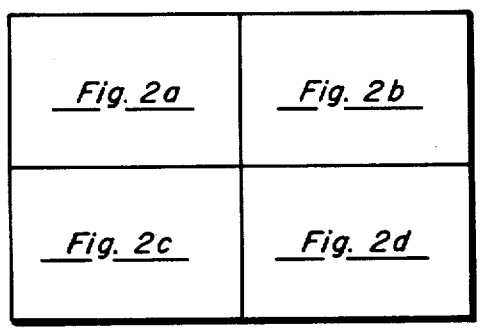
FIG. 2a through 2d, when arranged as shown in FIG. 2, depict a block diagram of the node portion of the system shown in FIG. 1.
Figure 2C:
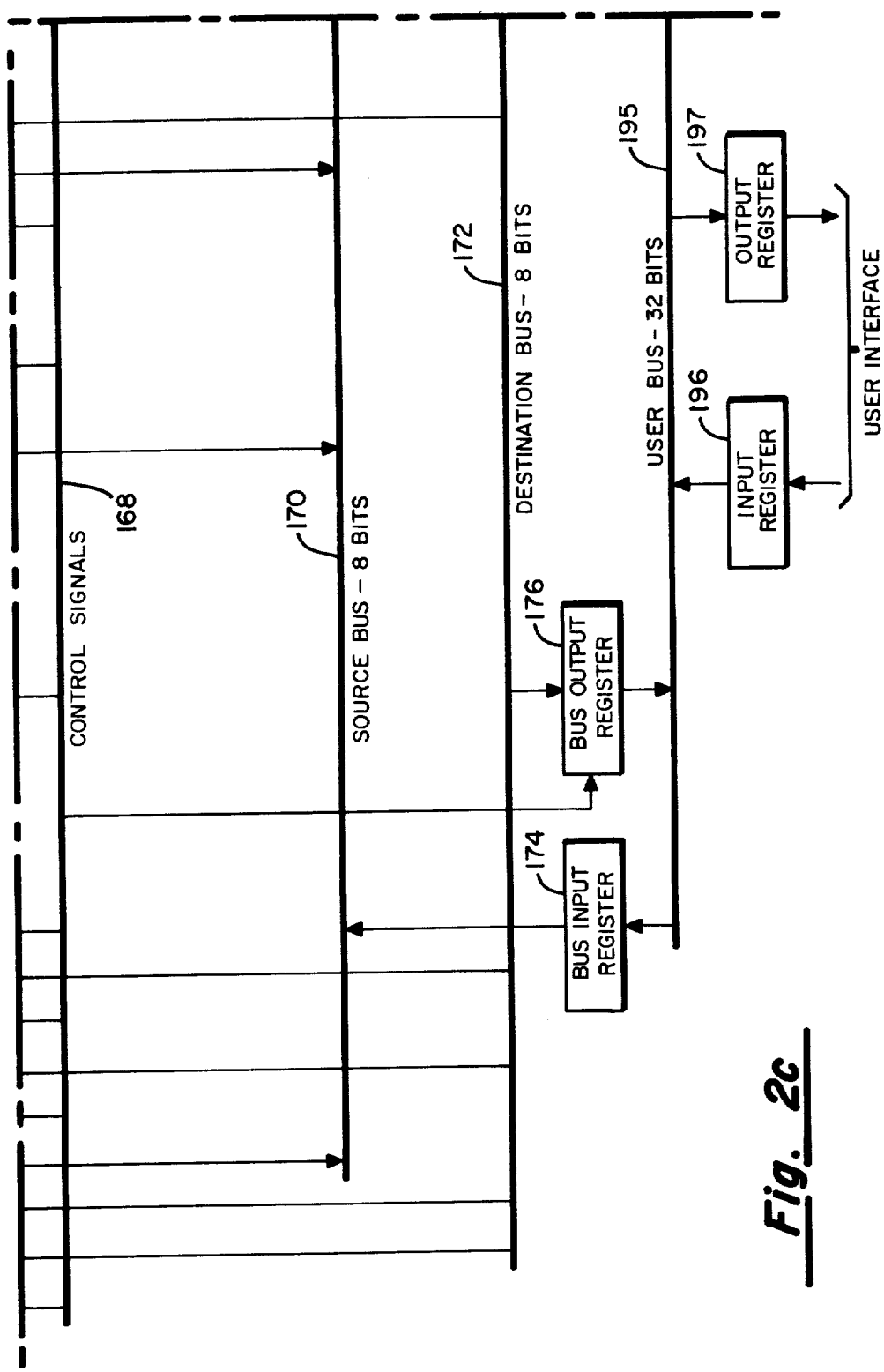
Figure 2D:
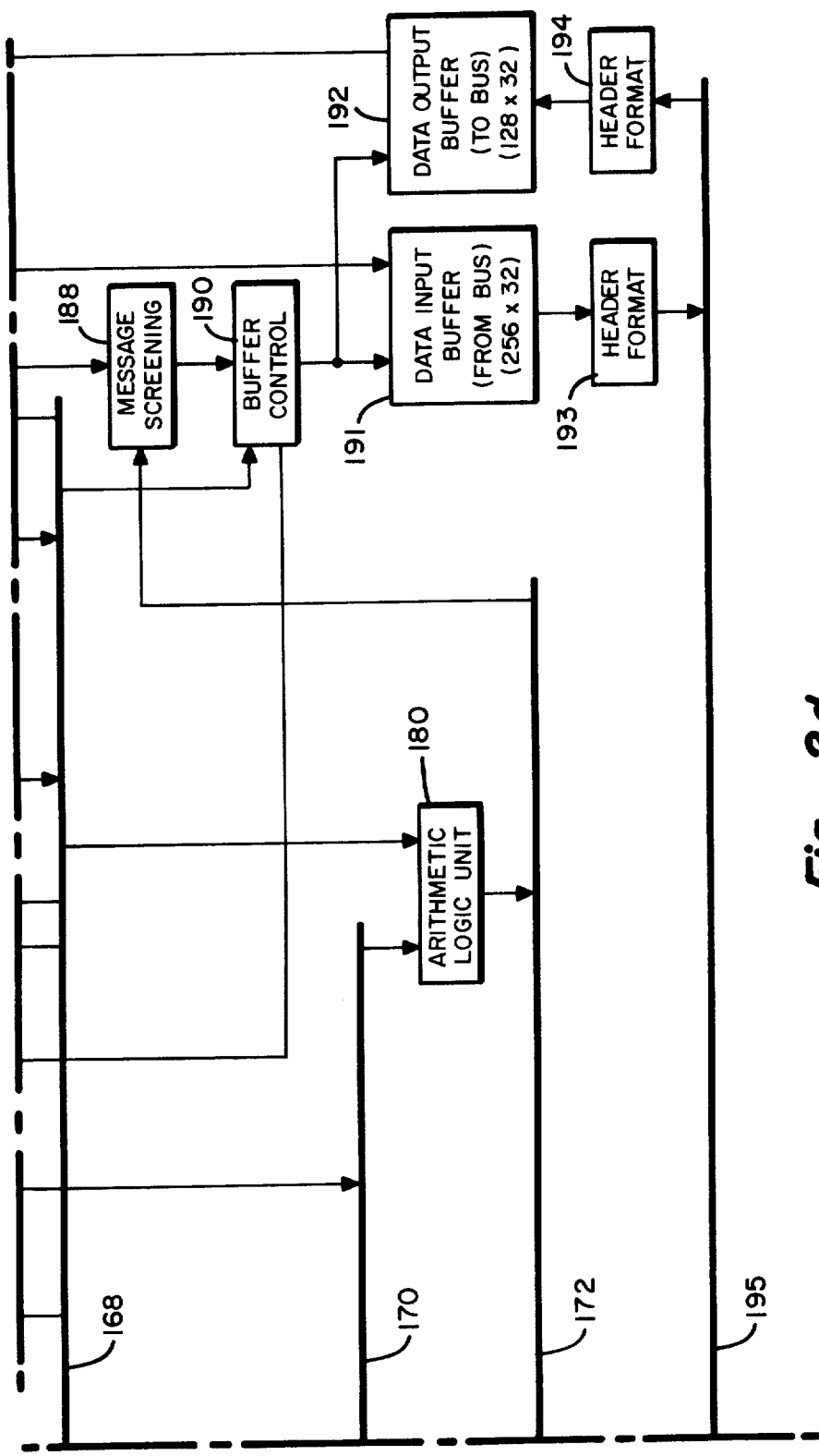

FIGS. 2a through 2d, when arranged as shown in FIG. 2, illustrates by means of a block diagram the basic organization and implementation of any one of the nodes 34, 36, etc., illustrated in the block diagram of FIG. 1. A node contains the circuitry to:

(1) support the serial data communication protocol;

(2) to communicate with the user computer; and (3) to detect and report errors and hardware failures The failures mentioned may be within the node itself, they may be detected and reported from other nodes, or they may be failures or errors detected in one of the cables. Overall control of the node is accomplished by a Microprogrammable Controller which in the preferred embodiment is based upon the so-called 2900 family of integrated circuits manufactured and sold by Advanced Micro Devices, Inc. However, limitation to this particular Microprogrammer Controller is not to be implied. As will be explained in still greater detail hereinbelow, these devices are employed in the Microsequencer 160 (FIG. 2b) and the Arithmetic Logic Unit or ALU 180 (FIG. 2d). During each so-called microcycle, the Microsequencer 160 generates an address for the Microprogram Memory 162, the contents of which are then loaded into a Microinstruction Registr 164 in a conventional and well known fashion. Certain bits of the Microinstruction are translated by Decoder 166 and the outputs of this decoder, along with the remaining bits of the Microinstruction itself comprise the control signals appearing on the Control Bus 168 internal to the node itself. These control signals are distributed to every control point throughout the node, both within and external to the Microprogrammable Controller.

The condition of the node is sensed by the Node Status circuitry 154. This information is presented to the Condition Test Multiplexer 156 and to the Mapping PLA (Programmable Logic Array) 158. The Mapping PLA 158 causes the microprogram to be vectored to a specific task as required by a given node condition, while the Condition Test Multiplexer 156 permits the program to branch on any selected status condition.

The features thus far described with respect to FIG. 2 permit the so-called firmware running in the Microprogrammable Controller including the Microsequencer 160, the Microprogram Memory 162 and the Microinstruction Register 164 to exercise supervisory control over the remainder of the node hardware. Communication from the Microprogrammable Controller to various registers throughout the node is via the 8-bit Destination Bus 172, while communication from any of the various node registers to the Microprogrammable controller is via the 8-bit Source Bus 170.

Located at the top of the composite node block diagram of FIGS. 2a and 2b are a plurality of Stub Transceivers 100-110 which are coupled to communicate with the primary bus system (see FIG. 1) via their respective BAM's. These transceivers are designed to convert the received low level Manchester encoded serial data signal to a logic level Manchester signal. During transmission, they convert the logic level Manchester encoded serial data to the low level signal required to conform to existing electrical communications standards such as NATO STANAG 4153.

Lines 112-122 are presented to the Channel Selection Network 124 via serial data and control lines. Channel selection is primarily determined by the contents of the Active Bus Number Register 150. This register is arranged to be loaded by the Microprogrammable Controller previously described. If, for example, line 114 is selected to be the control line, two-way communication will be established from the Control Line Encoder 130 by way of the Serial Control line 126, through line 114 and Stub Transceiver 102 to its respective primary bus. Similarly, any of the remaining five lines could be selected to be the Data Line and thus provide a two-way communication path through the Serial Data line 128 to the Data Line Encoder/Decoder 186. The details of how this selection is made will be discussed later under the heading "Reconfiguration". For now, however, it is sufficient to understand that a selection is required such that all nodes have one common control line and another common data line.

The Control Line Encoder/Decoder 130 permits two-way conversion between the serial Manchester encoded data on line 126 and the 16-bit parallel interface on the Control Input/Output (CIO) bus 132. All control line transmissions are 16-bit words in which the first bit is always a "1", and is referred to as the "sync bit", and the last bit is a parity bit for error detection purposes. When a Control Word is received on line 126, the bi-phase Manchester code is decoded to recover the clock and data signals. The recovered Manchester clock is used to shift the 16-bit data word into a 16-bit register within the Control Line Encoder/Decoder 130 which is then presented to the CIO bus 132. The control word is then captured in a Control Line Input Register 146.

In the case of a transmitted word, the 16-bit parallel word is first developed in a Controll Line Output Multiplexer 134 and presented to the CIO bus 132. This data is captured in a 16-bit shift register within the Control Line Encoder/Decoder 130. It is shifted out serially into the Manchester Encoder section (not shown) of device 130 which converts it to Manchester bi-phase data at the Serial Control Line 126. The timed gating signals used to load and unload data from the CIO bus 132 and to initiate the serial transmission are derived from the programmable logic array based Control Line Sequencer 144. In all other respects, the Control Line Encoder/Decoder 130 operates asynchronously with the rest of the nodes. In a related manner, the Data Line Encoder/Decoder 186 (FIG. 2b) performs the serial-to-parallel and parallel-to-serial data conversion between the Serial Data line 128 and a so-called Message Input/Output bus (MIO bus) 187, the only difference being that in this case, the message length can be a multiple of 32-bit words.

Both Control Line and Data Line transmissions are checked for parity and format errors. In the event an error is detected, the Microprogrammable Controller is notified via the Node Status circuitry 154.

Each node has the capability to generate four types of control transmissions, namely:
(1) Poll;
(2) Response;
(3) Select; and
(4) Command.

These control words are generated by the Poll List 140, the Response Register 138, the Select Queues 142 and a Command Output Register 136, respectively. The poll, select and command transmissions are employed only by the particular node which has been selected to function as the system's Bus Controller. All other nodes employ only the response form of transmission.

In the Bus Controller mode, the Control Line Sequencer 144 controls the Control Line Output Multiplexer 134 to select the appropriate type of transmission. A pool is an interrogation addressed to another node asking it to respond as to its status. In this regard, each node maintains a status word in its respective Response Register 138 which is indicative of the node status or an indication whether that node requires access to transmit on the data line. The poll is broadcast by the Bus Controller to all nodes.

However, only the particular node addressed will generate a "Response". All Responses are loaded into the Control Line Input Queue 148 and the Microprogrammable Controller is notified of this via the Mapping PLA. The Control Line Sqeuencer is now in a condition to continue polling while the Microprogrammable Controller concurrently processes the Response. Polling proceeds sequentially on the basis of two ordered poll lists contained in Poll List 140, one for up to 16 so-called priority nodes and the other list for remaining (up to 256) non-priority nodes. If the Microprogrammable Controller determines that a node requires service, the address of that node is transferred from the Control Line Input Queue 148 to the Select Queue 142. This "Select" is the means by which the Bus Controller grants a node the use of the data Bus. The Microprogrammable Controller may also determine that a Command should be sent. In this event, the Command Register 136 is loaded via the Destination bus.

Once the Microprogrammable Controller has loaded either Register 136 or Select Queue 142, the Control Line Sequencer proceeds automatically to generate the correct sequence of Polls, Selects and Commands.

In the Non-Bus Controller mode, the operation of the Control Line Sequencer 144 is similar, except that now the Microprogrammable Controller tests the Control Channel inputs to determine if the node has received a Poll or a Command. Also, instead of transmitting Commands, Polls or Selects a node which is not functioning as a Bus Controller will only transmit a Response via Response Register 138.

Figure 33:
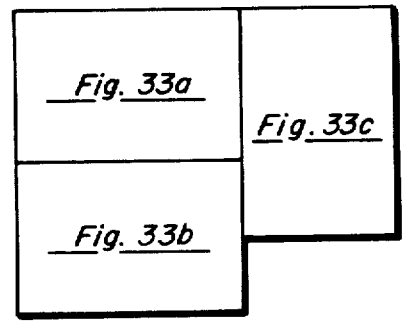
FIGS. 33a, 33b and 33c when arranged as shown in FIG. 33, comprises a firmware flow diagram depicting the bus arbitration methodology.
Figure 18B:
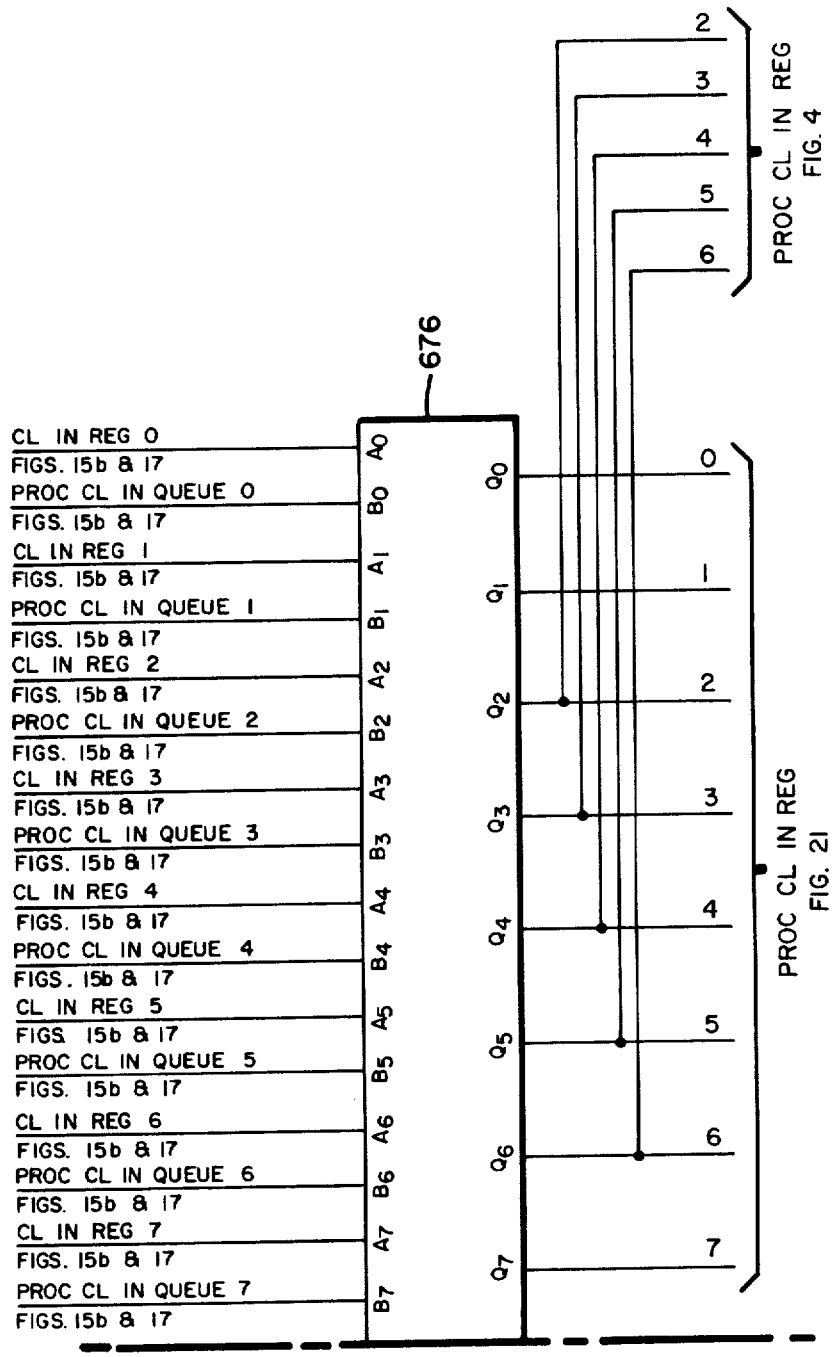
Figure 34:
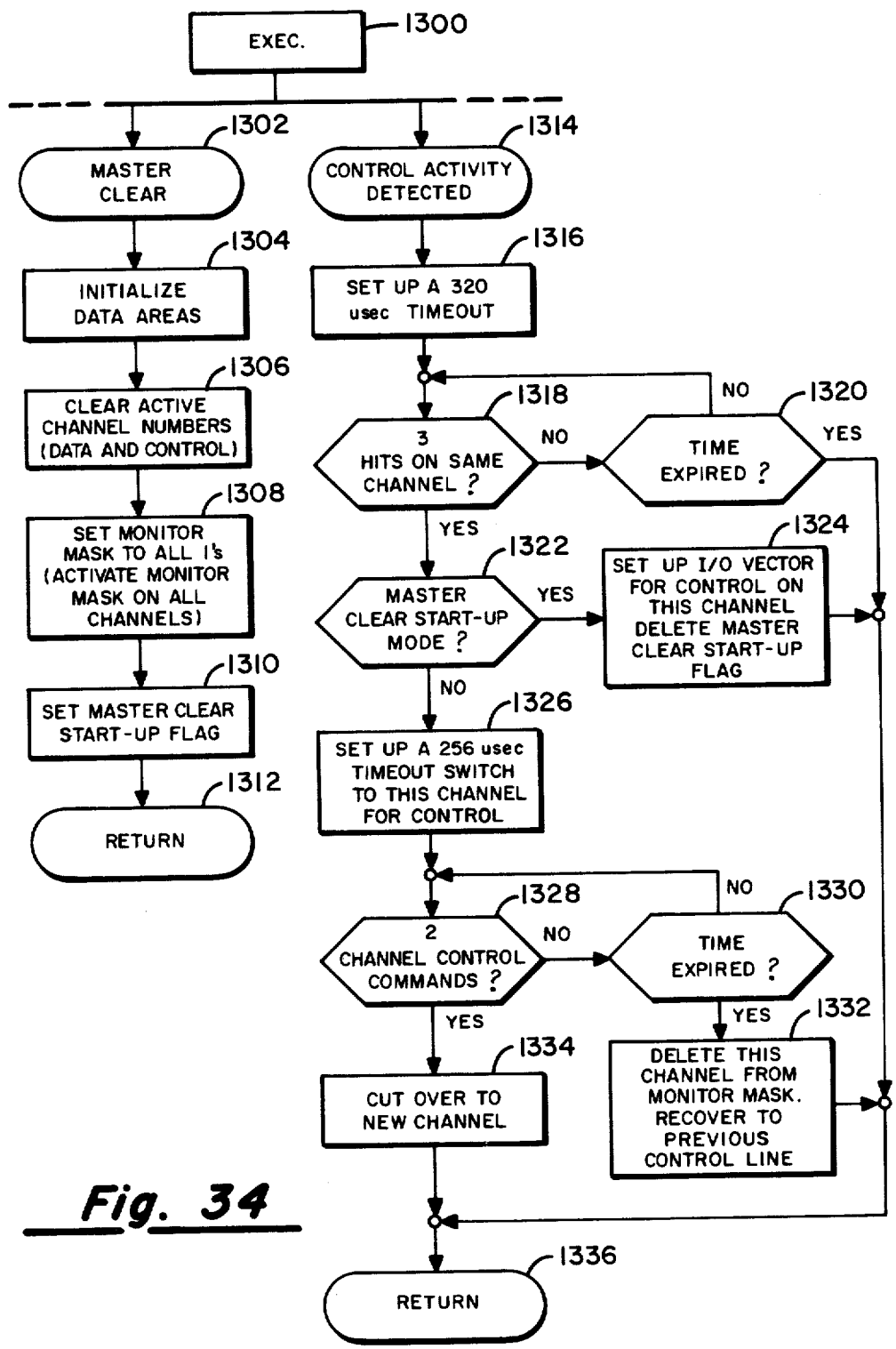
FIG. 34 is a further flow diagram helpful in understanding the bus reconfiguration process.

A novel aspect of the present invention lies in the ability of the Control Line Sequencer to automatically process all Control Line transmissions in either mode without incurring any nominal delay due to processing by the Microprogrammable Controller. These features will be discussed in greater detail hereinbelow when the flow charts of FIGS. 33 and 34 are considered.

MESSAGE HANDLING AND USER INTERFACE

Because the remaining node functions do not relate directly to the invention, only a brief description thereof will be presented at this point so as to provide the reader with a more complete understanding of the overall system construction and operation.

The User Interface may consist of 32 input lines designed to carry digital signals which are arranged to be latched into Input Register 196 and 32 output lines which are driven by Output Register 197. Communication is via the 32-bit User Bus 195. Communication from the Microprogrammable Controller to the User is by way of a Bus Output Register 176. A 32-bit output word is assembled from four 8-bit bytes coming from the Destination Bus 172. Communication from the User to the Microprogrammable Controller is via the Bus Input Register 174. A 32-bit User word is latched into this register 174 and then disassembled into four 8-bit bytes which are sent sequentially to the Source Bus 170. The Microprogrammable Controller supports all of the User protocol, but does not become directly involved in the transmission of data. In a first instance where the User is the originator of a message, the User computer in question places a 32-bit header word on the User Bus 195. The header Format circuit 194 converts this word into the header required for serial data transmission. This involves the insertion of a sync bit and a node address. This word also is used to load a Buffer Control circuit 190 with a message word count. The reformatted header is loaded into the first word of a 128-word by 32-bit Data Output Buffer 192.

Next, 32-bit message words are sequentially loaded into the Buffer 192 until the word count specified by the contents of the Buffer Control 190 has been reached. The complete message is now resident in the Output Buffer, ready for serial transmission. If the message to be sent exceeds the 128-word limit, it must be divided into packets by the user and then treated as a single message. With the Output Buffer 192 now loaded, the node requests service from the Bus Controller which is the node then acting as the "master" at the particular time. When a "select" is received, the output data is loaded in 16-bit bytes onto the Message Input/Output bus (the MIO bus) 187 and is transmitted via the Serial Data Line 128 out to the associated main bus channel in an uninterrupted serial data stream. All data transfers proceed automatically to support a 10 MHz serial data rate.

Next to be considered is the case where a User Computer is to be the recipient of a message. All serial data is converted by the Data Line Encoder/Decoder 186 and presented to the MIO bus 187. A Message Screening circuit 188 coupled to this bus functions to examine the header of each message and ignores all messages which are not addressed physically or logically to this particular node. If the message is intended for the node's User, the Buffer Control circuit 190 is initiated to cause the message to be captured in a Data Input Buffer 191 which, too, many comprise a 256-word by 32-bit storage device. When the complete message has been loaded into buffer 191, the node hardware informs the User that it has a message waiting and this message is then read out from the Input Data Buffer 191 and sent to the associated User via the User Bus 195 and the output register 197. The Header Format circuit 193 converts the first 32-bit word of a message from the serial data format to the User Bus format. Because it is possible that a second message can arrive before the first message has been emptied from the Data Input Buffer 191, this buffer is organized as an exchange memory which permits simultaneous loading and unloading of messages. In designing the node of the present invention, the buffer 191 is sized such that two complete messages of the maximum length, e.g., 128 words, can be held without over-running it. Any abnormal message conditions are reported by the Buffer Control circuit 190 to the Node Status circuit 154.

SYSTEM TIMING

All timing for the node is derived from a stable crystal oscillator which may, for example, produce 20 MHz square waves. The output of this oscillator is used to form five critically lapped clock pulses designated Phase I through Phase V. Each clock pulse may typically be 50 nanoseconds wide and may occur every 250 nanoseconds. The resulting pulse-to-pulse interval defines the cycle during which an instruction is executed by the Microprogrammable Controller and also determines the execute cycle for the Controller Line Sequencer 144. The 20 MHz oscillator is also used in the encoding of the 10 MHz bi-phase Manchester serial data stream. The Phase III clock pulse is used to clock a 16-bit binary divider which generates 16 square wave outputs ranging from a 0.5 microsecond period to a 16,384 millisecond period. Certain of these output signals are employed in the various time-out checking performed by various modules within the node.

Now that the overall organization of a typical node has been explained with the aid of the system block diagram of FIG. 2, consideration will now be given to various modules set forth in that general block diagram.

MICROPROGRAMMABLE CONTROLLER

Figure 3:
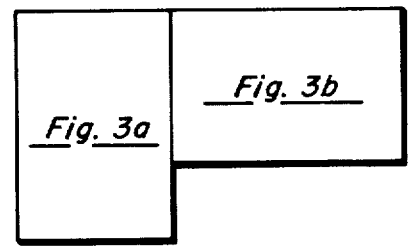
FIGS. 3a and 3b, when arranged as shown in FIG. 3 depict by means of a block diagram the organization of the Microprogrammable Controller employed in the node.
Figure 5:
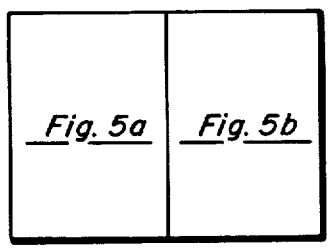
FIGS. 5a and 5b, when arranged as shown in FIG. 5, illustrate the logic for implementing the Time for Select Flag Circuitry.
Figure 6:
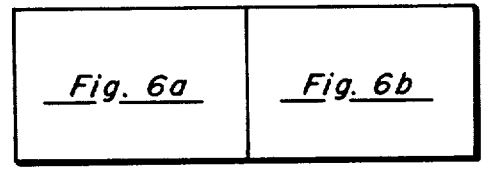
FIGS. 6a and 6b, when arranged as shown in FIG. 6, depict the control line output circuitry portion of the node.
Figure 7:
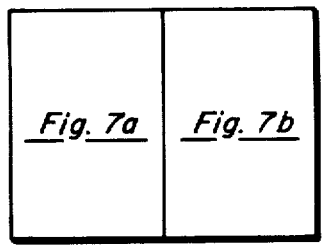
FIGS. 7a and 7b when arranged as shown in FIG. 7, depict further portions of the control line output circuitry.
Figure 10:
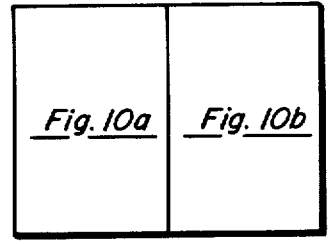
FIGS. 10a and 10b, when arranged as shown in FIG. 10, depict by means of a logic diagram the Priority Poll Lists portion of the node.
Figure 3A:
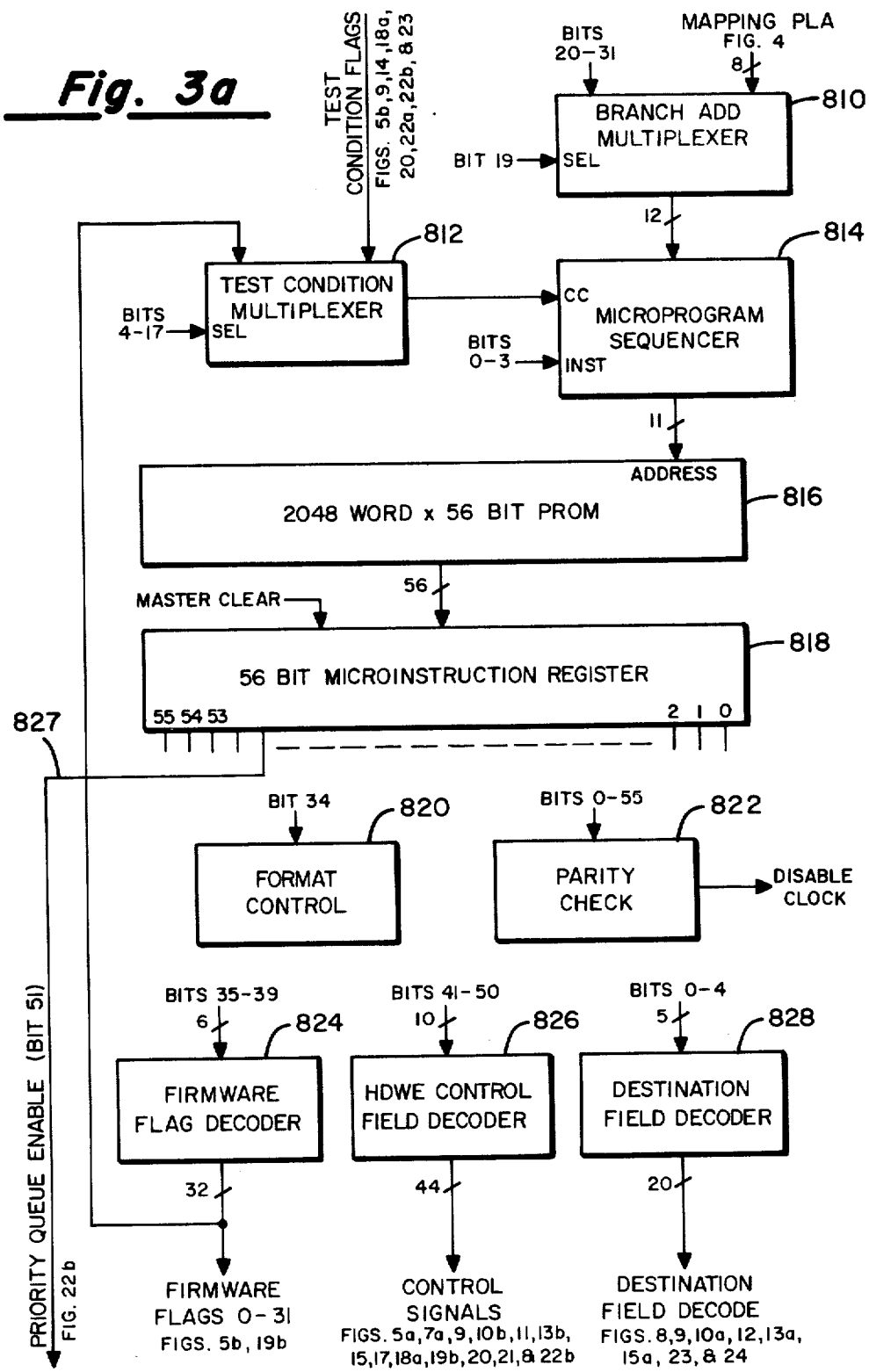
Figure 3B:
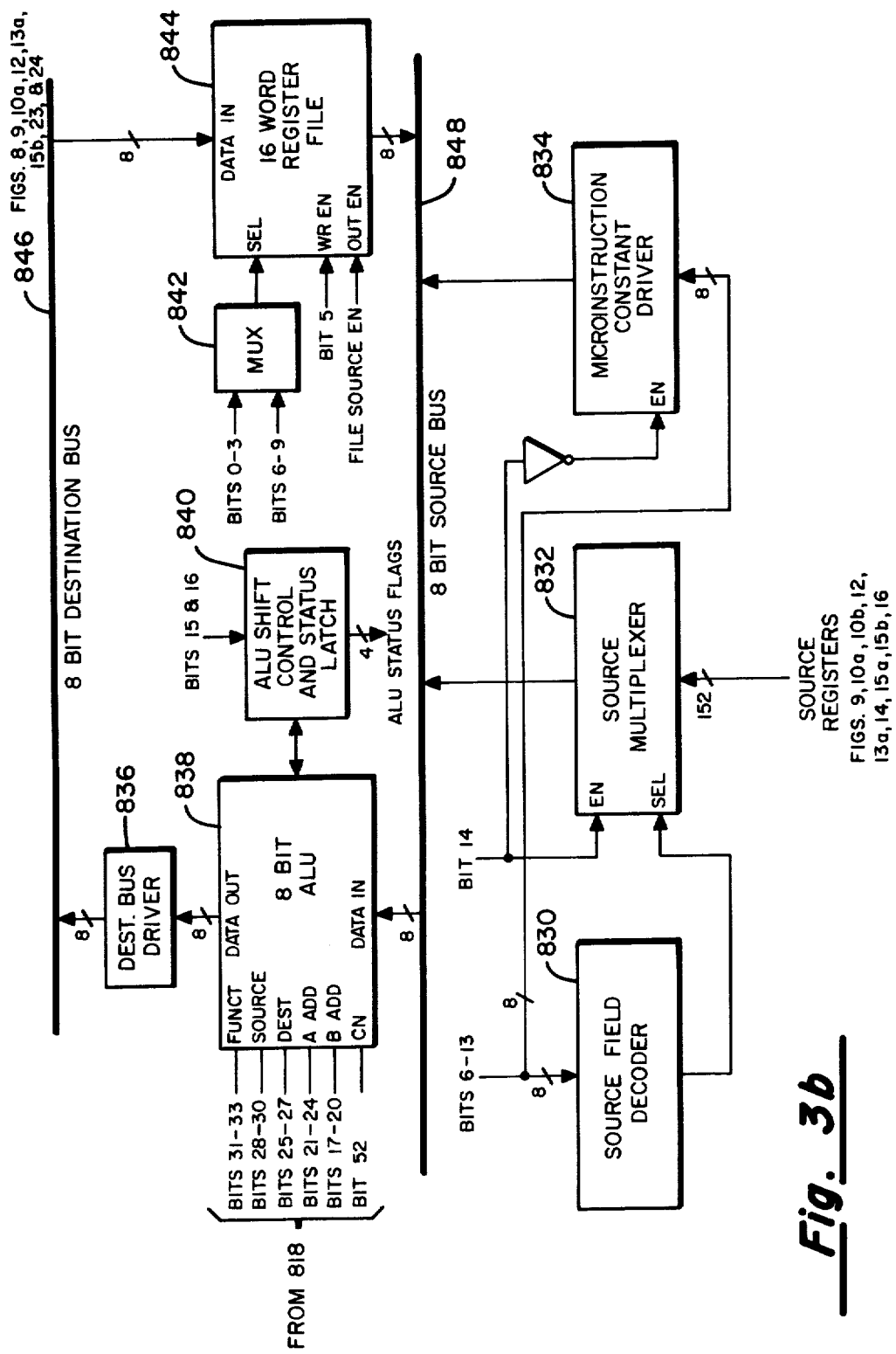

FIGS. 3a and 3b together illustrate by means of a more detailed block diagram the organization of the Microprogrammable Controller employed. The Microsequencer 160 of FIG. 2 is represented in FIG. 3 by a block identified by numeral 814 and provides an 11-bit address to a programmable read-only memory (PROM) 816 which may, typically, comprise 2048 words, each 56 bits in length. At the beginning of each cycle, a new word is fetched from the PROM 816 and loaded into a 56-bit Microinstruction Register 818. The 56 separate output from this register are used to control both the internal operation of the Microprogrammable Controller and to provide the hardware control signals for the remainder of the node. Selected bits of the register 818 are thus connect to each function of the Microprogrammable Controller.

Two instruction formats are utilized. When one format is involved, branching and program control can be effected. A second format dictates that data transfers and data manipulations are to occur. Referring to FIG. 3a, the particular format in use is defined by the state of bit 34 which causes the bits 0 through 33 to be interpreted differently. As is illustrated in FIG. 3a, bit 34 is received by the Format Control circuit 820 which selects the appropriate functions for a given format. The interpretation of the upper portion of the instruction bits, i.e., bits 35 through 55 is identical for both formats.

Consider first the interpretation of the lower order bits when bit 34 is a binary "0". As mentioned above, this defines the branch or program control format. Bits 0 through 3 of the Microinstruction word provide the command instruction for the Microprogram Sequencer 814. These bits are decoded to select one of 16 possible operations as defined for the Advanced Micro Devices series 2910 type integrated circuit. This instruction determines the source of the next address which will be used to fetch the next Microinstruction. If the program does not branch, the address count is simply incremented by 1. If a branch is required, the output of Branch Address Multiplexer 810 provides the source for the new address. As might be expected, branching can be either conditional or unconditional. For the conditional case, the decision to branch is decided by the output of Test Condition Multiplexer 812. Bits 4 through 17 of the Microinstruction are provided to the Test Condition Multiplexer 812 to select one of 83 possible test signals which will be used for conditional branching. These signals are comprised of 32 firmware flags which become available at the output of the Firmware Flag Decoder 824 and the various Test Condition Flags identified in Table I below.

TABLE I

| TEST CONDITION FLAGS | |
|---|---|
| Active State | Function |
| H | INTER MESSAGE TIMEOUT |
| H | DATA LINE DATA STREAMING TIMEOUT |
| H | DATA LINE PARITY ERROR |
| H | IMMEDIATE REQUEST |
| H | MESSAGE TO SEND FLAG |
| H | CONTROL LINE SYNC ERROR |
| H | CONTROL LINE PARITY ERROR |
| H | SEQUENCER WAIT FLAG |
| H | FORCED COMMAND ENABLE |
| H | POLL/RESPONSE |
| H | SELECT ENABLE |
| H | COMMAND ENABLE |
| H | PREVIOUS POLL PRIORITY/NON-PRIORITY INDICATE |
| L | NON-PRIORITY LIST ENABLE |
| H | SELECT TIME FLAG |
| L | OWN NODE SELECT FLAG |
| L | OWN NODE POLL FLAG |
| L | NON-PRIORITY QUEUE EMPTY |
| L | PRIORITY QUEUE EMPTY |
| H | NON-PRIORITY QUEUE FULL |
| H | PRIORITY QUEUE FULL |
| H | CONTROL LINE ACTIVITY TIMEOUT |
| H | POLL/RESPONSE TIMEOUT |
| H | AUTO LOOP ERROR FLAG |
| H | PROCESSOR CONTROL LINE INPUT QUEUE FULL |
| H | CONTROL LINE INPUT WORD INDICATOR |
| H | PROCESSOR CONTROL LINE INPUT REGISTER BIT 6 |
| H | PROCESSOR CONTROL LINE INPUT REGISTER BIT 5 |
| H | PROCESSOR CONTROL LINE INPUT REGISTER BIT 4 |
| H | PROCESSOR CONTROL LINE INPUT REGISTER BIT 3 |
| H | PROCESSOR CONTROL LINE INPUT REGISTER BIT 2 |
| H | LATCHED MCU INTERRUPT FLAG |
| H | FORCED EXTERNAL FUNCTION FLAG |
| H | LATCHED INPUT DATA ACKNOWLEDGE FLAG |
| H | LATCHED USER DATA INPUT FLAG |
| H | LATCHED EXTERNAL FUNCTION INPUT FLAG |
| H | LATCHED DATA & HEADER LOST |
| H | LATCHED ERROR ACTIVITY INDICATOR |
| L | ALU SIGN FLAG |
| H | EXTERNAL INTERRUPT/DATA SWITCH |
| H | ALU SIGN FLAG |
| H | ALU CARRY FLAG |
| H | ALU = ZERO FLAG |
| H | ALU OVERFLOW FLAG |
| H | NODE POWER FAULT |
| H | BREAKPOINT FLAG |
| H | LATCHED DISPLAY MODE |
| H | PROC CONTROL LINE IN REG 0/ (AUTO LOOP) ERROR IND) |
| H | LATCHED INCOMPLETE MESSAGE |
| H | LATCHED DATA LINE DATA LOST (HEADER COMPLETE) |
| H | LATCHED CONTROL LINE ACTIVITY INDICATOR FLAG |

It can be seen, then, that the state of any flag can be ascertained by the microprogram by executing the appropriate conditional branch instruction. Bit 19 of microinstruction contained in register 818 determines the source of the branch address via the Branch Address Multiplexer 810. If this bit is a 0, the branch address is determined by bits 20 through 31 of the microinstruction. If, however, bit 19 is a binary "1" signal, the branch address is determined by the output of the Mapping PLA 158 of FIG. 2b. By executing a branch instruction with bit 19 set to a 1, the program can be vectored to the starting address of one of a number of processing tasks as defined by the Mapping PLA. Bits 32 and 33 are not used in this format.

Next to be considered is the case where bit 34 of the Microinstruction is a binary "1", thus defining the data transfer and manipulation format. Bits 0 through 4 are presented to the Destination Field Decoder 828 to generate the 29 destination field decode signals identified in Table II below. Each of these signals has a unique code which, if programmed, causes the data on the 8-bit destination bus 846 to be latched into the corresponding register.

TABLE II

| DESTINATION FIELD DECODER |
|---|
| SCREEN RAM ADDRESS REGISTER LOAD ENABLE |
| CONTROL LINE INPUT REGISTER BYTE 2 LOAD ENABLE |
| CONTROL LINE INPUT REGISTER BYTE 1 LOAD ENABLE |
| ACTIVITY MASK REGISTER LOAD ENABLE |
| DEST BUS HOLD REGISTER LOAD ENABLE |
| COMMAND REGISTER BYTE 2 LOAD ENABLE |
| COMMAND REGISTER BYTE 1 LOAD ENABLE |
| SELECT REGISTER LOAD ENABLE |
| NUMBER NON-PRIORITY USERS/SUBCYCLE REGISTER LOAD ENABLE |
| END NON-PRIORITY LIST REGISTER LOAD ENABLE |
| END PRIORITY LIST REGISTER LOAD ENABLE |
| RESPONSE REGISTER LOAD ENABLE |
| CONTROL LINE ACTIVITY TIMEOUT REGISTER LOAD ENABLE |
| CABLE SELECTION REGISTER LOAD ENABLE |
| INPUT RAM ACCUMULATOR LOAD ENABLE |
| SCREEN RAM CONTENTS LOAD ENABLE |
| OUTPUT DATA RAM ADDRESS LOAD ENABLE |
| INPUT DATA RAM UNLOAD ADDRESS LOAD ENABLE |
| DATA RAM CONTROL REGISTER LOAD ENABLE |
| INPUT DATA RAM LOAD ADDRESS LOAD ENABLE |
| MICROPROCESSOR CONTROLLER EXTERNAL INTERRUPT FORMING REGISTER BYTE 1 LOAD ENABLE |

TABLE II-continued
DESTINATION FIELD DECODER

MICROPROCESSOR CONTROLLER EXTERNAL INTERRUPT FORMING REGISTER BYTE 2 LOAD ENABLE
MICROPROCESSOR CONTROLLER EXTERNAL INTERRUPT FORMING REGISTER BYTE 3 LOAD ENABLE
MICROPROCESSOR CONTROLLER EXTERNAL INTERRUPT FORMING REGISTER BYTE 4 LOAD ENABLE

Data thus flows from the 8-bit Arithmetic Logic Unit 838, through the Destination Bus Driver 836 to the selected register. When in this format, bit 5 of the microinstruction controls the write enable (WR EN) input of a Word Register File 844. Typically, the file 844 may comprise 16-word registers each 8 bits in length. If bit 5 of the microinstruction is a binary "1", the destination for the data becomes the word of the Register File 844 specified by bits 0 through 3 of the Microinstruction, which is selected by the Multiplexer 842. Bits 6 through 14 of the microinstruction determine the source of the data to be put on the 8-bit Source Bus 848. When bit 14 is a "0", the Microinstruction Constant Driver 834 is enabled via inverter 835, causing bits 6 through 13 of the Microinstruction to be used directly as the source data applied to the bus 848. When bit 14 is a binary "1", the output of Multiplexer 832 is enabled such that it becomes the data source. Bits 6 through 13 of the instruction word are decoded by the Source Field Decoder 830, the output of which is used to select one of 19 possible source inputs for a source Multiplexer 832.

The various source Registers from which data can be accessed are identified in the following Table III.

TABLE III
SOURCE FIELD DECODE

SELECT REGISTER
NUMBER NON-PRIORITY USERS/SUBCYCLE
END NON-PRIORITY LIST REGISTER
END PRIORITY LIST REGISTER
LAST POLL ADDRESS
POLL LIST OUTPUT
CABLE SELECTION REGISTER
NODE ADDRESS
CONTROL LINE ACTIVITY INDICATORS
CONTROL LINE INPUT LOWER BYTE
CONTROL LINE INPUT UPPER BYTE
INPUT DATA RAM ACCUMULATOR
INPUT DATA RAM CONTROL REGISTER
OUTPUT DATA RAM WORD COUNT
OUTPUT DATA RAM ADDRESS
INPUT DATA RAM UNLOAD ADDRESS
INPUT DATA RAM WORD COUNT
INPUT DATA RAM LOAD ADDRESS
MICROINSTRUCTION CONSTANT
SCREEN RAM CONTENTS REGISTER
NODE STATUS REGISTER BYTE 1
NODE STATUS REGISTER BYTE 2
NODE STATUS REGISTER BYTE 3
EXTERNAL FUNCTION HOLDING REGISTER BYTE 1
EXTERNAL FUNCTION HOLDING REGISTER BYTE 2
EXTERNAL FUNCTION HOLDING REGISTER BYTE 3
EXTERNAL FUNCTION HOLDING REGISTER BYTE 4

One of the outputs of the Source Field Decoder 830 comprises the file source enable signal which, when activated, enables the output of the 16-Word Register File 844. In this case, the data source is the register file word specified by bits 6 through 9 of the microinstruction, these being selected by the Multiplexer 842.

Bits 15 and 16 of the microinstruction control the operation of the Arithmetic Logic Unit Shift Control and Status Latch 840. During shift operations, these bits select one of four shift types; namely, 0 Fill, 1 Fill, Single Length Rotate, or Double Length Rotate. The Advanced Micro Devices 2901A Arithmetic Logic Unit integrated circuit employs two 4-bit address fields used in the manipulation of the 16 internal registers of the ALU itself. Microinstruction bits 17-20 provide the B-address field, while bits 21-24 provide the A-address field. The ALU 838 also employs two 3-bit fields to define the internal destination and source for arithmetic operations. These fields are provided by microinstruction bits 25-27 and 28-30, respectively. Bits 31-33 determine the type of arithmetic function to be executed by the ALU. Microinstruction bit 52 is used for carry control.

A Firmware Flag Decoder 824 which may comprise a 32-bit addressable latch is adapted to receive bits 35 through 39 of the microinstruction and functions to select one of these 32 flags while microinstruction bit 40 defines whether the flag is to be set or cleared. As will be explained in greater detail, these firmware flags are available to both of the control points of the node as well as for internal test by the Microprogram sequencer 814 by way of the Test Condition Multiplexer 812.

A Hardware Control Field Decoder 826 functions to translate microinstruction bits 41 through 50 to thereby develop 52 possible Hardware Control signals, these signals being set out in Table IV below.

TABLE IV
CONTROL SIGNALS

| Active State | Function |
|---|---|
| H | LOAD SCREEN RAM |
| H | CLEAR BREAKPOINT FLAG |
| H | CLEAR CONTROL LINE INPUT INDICATOR |
| H | FORCE PRIORITY POLL |
| H | ENABLE SEQUENCER |
| H | LOAD SELECT REGISTER |
| H | CLEAR POWER FAULT FLAG |
| H | CLEAR ACTIVITY MONITOR FLAGS |
| L | CLEAR DATA LINE INTERMESSAGE TIMEOUT |
| L | CLEAR PROCESSOR FLAGS |
| L | CLEAR MESSAGE TO SEND FLAG |
| L | CLEAR CONTROL LINE PARITY ERROR |
| L | CLEAR POLL/RESPONSE TIMEOUT |
| H | CLEAR SEQUENCER WAIT FLAG |
| H | SET SEQUENCER WAIT FLAG |
| H | SET FORCED COMMAND ENABLE |
| H | SET COMMAND ENABLE |
| H | SET SELECT ENABLE |
| H | SET POLL/RESPONSE ENABLE |
| H | CLEAR AUTO LOOP ERROR FLAG |
| H | POLL LIST WRITE ENABLE |
| H | ADVANCE POLL LIST |
| H | UNLOAD REQUEST QUEUE |
| H | LOAD REQUEST QUEUE WITH CONTROL LINE REG |
| H | LOAD REQUEST QUEUE WITH DESTINATION BUS |
| H | LOAD REQUEST QUEUE WITH NODE ADDRESS |
| H | RESET POLL LIST |
| H | TRANSMIT ENABLES |
| L | CLEAR USER INTERFACE |
| L | DELETE OUTPUT MESSAGE |
| H | CLEAR CONTROL LINE SYNC ERROR |
| L | CLEAR SELECT TIME FLAG |
| L | SET NODE POLLED INDICATOR |
| L | CLEAR SELECT QUEUES |

TABLE IV-continued
CONTROL SIGNALS

| Active State | Function |
|---|---|
| L | CLEAR CONTROL LINE IN QUEUE |
| L | CLEAR ENCODER INTERFACE |
| H | DISABLE SEQUENCER |
| L | CLEAR CONTROL LINE ACTIVITY TIMEOUT |
| L | CLEAR INPUT DATA ACKNOWLEDGE |
| L | SET USER OUTPUT DATA REQUEST |
| L | CLEAR USER EXTERNAL FUNCTION LOCKOUT |
| L | CLEAR USER OUTPUT DATA ACKNOWLEDGE FLAG |
| L | CLEAR USER EXTERNAL FUNCTION ACKNOWLEDGE FLAG |
| L | SET MICROPROCESSOR CONTROLLER MESSAGE COMPLETE |
| L | SET USER INPUT DATA ENABLE |
| L | SET USER EXTERNAL INTERRUPT ENABLE |
| L | ENABLE DATA LINE MESSAGE TRANSMISSION |
| L | CLEAR DATA LINE PARITY ERROR |
| L | CLEAR INCOMPLETE MESSAGE |
| L | LOCKOUT |
| L | CLEAR INCOMPLETE MESSAGE ERROR FLAG |
| L | CLEAR DATA LOST HEADER OK ERROR |
| L | CLEAR DATA LOST ALL ERROR |

These signals are active only for the instruction cycle during which they are selected. Microinstruction bit 51 is used directly to form the Priority Queue Enable signal on line 827 which specifies the particular select queue to be referenced or operated upon during a current machine cycle. Continuing, microinstruction bit 55 is set to a state which establishes odd parity for the Microinstruction word. Parity is checked by the Parity Check Circuit 822 which functions to disable the node clock in the event a parity error is detected.

TABLE V A
MAPPING PLA TRUTH TABLE

| Term | \multicolumn{16}{c}{A-Inputs} |
|---|---|---|---|---|---|---|---|---|---|---|---|---|---|---|---|---|

| Term | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | X | 1 | X | 0 | 0 | X | X | X | X | X | X | X | X | X | X | X |
| 1 | X | 0 | 1 | 0 | 0 | X | X | X | 0 | 0 | 0 | 0 | X | X | X | X |
| 2 | X | 0 | 1 | 0 | 0 | X | X | X | 0 | 0 | 0 | 1 | X | X | X | X |
| 3 | X | 0 | 1 | 0 | 0 | X | X | 0 | 0 | 0 | 1 | 0 | X | X | X | X |
| 4 | X | 0 | 1 | 0 | 0 | X | X | 1 | 0 | 0 | 1 | 0 | X | X | X | X |
| 5 | X | 0 | 1 | 0 | 0 | X | X | 0 | 0 | 0 | 1 | 1 | X | X | X | X |
| 6 | X | 0 | 1 | 0 | 0 | X | X | 1 | 0 | 0 | 1 | 1 | X | X | X | X |
| 7 | X | 0 | 1 | 0 | 0 | X | X | 0 | 0 | 1 | 0 | 0 | X | X | 0 | X |
| 8 | X | 0 | 1 | 0 | 0 | X | X | 0 | 0 | 1 | 0 | 0 | X | X | 1 | X |
| 9 | X | 0 | 1 | 0 | 0 | X | X | 1 | 0 | 1 | 0 | 0 | X | X | 0 | X |
| 10 | X | 0 | 1 | 0 | 0 | X | X | 1 | 0 | 1 | 0 | 0 | X | X | 1 | X |
| 11 | X | 0 | 1 | 0 | 0 | X | X | X | 0 | 1 | 0 | 1 | X | X | X | X |
| 12 | X | 0 | 1 | 0 | 0 | X | X | X | 0 | 1 | 1 | 0 | X | X | X | X |
| 13 | X | 0 | 1 | 0 | 0 | X | X | 0 | 0 | 1 | 1 | 1 | X | X | X | X |
| 14 | X | 0 | 1 | 0 | 0 | X | X | 1 | 0 | 1 | 1 | 1 | X | X | X | X |
| 15 | X | 0 | 1 | 0 | 0 | X | X | 0 | 1 | 0 | 0 | 0 | X | X | X | X |
| 16 | X | 0 | 1 | 0 | 0 | X | X | 1 | 1 | 0 | 0 | 0 | X | X | X | X |
| 17 | X | 0 | 1 | 0 | 0 | X | X | X | 1 | 0 | 0 | 1 | X | X | X | X |
| 18 | X | 0 | 1 | 0 | 0 | X | X | X | 1 | 0 | 0 | X | X | X | X | X |
| 19 | X | 0 | 1 | 0 | 0 | X | X | 0 | 1 | 1 | 1 | X | X | 1 | X | X |
| 20 | X | 0 | 1 | 0 | 0 | X | X | 0 | 1 | 1 | 1 | X | 0 | 0 | X | X |
| 21 | X | 0 | 1 | 0 | 0 | X | X | 0 | 1 | 1 | 1 | X | 1 | 0 | 0 | X |
| 22 | X | 0 | 1 | 0 | 0 | X | X | 0 | 1 | 1 | 1 | 0 | 1 | 0 | 1 | X |
| 23 | X | 0 | 1 | 0 | 0 | X | X | 0 | 1 | 1 | 1 | 1 | 1 | 0 | 1 | X |
| 24 | X | 0 | 1 | 0 | 0 | X | X | 0 | 1 | 1 | 1 | 0 | 1 | 0 | 1 | X |
| 25 | X | 0 | 1 | 0 | 0 | X | X | 0 | 1 | 1 | 1 | 1 | 1 | 0 | 1 | X |
| 26 | X | 0 | 1 | 0 | 0 | X | X | 1 | 1 | 1 | 0 | X | X | 1 | X | X |
| 27 | X | 0 | 1 | 0 | 0 | X | X | 1 | 1 | 1 | 0 | X | 1 | 0 | X | X |
| 28 | X | 0 | 1 | 0 | 0 | X | X | 1 | 1 | 1 | 0 | X | 0 | 0 | 0 | X |
| 29 | X | 0 | 1 | 0 | 0 | X | X | 1 | 1 | 1 | 0 | 0 | 0 | 0 | 1 | X |
| 30 | X | 0 | 1 | 0 | 0 | X | X | 1 | 1 | 1 | 0 | 1 | 0 | 0 | 1 | X |
| 31 | X | 0 | 1 | 0 | 0 | X | X | 1 | 1 | 1 | 1 | X | X | X | X | X |
| 32 | X | X | X | 1 | 0 | X | X | X | X | X | X | X | X | X | X | X |
| 33 | X | X | X | X | 1 | X | X | X | X | X | X | X | X | X | X | X |
| 34 | X | 0 | 0 | 0 | 0 | 1 | X | X | X | X | X | X | X | X | X | 0 |
| 35 | X | 0 | 0 | 0 | 0 | 1 | X | X | X | X | X | X | X | X | X | 1 |
| 36 | X | 0 | 0 | 0 | 0 | 0 | 1 | X | X | X | X | X | X | X | X | X |
| 37 | X | 0 | 0 | 0 | 0 | 0 | 0 | X | X | X | X | X | X | X | X | X |

TABLE V B
MAPPING PLA STATE DESCRIPTIONS

| TERM | DESCRIPTION |
|---|---|
| 0 | FAULT/ERROR DETECTED |
| 1 | CONTROL LINE INPUT - DISABLE |
| 2 | CONTROL LINE INPUT - START |
| 3 | CONTROL LINE INPUT - ASSIGN BUS CONTROL |
| 4 | CONTROL LINE INPUT - ILLEGAL COMMAND FUNCTION CODE = 2 ADDRESSING MODE BIT = 1 |

TABLE V B-continued

MAPPING PLA STATE DESCRIPTIONS

| TERM | DESCRIPTION |
|---|---|
| 5 | CONTROL LINE INPUT - CHANNEL CONTROL |
| 6 | CONTROL LINE INPUT - ILLEGAL COMMAND FUNCTION CODE = 3 ADDRESSING MODE BIT = 1 |
| 7 | CONTROL LINE INPUT - STATUS REPLY - NOT WAITING |
| 8 | CONTROL LINE INPUT - STATUS REPLY - WAITING => IGNORE |
| 9 | CONTROL LINE INPUT - STATUS REQUEST - NOT WAITING |
| 10 | CONTROL LINE INPUT - STATUS REQUEST - WAITING |
| 11 | CONTROL LINE INPUT - ILLEGAL COMMAND FUNCTION CODE = 5 |
| 12 | CONTROL LINE INPUT - ILLEGAL COMMAND FUNCTION CODE = 6 |
| 13 | CONTROL LINE INPUT - ILLEGAL COMMAND FUNCTION CODE = 7 ADDRESSING MODE BIT = 0 |
| 14 | CONTROL LINE INPUT - BIT #1 |
| 15 | CONTROL LINE INPUT - ILLEGAL COMMAND FUNCTION CODE = 8 ADDRESSING MODE BIT = 0 |
| 16 | CONTROL LINE INPUT - BIT #2 |
| 17 | CONTROL LINE INPUT - ILLEGAL COMMAND FUNCTION CODE = 9 |
| 18 | CONTROL LINE INPUT - ILLEGAL COMMAND FUNCTION CODE = 10, 11 |
| 19 | CONTROL LINE INPUT - RESPONSE - DISABLED => IGNORE |
| 20 | CONTROL LINE INPUT - RESPONSE - $\overline{\text{BUS CONTROLLER}}$ => INTERNAL HARDWARE ERROR |
| 21 | CONTROL LINE INPUT - RESPONSE - BUS CONTROLLER - NOT WAITING => UNEXPECTED POLL RESPONSE |
| 22 | CONTROL LINE INPUT - NODE FAULT RESPONSE - BUS CONTROLLER - WAITING |
| 23 | CONTROL LINE INPUT - NO REQUEST RESPONSE - BUS CONTROLLER - WAITING |
| 24 | CONTROL LINE INPUT - NORMAL BUS REQUEST - BUS CONTROLLER - WAITING |
| 25 | CONTROL LINE INPUT - IMMEDIATE BUS REQUEST - BUS CONTROLLER - WAITING |
| 26 | CONTROL LINE INPUT - POLL OR SELECT - DISABLED => IGNORE |
| 27 | CONTROL LINE INPUT - POLL OR SELECT - BUS CONTROLLER - $\overline{\text{DISABLED}}$ => ILLEGAL POLL OR SELECT |
| 28 | CONTROL LINE INPUT - POLL OR SELECT - $\overline{\text{BUS CONTROLLER}}$ - $\overline{\text{DISABLED}}$ - NOT WAITING => ERROR |
| 29 | CONTROL LINE INPUT - POLL - $\overline{\text{DISABLED}}$ - $\overline{\text{BUS CONTROLLER}}$ - WAITING => LEGAL POLL |
| 30 | CONTROL LINE INPUT - SELECT - $\overline{\text{DISABLED}}$ - $\overline{\text{BUS CONTROLLER}}$ - WAITING => LEGAL SELECT |
| 31 | CONTROL LINE INPUT - ILLEGAL COMMANDS FUNCTION CODE = 14, 15 ADDRESSING MODE BIT = 1 |
| 32 | USER ACTIVITY DETECTED |
| 33 | MICROPROCESSOR CONTROLLER ACTIVITY DETECTED |
| 34 | NORMAL MESSAGE TO SEND |
| 35 | IMMEDIATE MESSAGE TO SEND |
| 36 | DEFERRED TASK TO EXECUTE |
| 37 | NO TASKS REQUIRE SERVICE |

TABLE V C

MAPPING PLA INPUTS

| | |
|---|---|
| A15 | NOT USED |
| A14 | ERROR FLAG |
| A13 | CONTROL LINE INPUT FLAG |
| A12 | USER ACTIVITY FLAG |
| A11 | MICROPROCESSOR CONTROLLER INTERRUPT FLAG |
| A10 | MESSAGE TO SEND FLAG |
| A9 | DEFERRED TASK FLAG (FIRMWARE FLAG 3) |
| A8 | PROCESSOR CONTROL LINE INPUT QUEUE BIT 2 (ADDRESSING MODE BIT) |
| A7 | PROCESSOR CONTROL LINE INPUT QUEUE BIT 6 (FUNCTION CODE 3) |
| A6 | PROCESSOR CONTROL LINE INPUT QUEUE BIT 6 (FUNCTION CODE 2) |
| A5 | PROCESSOR CONTROL LINE INPUT QUEUE BIT 4 (FUNCTION CODE 1) |
| A4 | PROCESSOR CONTROL LINE INPUT QUEUE BIT 3 (FUNCTION CODE 0) |
| A3 | BUS CONTROLLER (FIRMWARE FLAG 2) |
| A2 | DISABLE (FIRMWARE FLAG 1) |
| A1 | WAITING FOR POLL/RESPONSE FLAG |
| A0 | NORMAL (0)/IMMEDIATE (1) MESSAGE |

Reviewing momentarily, it can be seen from an analysis of the Microinstruction and the manner in which its individual bits are assigned to different functions that the Microprogrammable Controller possesses the following capabilities:

(1) It executes a general purpose stored program;

(2) It can be directed to specific processing tasks via the Mapping PLA;

(3) It can interchange data with various node registers via the source and destination buses;

(4) It can issue control signals to the node; and (5) It can sense the status of various node parameters.

MAPPING PLA

Figure 4:
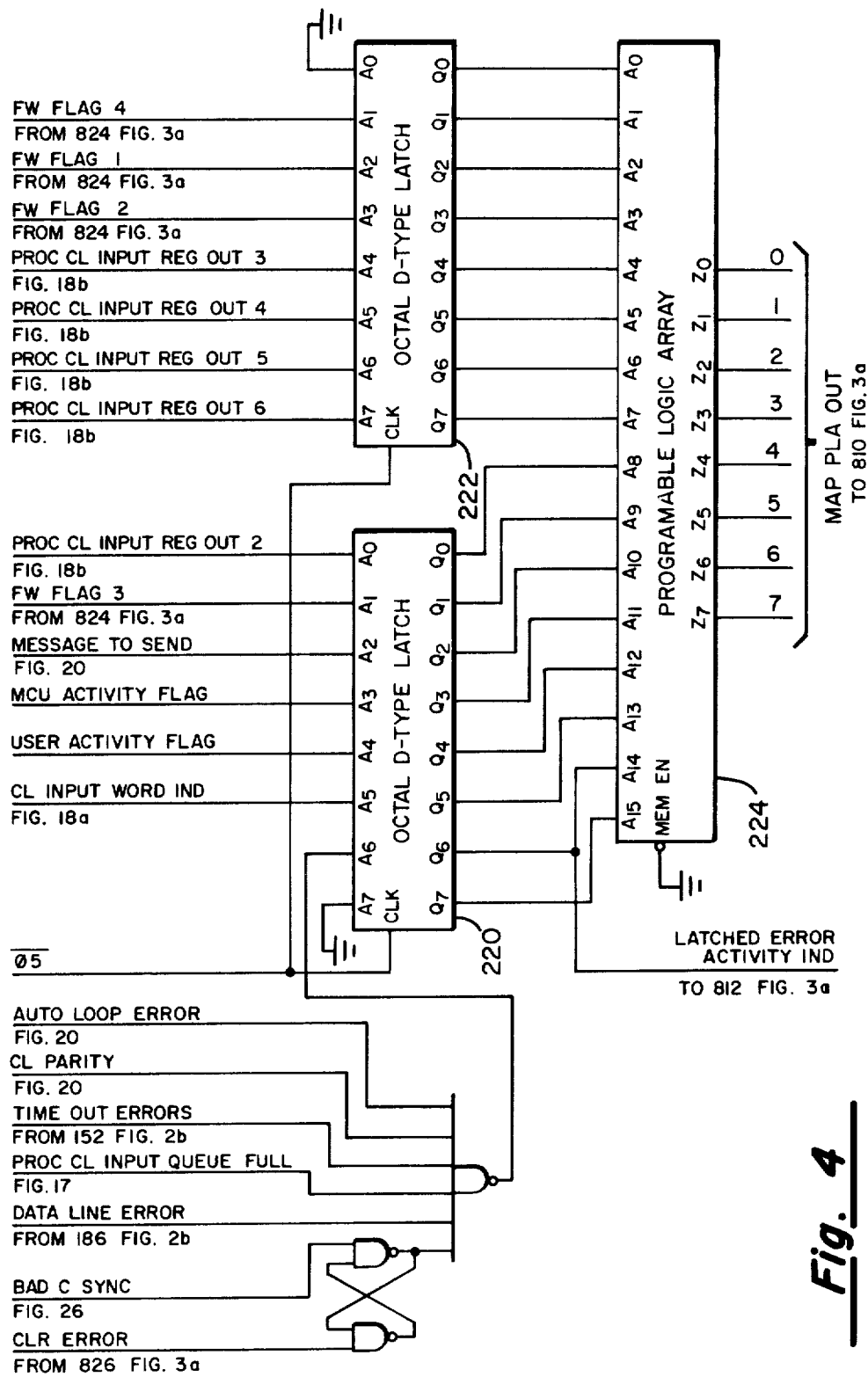
FIG. 4 illustrates by means of a logic diagram the Mapping PLA used in the node.

All firmware tasks executed by the Microprogrammable Controller are initiated via the Mapping Programmable Logic Array (PLA) 158 in FIG. 2b. When the performance of a specific task is required, the PLA generates an output which corresponds to the starting address of that task. As is shown in FIG. 4, the Mapping PLA 224 is driven by the output of octal latches 220 and 222. Each clock phase 5 timing signal latches the data on their respective input lines to generate a specific PLA output. If, on the next cycle, the Microprogrammable Controller executes a branch instruction with bit 19 of the Microinstruction Register set, it will branch to any one of 38 possible addresses determined by the various combinations of the inputs to latches 220 and 222. The so-called truth table for the Mapping PLA 224 is shown in Table VA below. Any combination of inputs A0 through A15 results in one of 38 PLA terms, each one corresponding to a unique output address labeled Z0 through Z7. Table VB is indicative of the task to be performed for each term while Table VC indicates the interpretation of inputs A0 through A15.

Inputs A9 through A14 can be considered to be the activity group. When all of these inputs are binary 0's and the Microprogrammable Controller has completed its previous task, it will go into an idle loop corresponding to Term 37 in Table VB. The PLA is programmed such that when any one of these lines goes high the appropriate task is initiated and, in the event that more than one line in this group goes high in a given cycle, a priority scheme is invoked to resolve the order in which the tasks will be executed. The highest priority activity is an interrupt from the Maintenance Control Unit (MCU) on input A-11. It will unconditionally generate output Term 33. The next highest priority is "user activity" on input A-12. It will generate output Term 32 conditional only on a 0 on input A-11. The next priority activity is the so-called "Error Flag" associated with input A-14 which will generate as its output Term 0 whenever inputs A-11 and A-12 are 0. This error flag will be generated by a 1 at any input of NOR gates 200,202,204,206 or 208.

The next highest priority is associated with the "control line input flag"-input A-13. This will cause one of the output Terms from 1 to 31 in Table VB to be generated where the specific term is determined by the states of the inputs A-1 through A-8 in Table VA. Inputs A-4 through A-8 are from the Control Word received from another transmitting node in the system. Inputs A-4 through A-7 represent the 4-bit control line function code while input A-8 is the so-called "addressing mode bit". When input A7 is a "0", the function code is a command resulting in output states defined by Terms 1 through 14 in Table VB. If inputs A-7 and A-6 are 1's, however, the function code is either a poll, a select or a response corresponding to the output states defined by Terms 19 through 31. Note that output terms are generated for both valid and invalid input codes.

Inputs A-0 through A-3 are driven by firmware flags and define the state that the node is in. For example, if input A-3 is a "0", the node is not functioning as the Bus Controller and therefore tasks will be initiated upon receipt of a poll or other bus commands. However, if input A-3 is a "1", the particular node is functioning as the Bus Controller and a task will be initiated upon receipt of a response during normal operation. Next in order of priority activity is the Message-to-Send flag input A-10 which results in either the output state defined by Term 34 or Term 35, depending on the binary value of input A-0. Finally, the lowest priority activity is associated with the Deferred Task Flag input A9 which results in output Term 36. The use of a PLA to analyze these inputs greatly improves the response to the Microprogrammable Controller to either polls or responses, since no firmware overhead is required to test for abnormal conditions. This feature is essential to achieving the high polling rate inherent in the preferred embodiment described herein.

TIME FOR SELECT FLAG

Figure 5A:
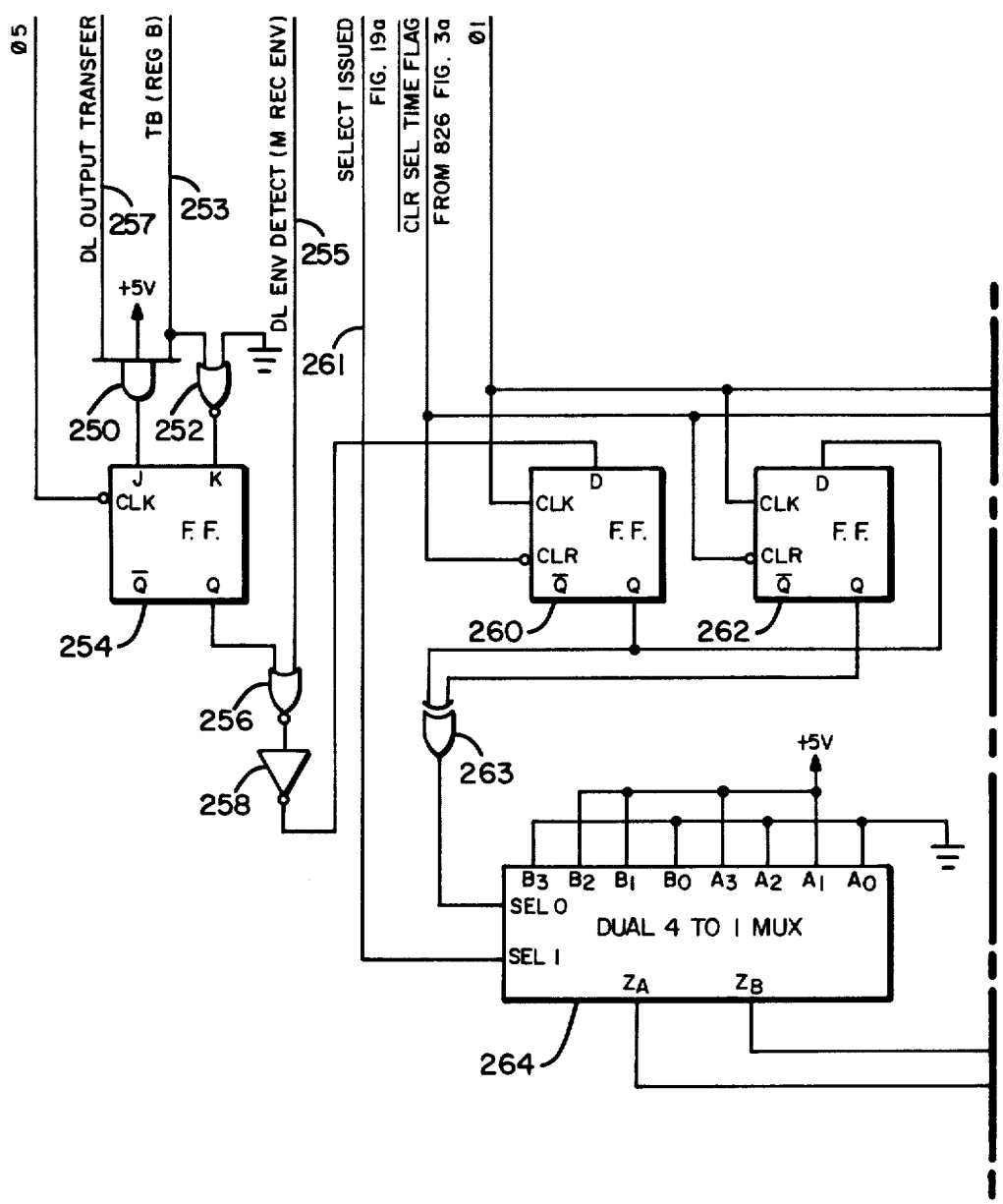
Figure 5B:
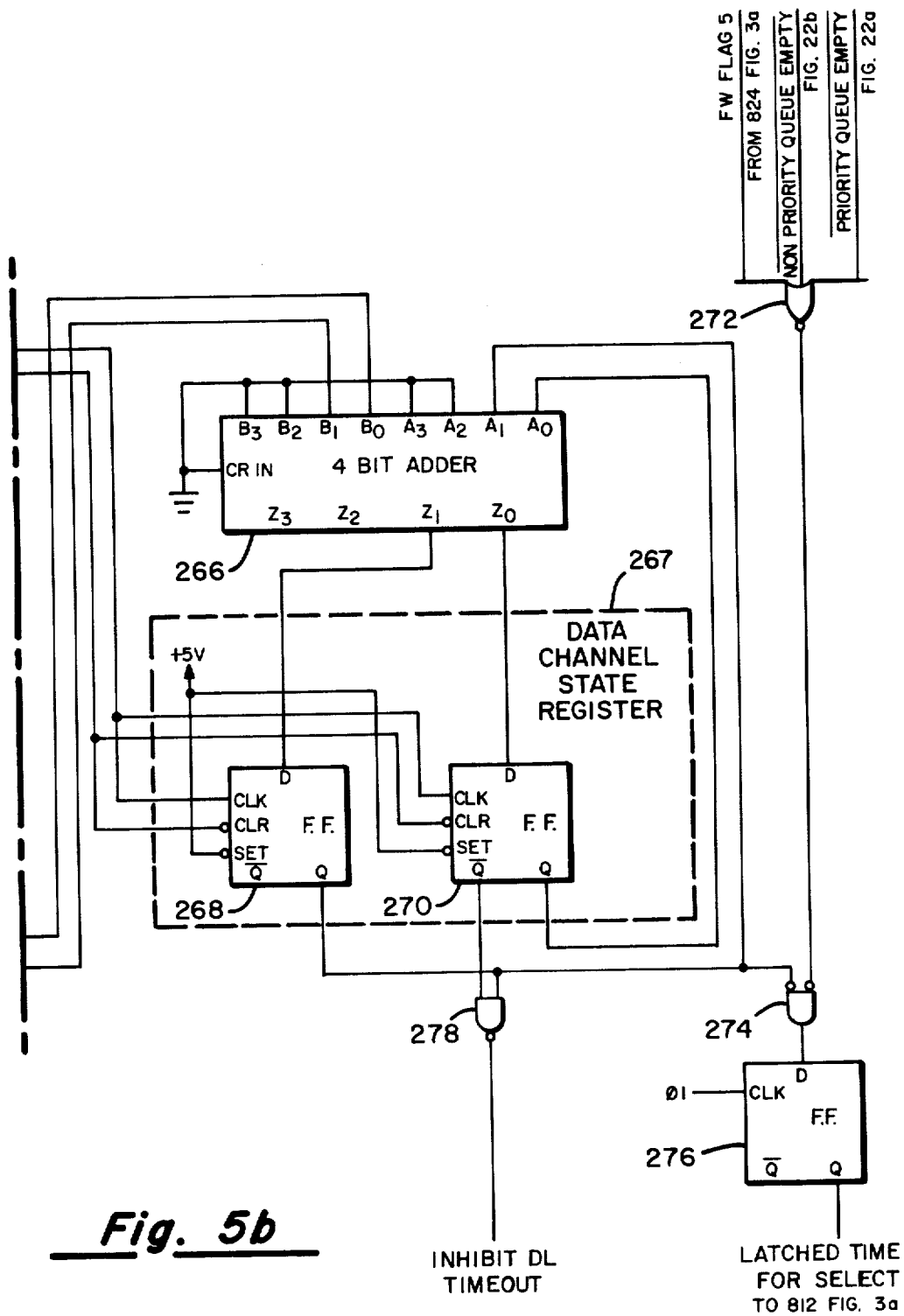

Referring next to FIGS. 5a and 5b, there is shown by means of a logic diagram the circuitry employed to generate the so-called Time-for-Select flag. It is this flag which is interpreted by the Microprogrammable Controller to indicate that, acting as the Bus Controller, it can now authorize another node to use the data channel. Toward this end, the Data Channel State Register shown enclosed by dashed line box 267 is comprised of two D-type flip-flops 268 and 270 which, together, may exist in four separate states, to wit:

(1) State 0—No activity currently exists on the data channel and no node has been authorized to use the channel.

(2) State 1—A select has been issued to a node and that node is currently using the data channel.

(3) State 2—A select has been issued to a node but that node has not begun to use the data channel.

(4) State 3—A select has been issued to a second node during the transmission sequence of the previously selected node.

The foregoing states are controlled by the signals on the Select Issued line 261 which connects to a "select" input of a dual 4 to 1 multiplexer 264 and by the "data line activity indicators" which control the setting of flip-flops 260 and 262 (FIG. 5a). When a message is transmitted by another node, it is detected at the bus input causing the Data Line Envelope Detect (Message Receive Envelope) line 255 to go high, such that the output from inverter 258 also goes high. If the node under consideration itself initiates a message transmission, the Data Line Output Transfer line 257 goes high and when the TB (Register B) line 253 also goes high, AND gate 250 is enabled. Thus, on clock phase 5, flip-flop 254 is set, causing the output from inverter 258 to go high. This condition prevails until the Data Line Output Transfer line 257 again goes low, indicating the end of the message transmission, after which the flip-flop 254 is clocked to its reset state. It can be seen, then, that the output from inverter 258 is high whenever the data line is active. The output from inverter 258 is passed through a 2-bit shift register comprised of the flip-flops 260 and 262 which are clocked by the phase 1 clock pulse. On the leading edge of the message, the flip-flop 260 will be set while flip-flop 262 remains reset, thereby causing the output of the Exclusive OR circuit 263 to be a binary "1" for a single clock pulse interval in that on the next clock pulse, both flip-flops 260 and 262 will be set. Similarly, on the trailing edge of the message, flip-flop 260 resets while flip-flop 262 remains set, such that the output from the Exclusive OR gate will again go positive for a single cycle. The output from the Exclusive OR circuit 263 can thus be considered as a form of edge detection for the message. It forms the lower order bit selection for the dual four-to-one multiplexer 264. The higher order bit selection of this multiplexer is governed by the Select Issued line 261 which goes positive for one clock period each time a select-type control transmission is issued.

The inputs to multiplexer 264 are hard wired to generate a unique 2-bit output for all four possible combinations of the selection inputs. This output is presented to the B-inputs of a 4-bit adder network 266. The A-inputs of this adder come from the outputs of the Data Channel State Register 267 and the outputs of the adder 266 are, in turn, applied as inputs to that same register. Thus, on the leading edge of each phase 1 clock pulse, the output of the multiplexer 264 is added to the contents of the Data Channel State Register and the resulting sum is stored back in that register. If these has been no "Select Issued" signal on line 261 and no message edge (leading or trailing) detected, the output from multiplexer 264 will be 0,0 and the Data Channel State Register 267 will have its contents remaining unchanged. If there is a "Select Issued" generated, but no edge detected, the output from multiplexer 264 will be 1,0 and the Data Channel State Register will thus be incremented by 2. When a message edge is detected, but a "select" has not been issued, the output of multiplexer 264 will be 1,1 which will have the effect of decrementing the Data Channel State Register by 1. If a "select" is issued simultaneously with a message edge detection, the output of multiplexer 264 will be 0,1, thus incrementing the Data Channel State Register 267.

If Firmware Flag #5 is set, or if either the Priority or Nonpriority queues are not empty, the NOR gate 272 will output a low signal indicating that a select is required as soon as the message line becomes available. The output of NOR gate 272 is used to partially enable the negative NAND gate 274 so that whenever the flip-flop 268 is reset indicating a data channel state of 1 or 0, it will be fully enabled. Thus, on the next phase 1 clock pulses, flip-flop 276 will output a high signal at its Q output, thus indicating the Latched Time for Select signal. This method of data line selection minimizes the firmware response time required to generate the next "select" transmission when the data line activity of the current select has been sensed. As such, in most cases, the next node to be selected will have received the Select command and will be ready to transmit its message at the end of the current message. Hence, intermessage dead time, which reduces channel capacity, is effectively avoided.

CONTROL LINE OUTPUT

Figure 6A:
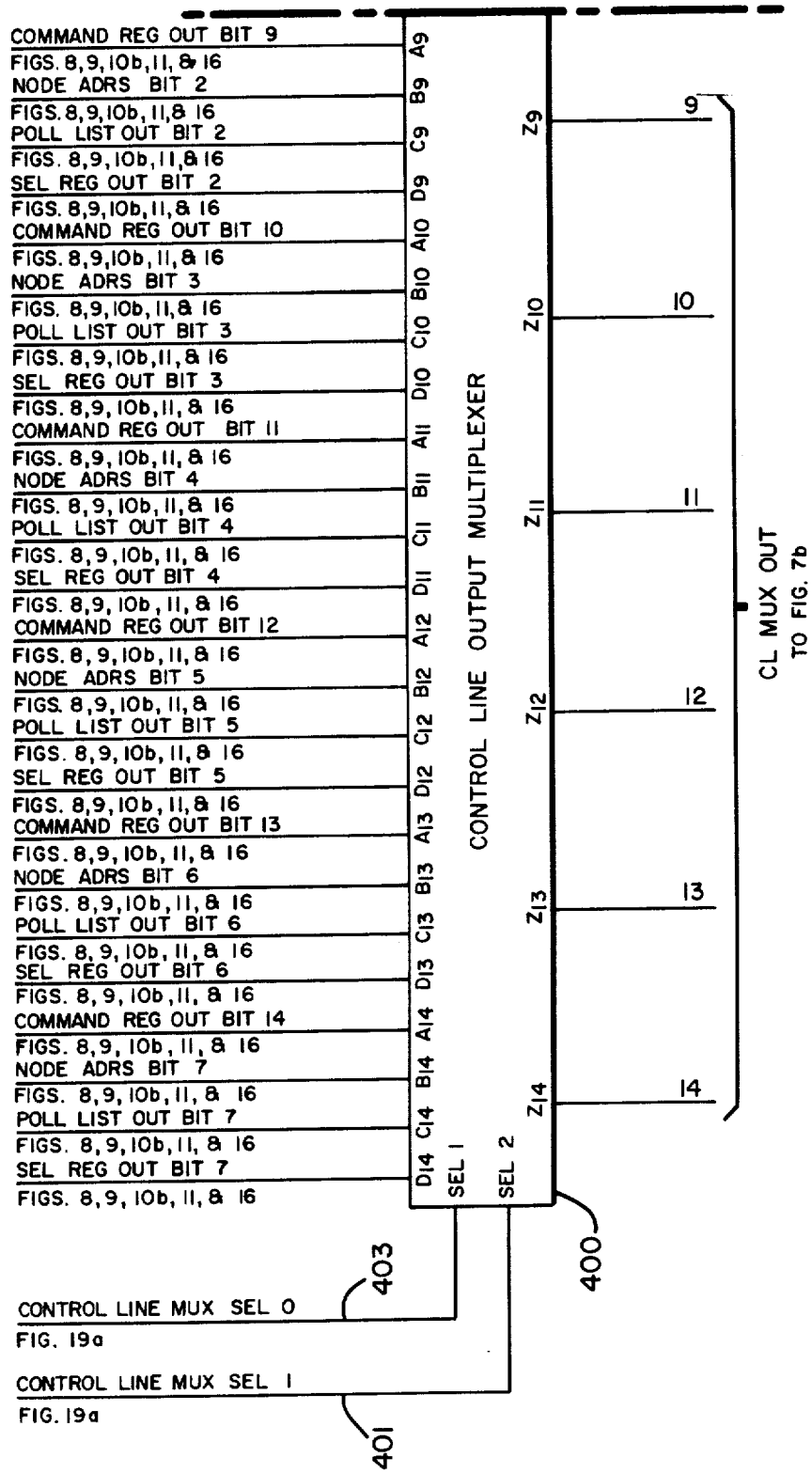
Figure 7A:
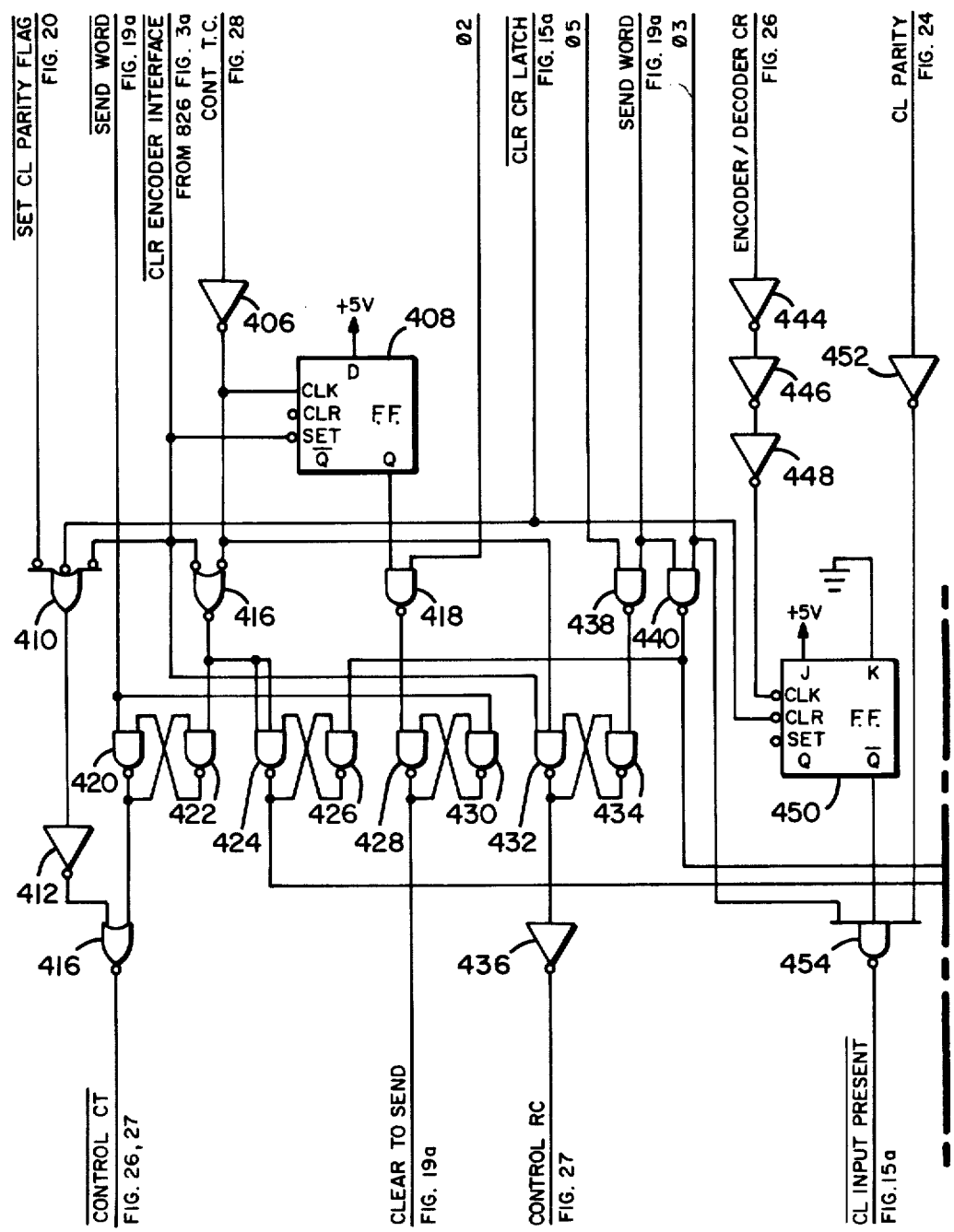
Figure 7B:
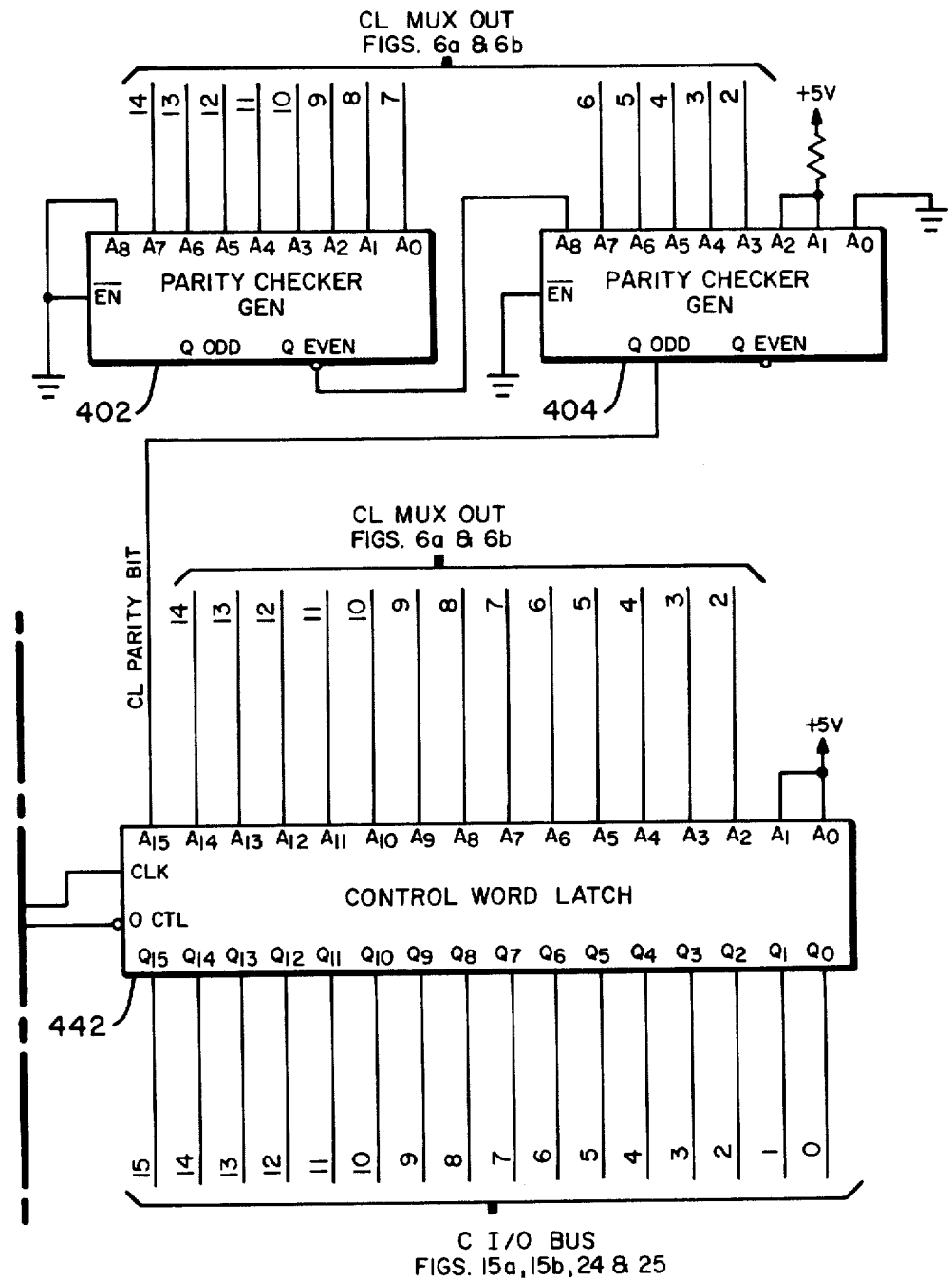

Referring again to the overall system block diagram of FIG. 2 and particularly to FIG. 2a, there are four sources of Control Line output words, namely, the Command Register 136, the Response Register 138, the Poll List 140 and the Select Queue Register 142. Selection of the Control Word source is determined by Control Line Output Multiplexer 400 in FIG. 6a. These selections correspond to the states of 0,0; 0,1; 1,0; and 1,1 of Control Line Mux select lines 401 and 403. The Control Line Output Multiplexer outputs Z2 through Z14 to the corresponding inputs of the Control Word Latch 442 (FIG. 7b). Inputs A0 and A1 of latch 442 (FIG. 7b) are forced to the 1 state by virtue of being connected to a +5 V source. A0 provides the "sync" bit while A1 identifies the transmission as a control word. Input A15 of latch 442 is the parity bit generated by a Parity Generator 402 and 404.

Control word transmission is initiated by the "Send Word" signal which is initiated on clock phase 1 by the Control Line Sequencer PLA 144. On clock phase 3, NAND gate 440 is enabled causing the output of NAND 424 to go low and to latch in that condition via cross-coupled NAND gate 426. This enables the tri-state outputs of the Control Word Latch 442. On the trailing edge of clock phase 3, the output of NAND gate 440 goes positive, clocking latch 442 and putting the output of the Control Line Multiplexer on the CIO bus 132. Subsequently, clock phase 5 enables NAND gate 438 which causes the output of NAND gate 432 to go low and latch via cross-coupled NAND gate 434. This generates the "Control RC" signal at the output of inverter 436 which initiates the Control Line Encoder 130. At the end of the control word transmission, the "Control TC" signal resets the "Control RC" signal via inverter 406 and NAND gate 432. When the Control word has been latched in the Control Line Encoder, the "CONTROl CT" signal causes the output of NAND gate 432 to go high and latch via NAND gate 434, thereby clearing the "Control RC" signal. During initialization or after a fault condition, this function is accomplished by the "CLEAR ENCODER INTERFACE" signal. (See Table IV.)

Figure 8:
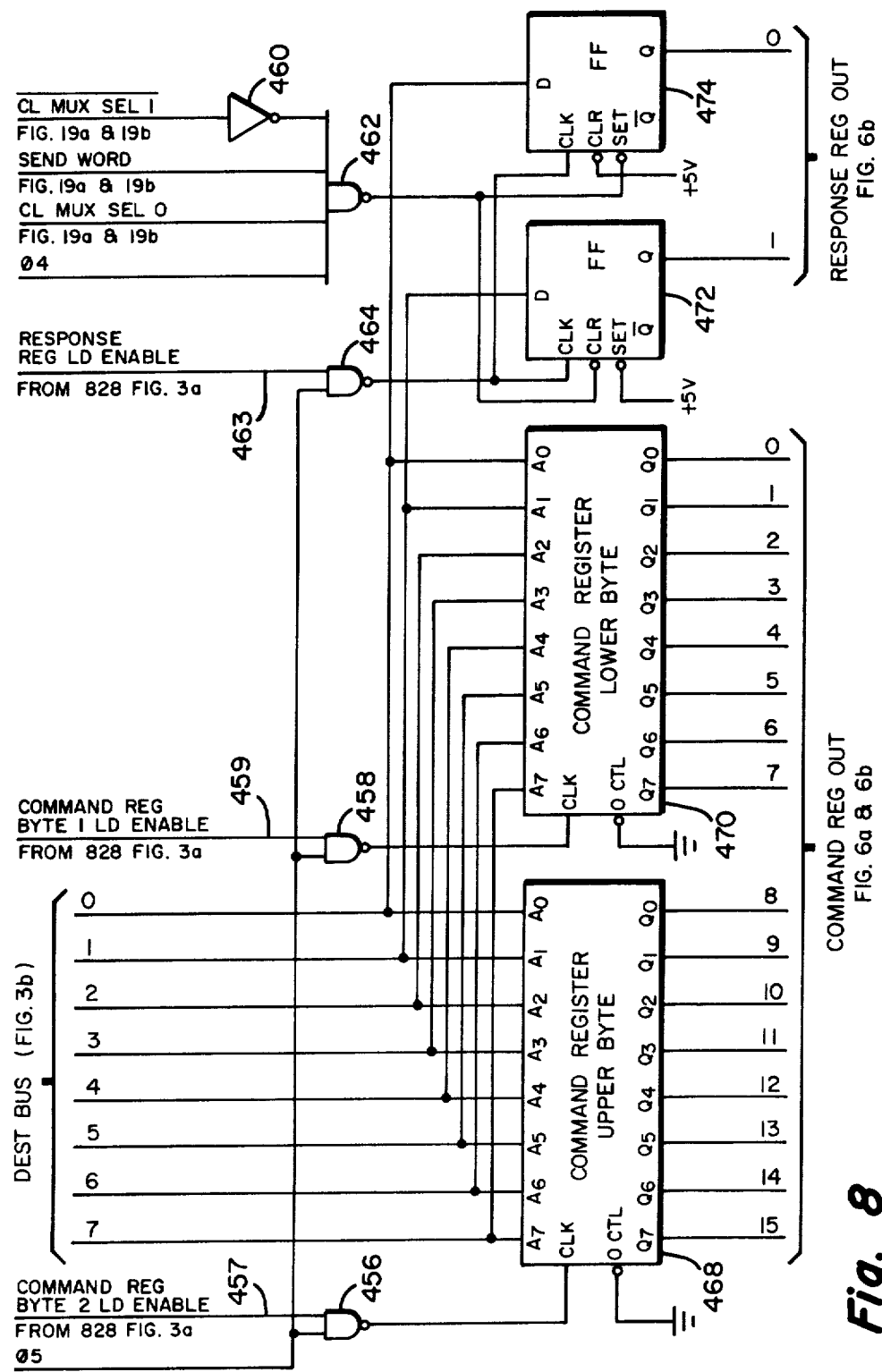
FIG. 8 illustrates by means of a logic diagram the command registers forming a portion of the Control Line Output Circuitry.

Flip-flops 472 and 474 (FIG. 8) comprise the 2-bit Response Register 138 of FIG. 2a. The Response Register provides the code from the responding node to inform the Bus Controller or polling node of its status. The four possible responses, i.e., a "Node Fault" response, a "No Request" response, a "Normal Bus Request" and an "Immediate Bus Request", are encoded 0,0; 0,1; 1,0 and 1,1, respectively. These codes will be interpreted by inputs A4 and A5 of the Mapping PLA of the controlling node. The Response Register is not used by the Bus Controller node. The Response Register is loaded from the Microprogrammable Controller via the two least significant bits carried by the Destination Bus. When the Response Register Load Enable Line 463 is selected, a phase 5 clock pulse will load the data off bits 0 and 1 of the Destination Bus into the Response Register (See FIG. 8). Immediately after the response word has been loaded into the Control Word Latch 442, a phase 4 clock pulse will complete the enable of NAND gate 462, thus clearing the Response Register comprised of flip-flops 472 and 474. This action leaves the value 0,1 stored in the Response Register, corresponding to the "No Request" response. Thus, if no action is taken by the Microprogrammable Controller to reload the register before the next poll, the "No Request" response will be issued.

Figure 6B:
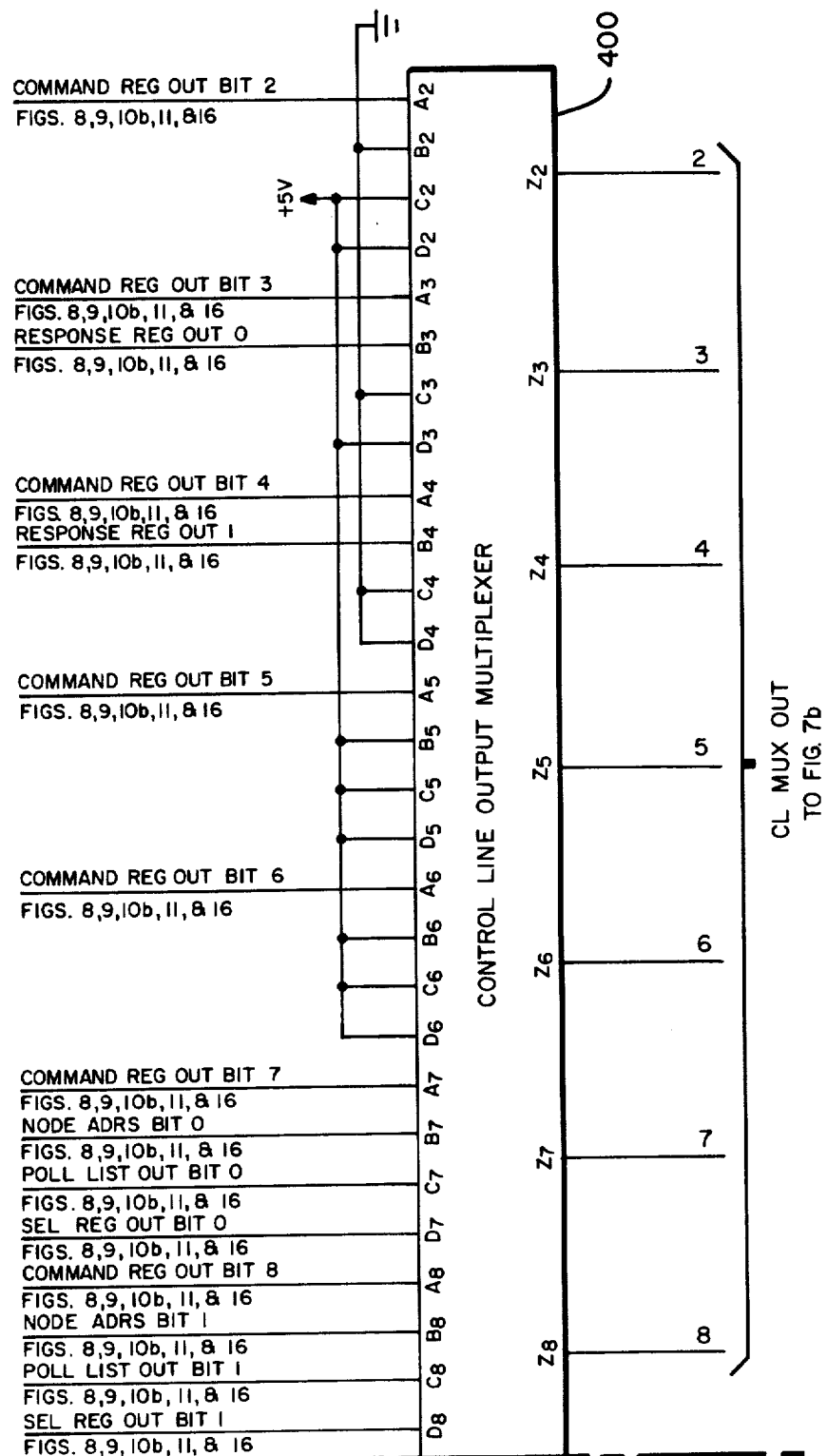

The format for the response word requires that bit 2 thereof be a 0, that bits 5 and 6 be 1's and, further, that bits 7 through 14 contain the address of the responding node. As can be seen from FIG. 6b, B2 is forced to 0 (ground) while the inputs B5 and B6 are forced to 1's (+5 V). Inputs B3 and B4 to the Control Line Output Multiplexer 400 are the 2-bit response code from flip-flops 472 and 474. Inputs B7 through B14 are node address bits 0 through 7, respectively.

Figure 9:
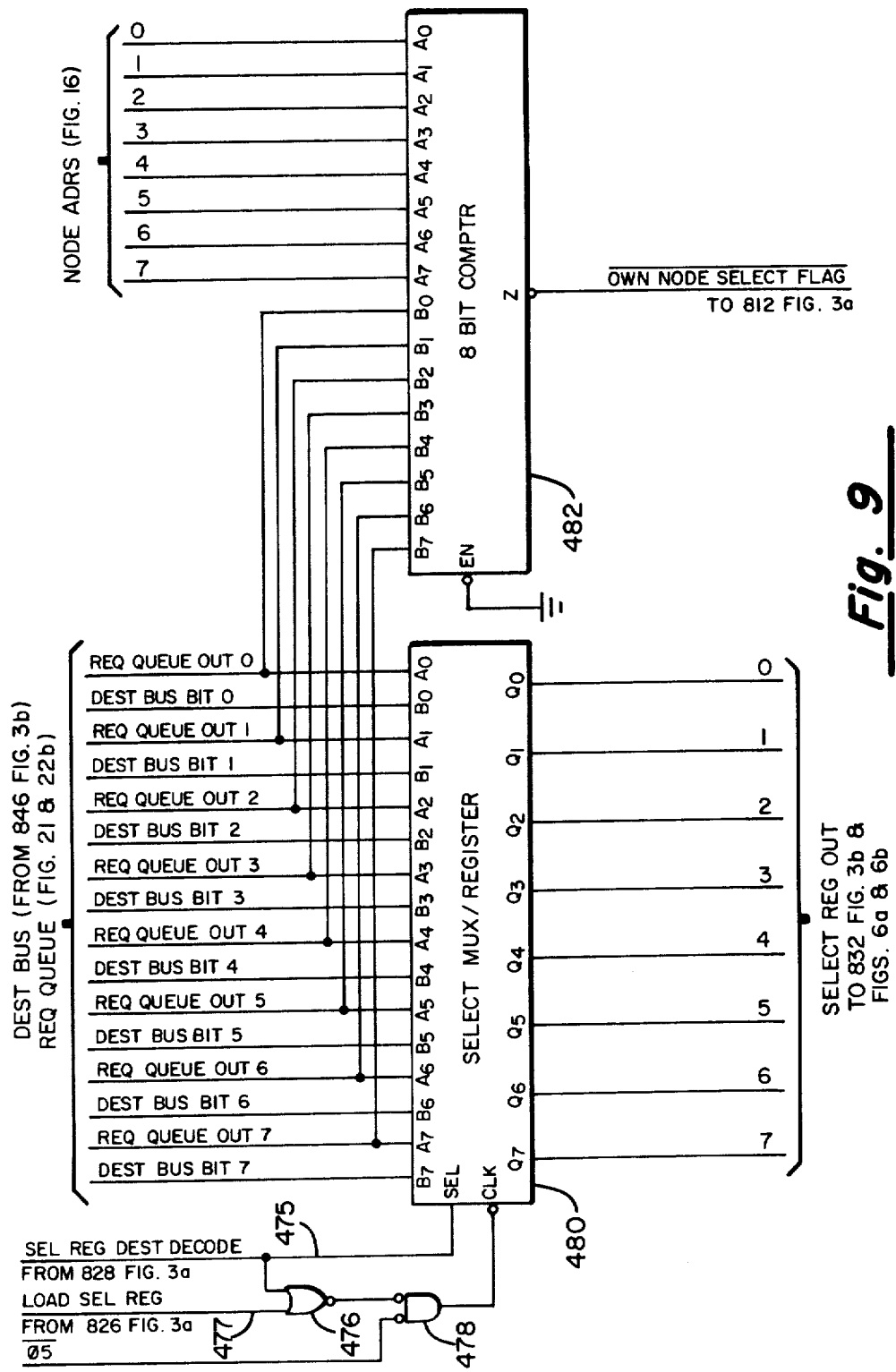
FIG. 9 illustrates the circuitry for implementing the Select Multiplexer/Register and Comparator portions of the Control Line Output Circuitry.

Registers 468 and 470 constitute the upper and lower bytes of the 16-bit Command Register 136 in FIG. 2a. The register is loaded, one byte at a time, from the Microprogrammable Controller via the Destination Bus. When Command Register Byte 2 Load Enable line 457 is selected, a subsequent clock phase 5 pulse enables NAND gate 456 to load the upper byte. Similarly, a Command Register Byte 1 Load Enable on line 459 will cause the lower byte to be loaded. The format for a command word requires that bit 6 be a 1. Bits 3, 4 and 5 are the command code, while bit 2 indicates the addressing mode. If bit 2 is a 0, the command will be broadcast to all nodes. If it is a 1, the command will be broadcast to the addressed node where this address is contained in bits 7 through 14 of the command word. The Command Register outputs correspond to the A inputs of Control Line Output Multiplexer 400 of FIGS. 6a and 6b. The Select Multiplexer/Register 480 of FIG. 9 is a digital storage device which can be loaded from two sources via its A and B inputs. If the Select Register Destination Decode line 475 carries a 0 and the Load Select Register line 477 is selected, the next phase 5 clock pulse will enable negative AND gate 478 to thereby clock register 480. In this case, the outputs of the Select Register Queue corresponding to the A inputs of the multiplexer 480 will be loaded into the register. This is the condition for a "Normal" bus request. If the Microprogrammable Controller is processing an "Immediate" bus request, the Select Register Destination Decode line 475 will be set high, thus causing the contents of the Destination Bus (corresponding to the B inputs of the multiplexer) to be loaded into register 480, thus allowing the immediate bus request to gain precedence over previously queued selects.

The contents of register 480 can be sensed by the Microprogrammable Controller via the Source Multiplexer 832 of FIG. 3b. The control word format for a "select" requires that bits 2, 3, 5 and 6 each be a 1 and that bits 7 through 14 contain the address of node to be selected. Referring to multiplexer 400 in FIGS. 6a and 6b, it is to be noted that the D-inputs thereto correspond to the select mode. Inputs D2, D5 and D6 are forced to 1's while inputs D7 through D14 are connected to the output of the Select Register 480. The format for the poll control word also requires that bits 2, 5 and 6 be set. It is distinguished from the select word only by the different response code as previously mentioned. The poll word corresponds to the C inputs of multiplexer 400. Inputs C2, C5 and C6 are all forced to 1's. Inputs C7 through C14 are connected to the outputs of the Poll List, which provides the address of the node to be polled. This method of generating control word outputs is significant in maintaining a high degree of control line bus utilization. Whenever a control word is transmitted, the next control word of that type is computed and loaded into the corresponding register. Thus, it can be automatically sent, as required, under control of the Control Line Sequencer PLA 144 in FIG. 2a. This eliminates any dead time that would otherwise be required for processing overhead. One of the features of the present system is that the Bus Controller's responsibility is assignable to various nodes. This requires that each node, when in the Bus Controller role, be able to sense when it is itself being selected. This is the function of comparator 482 which compares the output of the Select Queue FIFO's 811 and 819 in FIGS. 22a and 22b to the node address, thus generating the "Own Node Select Flag". When this condition is detected, the Microprogrammable Controller suppresses the transmission of the select word and handles the select internally in its own firmware.

POLL LISTS

It is the Poll Lists which determine the order in which the Bus Controller polls all nodes, including itself. The polling order is contained in the user computer and is loaded into various registers and memories of the Poll Lists via the Microprogrammable Controller. Once this information has been entered into the poll lists, polling proceeds as previously described. The Priority Poll List contains the node addresses of up to 16 priority nodes, while the Non-priority Poll List contains the node addresses of all other nodes utilized in the system. The polling process proceeds as follows:
(1) Priority nodes are sequentially polled until the end of the Priority Poll List is reached;
(2) Starting at the top of the Non-priority Poll List, a specified number of non-priority nodes are polled where this number is referred to as the sub-cycle count;
(3) All priority nodes are again polled;
(4) Polling of non-priority nodes resumes at the point after the last non-priority poll and continues until the sub-cycle count is reached;
(5) Polling alternates between priority and non-priority polls until the end of the Non-priority List is reached; and
(6) Non-priority polling starts at the top of the Non-priority List.

It can be seen then that the information required to initialize the poll lists consists of:
(a) The poll addresses;
(b) The number of priority polls;
(c) The number of non-priority polls; and
(d) The sub-cycle count.

Figure 10A:
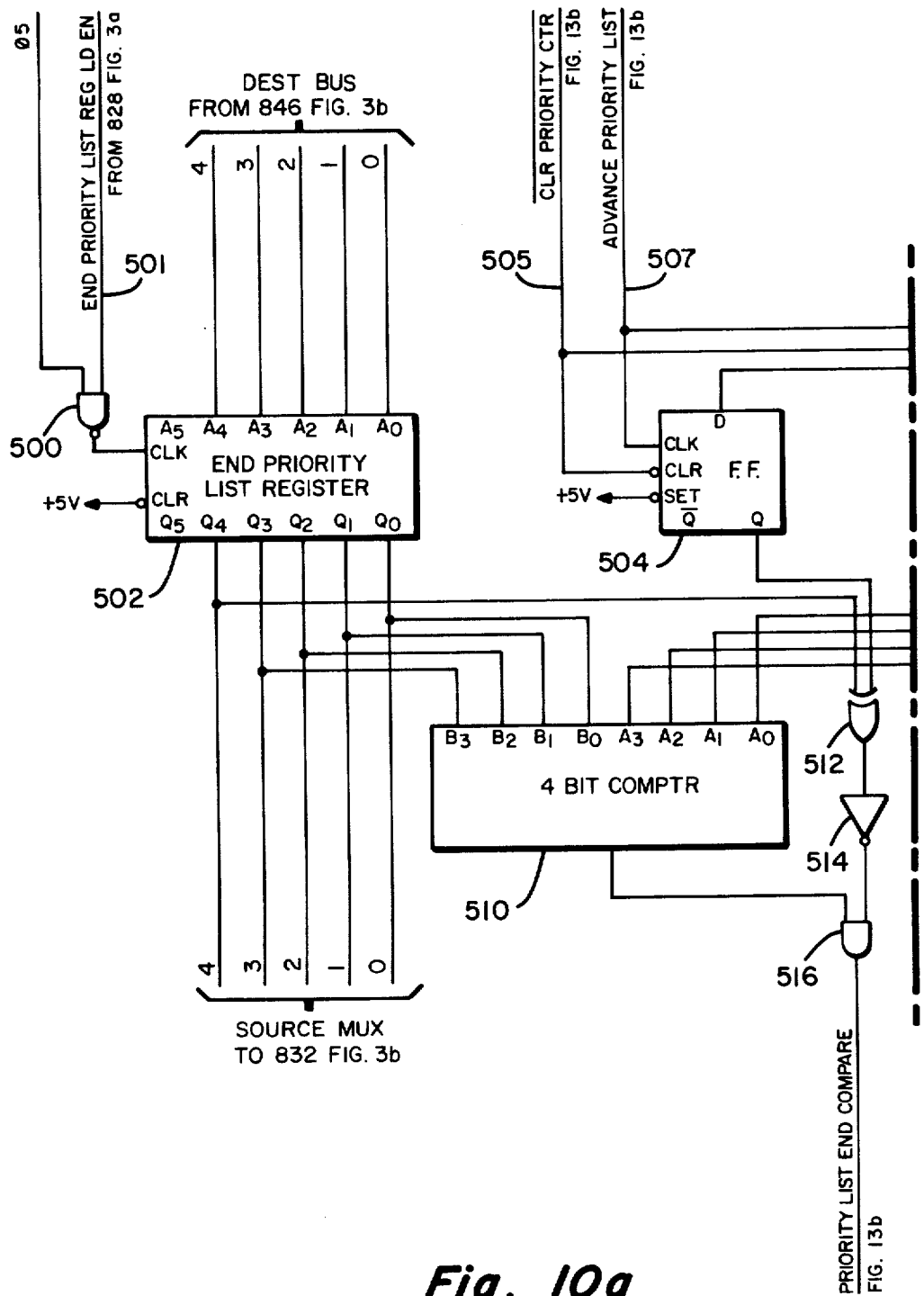
Figure 10B:
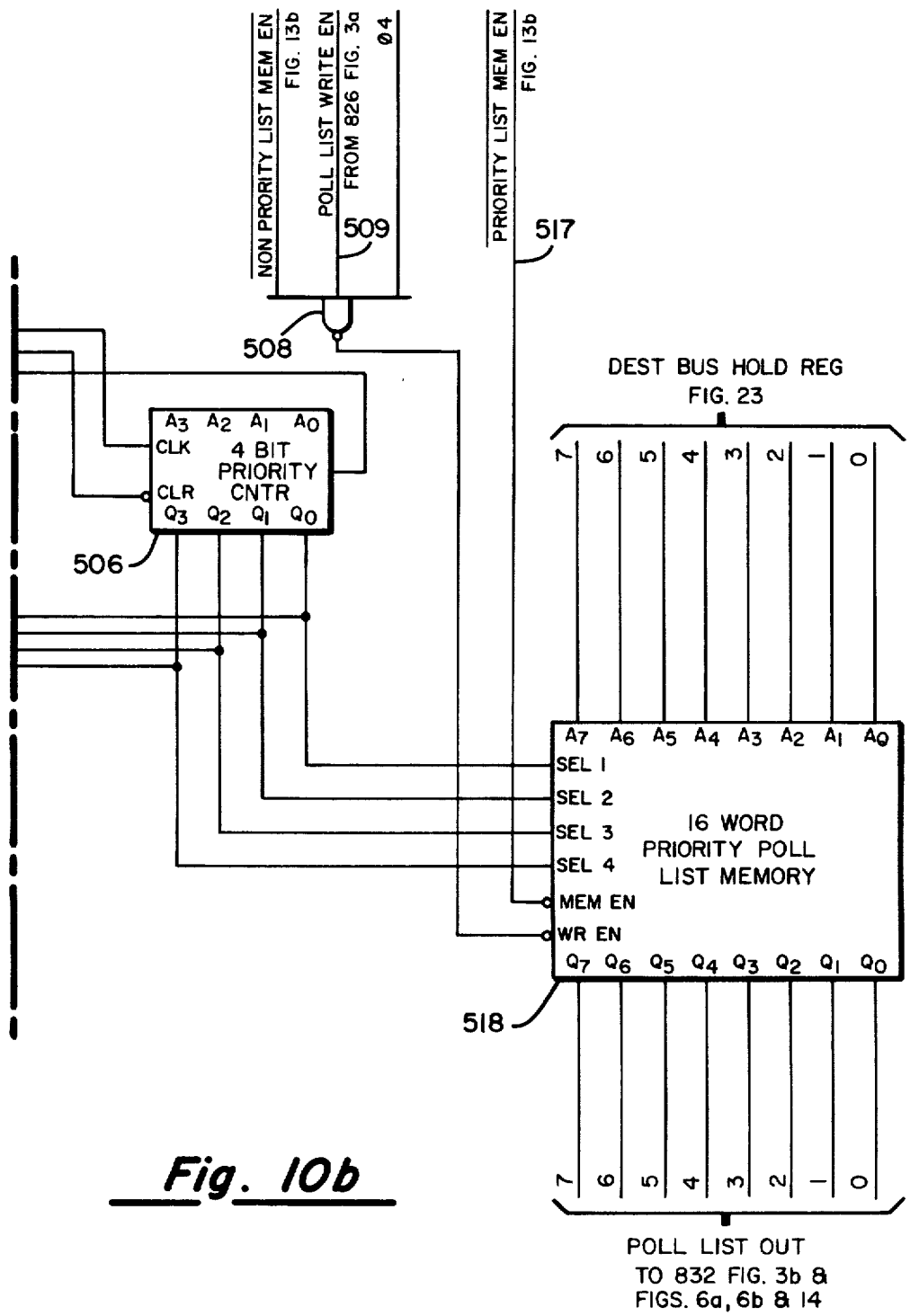
Figure 23:
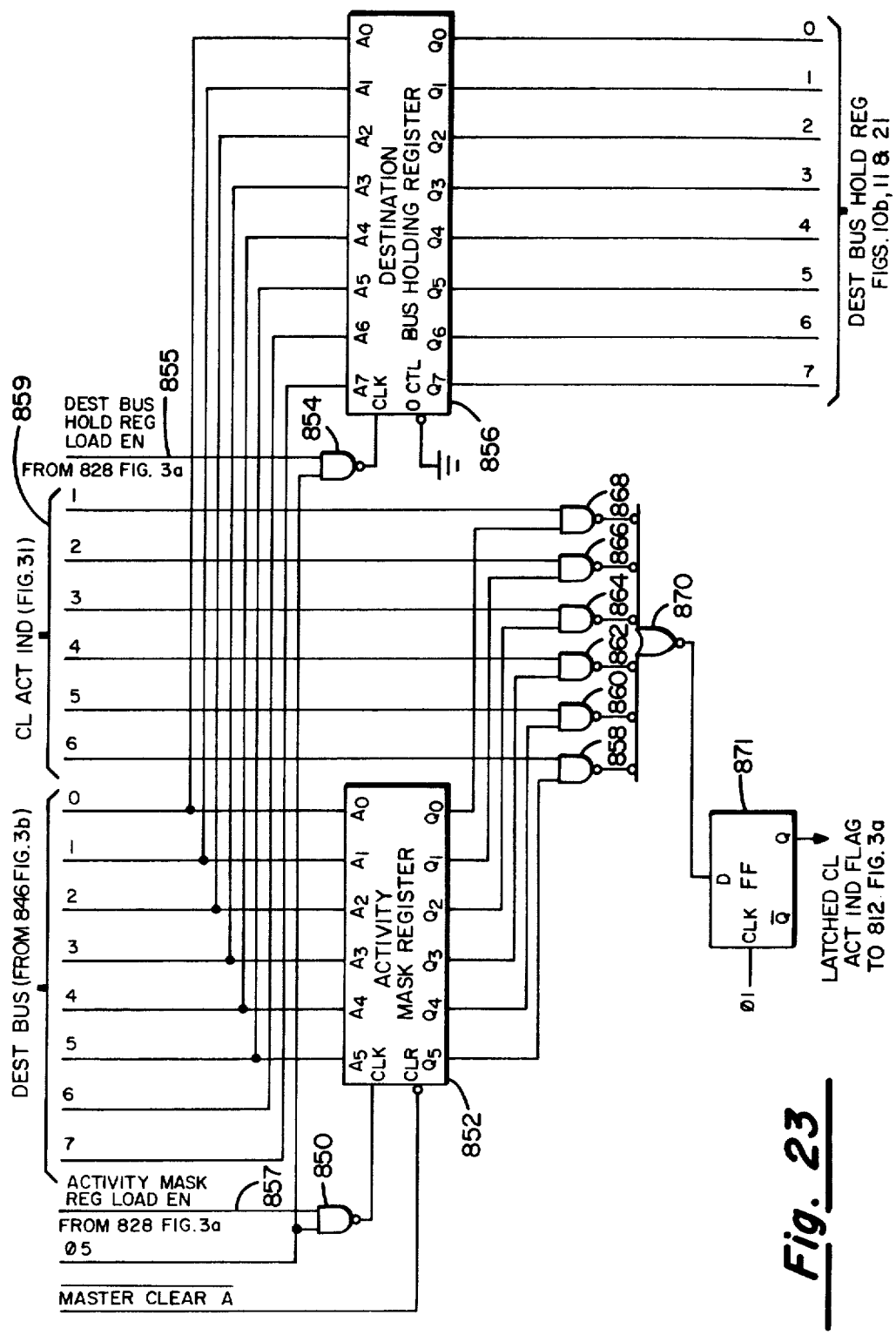
FIG. 23 depicts the logic for implementing the Destination Bus Holding Register and the Activity Mask Register portions of the node.
Figure 24B:
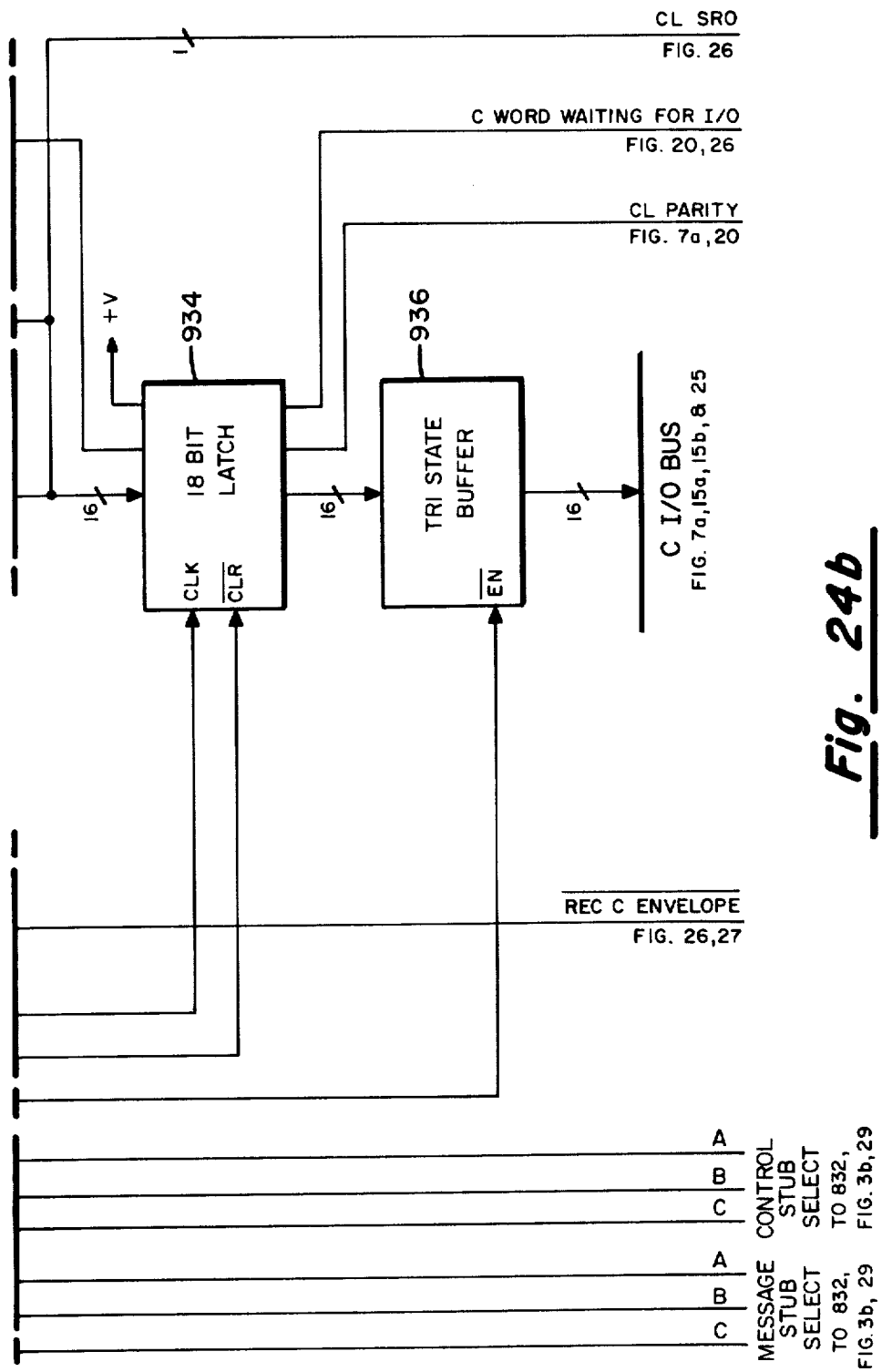

Referring to FIG. 10b, there is identified by numeral 518 the 16-word Priority Poll List Memory which is arranged to store the node addresses of the priority nodes. The memory 518 is arranged to be addressed by the output of a 4-bit Priority Counter 506 which has its $Q_0$ through $Q_3$ outputs coupled to the select inputs of the Priority Poll List Memory 518. When a low signal is applied to line 505 labeled CLR PRIORITY CTR, the 4-bit Priority Counter 506 will be reset, thus pointing to the top of the Priority Poll List stored in the RAM device 518. The outputs from the Priority Poll List Memory 518 are normally in a high state. If the Priority List Memory Enable line 517 goes low, it causes the contents of memory address 0 to be put on the Poll List Output Bus which bus is shared by the Non-priority Poll List Memory 530 (FIG. 11). This data is also available to the Microprogrammable Controller via the Source Multiplexer 832 (FIG. 3), thereby allowing polling order verification. When the Advance Priority List line 507 goes high, it causes the Priority Counter 506 to be incremented to thereby point to the next poll stored in the Priority Poll List Memory 518. To enter a poll address into the Priority Poll List, the Non-Priority List Memory Enable line 529 must be high and the Poll List Write Enable line 509 must also be high. Hence, when on the leading edge of clock phase 4, the output from NAND gate 508 goes low, generating a Priority List Write Enable, the data from the Destination Bus Holding Register 856 (FIG. 23) is loaded into the memory 518 at the particular address which is specified by the then-contents of the Priority Counter 506.

A further register termed the End Priority List Register 502 is provided and is utilized to hold the address of the last entry contained in the Priority List. The register 502 is adapted to be loaded from the Microprogrammable Controller by way of the Destination Bus when the End Priority List Register Load Enable line 501 is activated on the leading edge of a phase 5 clock pulse. The output from the End Priority List Register 502 is applied to a first set of inputs of a 4-bit comparator 510, while the second set of inputs to the comparator arrive from the Priority Counter 506. Wen the first and second set of inputs become equal, the comparator 510 outputs a "1". It is to be noted at this point that the flip-flop 504 is cleared at the same time that the Priority Counter 506 is cleared. If the count in register 502 is less than sixteen, its output Q4 will be low, and, hence, the output of Exclusive OR gate 512 will also be low such that inverter 514 outputs a high signal to a first input of AND gate 516. When the count in the counter 506 becomes equal to the count in the End Priority List Register 502, AND gate 516 will be fully enabled to thereby generate the command Priority List End Compare which is used to shift operation from priority polling to non-priority polling. If the count contained within the register 502 is sixteen, its Q4 output will be a binary "1" signal and the outputs Q3 through Q0 will be 0's. Now, when the counter 506 is cleared, there will be a match detected by the comparator 510 causing its output to go high. However, AND gate 516 is disabled at this time because the output from the Exclusive OR gate 512 will be a "1" under the assumed circumstances. When polling has progressed through all sixteen addresses, the Priority Counter 506 overflows, causing flip-flop 504 to be clocked to its set state. Now, the output of Exclusive OR 512 goes low, enabling the generation of the Priority List End Compare command.

The addresses of the non-priority nodes are contained in a 256-word Non-priority Poll List Memory 530. Its operation is quite similar to the above-described operation of the Priority Poll List Memory 518. That is, the memory address is derived from an 8-bit Non-priority Counter 520. As before, when this counter is cleared by a low signal on line 519, it addresses or points to the top entry in the Non-priority Poll List Memory 530.

When the Advance Non-Priority List line 521 goes high, it increments the counter 520 to access the next succeeding non-priority poll entry. The address of the node to be polled is put out on the Poll List Output Bus whenever the Non-priority List Memory Enable line 529 (FIG. 11) goes low.

Writing into the Non-priority Poll List Memory 530 is under control of a flip-flop comprised of cross-coupled NAND gates 526 and 528. Whenever the Poll List Write Enable line 525 and the Priority List Memory Enable line 527 are simultaneously high, the leading edge of a clock phase 4 pulse will enable NAND gate 524, causing the output of NAND gate 528 to go low, thus transferring the contents of the Destination Bus Holding Register 856 (FIG. 23) into the address location in memory 530 specified by the then-contents of the Non-priority Counter 520. The leading edge of clock phase 1 terminates the Memory Write Enable command.

Figure 12:
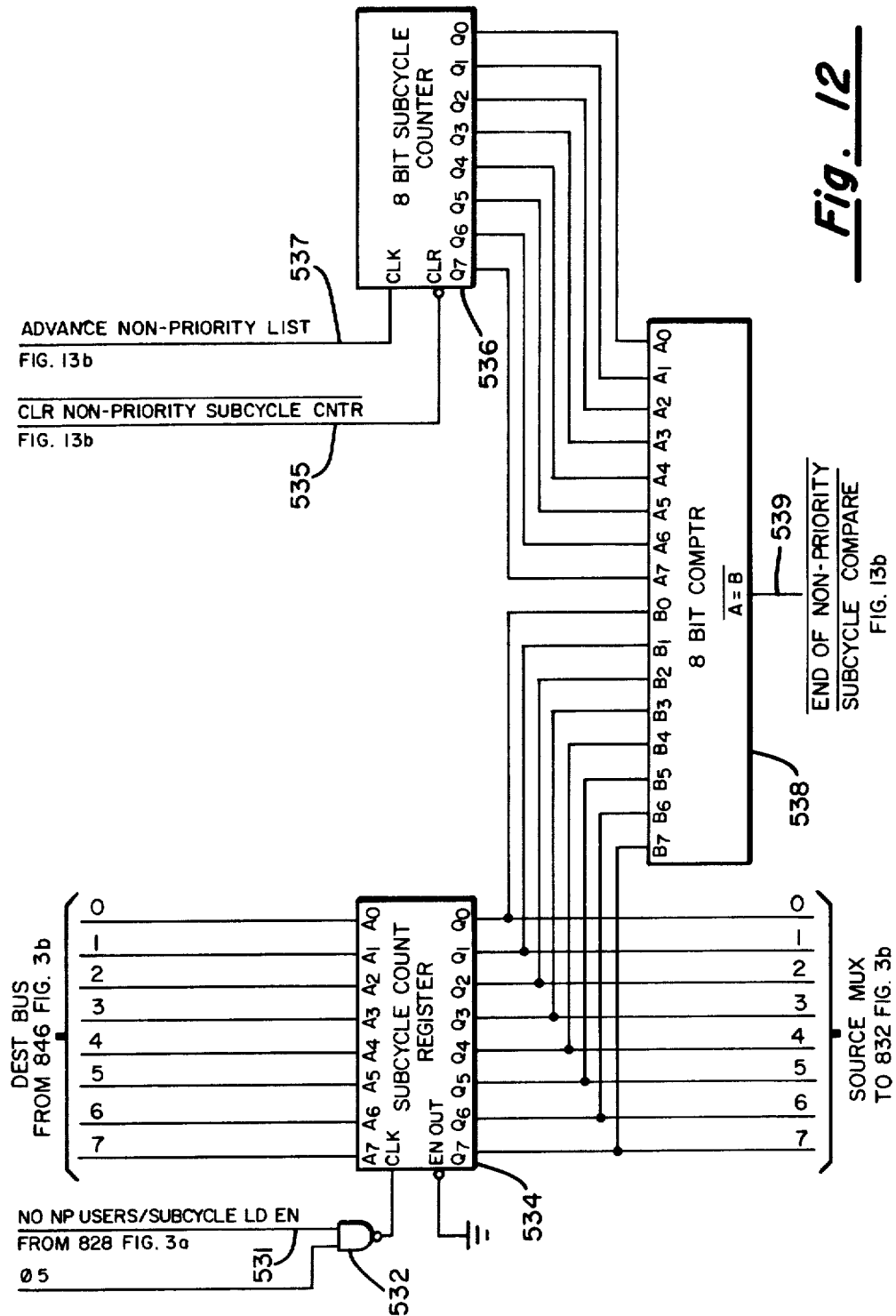
FIG. 12 illustrates the logic for implementing the Non-Priority Sub-cycle Control.
Figure 13B:
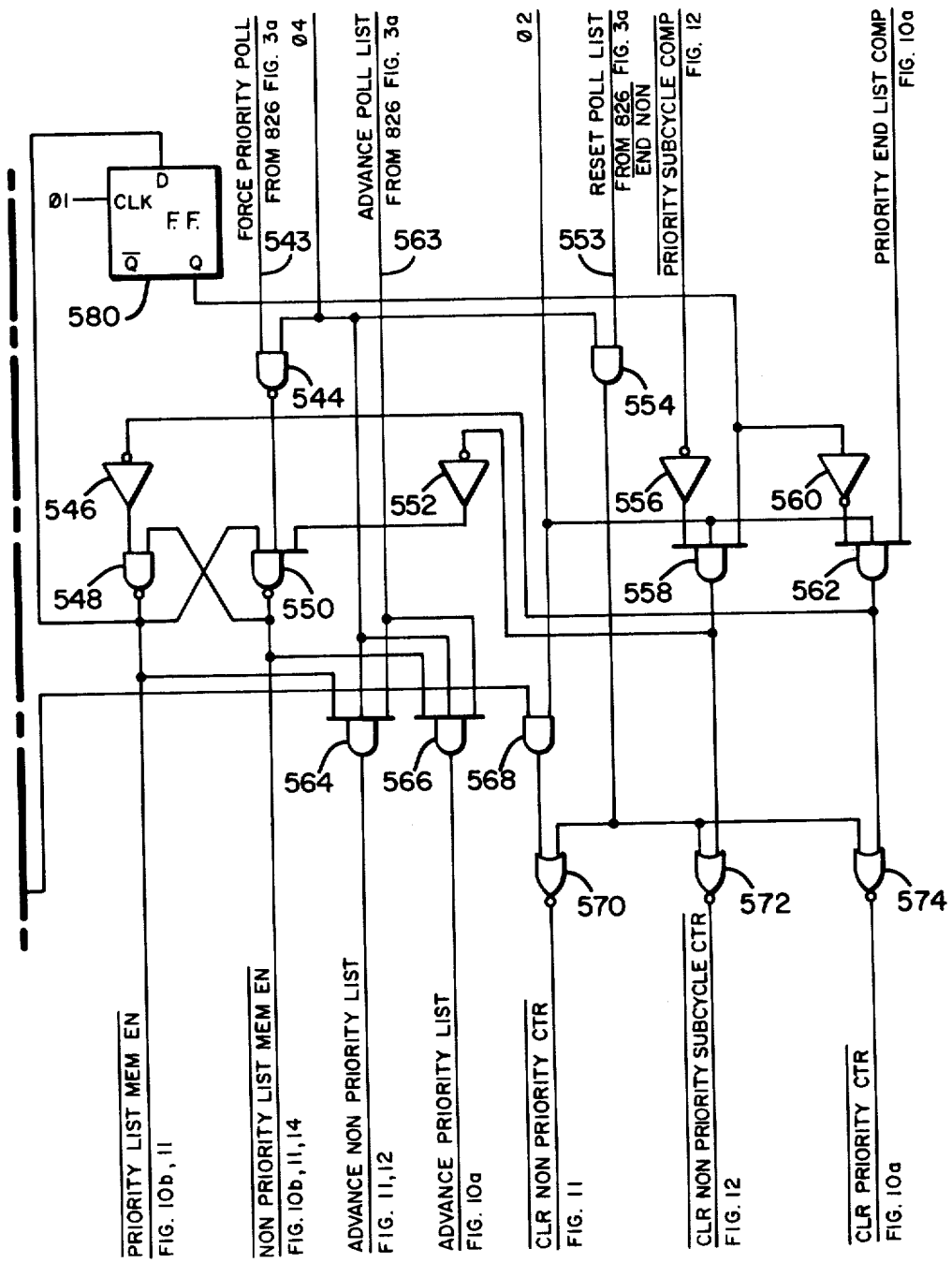

Shown in FIG. 12 is an 8-bit counter 536, referred to as the Sub-cycle Counter, which controls the non-priority sub-cycle interval. The counter 536 is cleared when the Clear Non-priority Sub-cycle Counter line 535 goes low and is incremented each time the Advance Non-priority List line 537 goes high. The Sub-cycle Count Register 534 is adapted to be loaded by the Microprogrammable Controller via the Destination Bus on the leading edge of a clock phase 5 pulse whenever the line 531 labeled "Number of Non-priority Users Per Sub-cycle Load Enable" is selected and goes high. The output from the Sub-cycle Count Register 534 is available to the Microprogrammable Controller for verification via the Source Multiplexer 832 of FIG. 3.

As was earlier true with the priority list accessing circuitry, in the case of the non-priority accessing circuitry the contents of register 534 and the counter 536 are compared in an 8-bit comparator 538 such that when equality is detected, the output from the comparator 538 goes low, thus generating the End of Non-priority Sub-cycle Compare signal on line 539.

Figure 13:
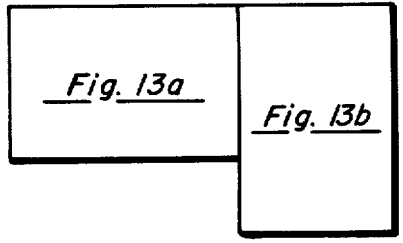
FIGS. 13a and 13b, when arranged as shown in FIG. 13, illustrate the logic for implementing the Priority Poll List Control Circuitry of the node.
Figure 15:
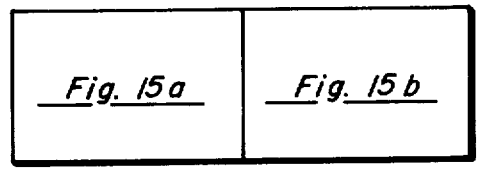
FIGS. 15a and 15b, when arranged as shown in FIG. 15, depict the logic comprising a portion of the Control Line Input Circuitry.

With reference to FIG. 13a, the End Non-priority List Register 540 is loaded from the Microprogrammable Controller via the Destination Bus on the leading edge of a clock phase 5 signal whenever the End Non-priority List Register Load Enable line 577 is selected. The output from the register 540 is compared with the output of counter 520 in an 8-bit comparator 542. Hence, when these two counts become equal, the output of inverter 576 goes high. Again, the output from the register 540 becomes available to the Microprogrammable Controller for verification by way of the Source Multiplexer on FIG. 3.

The polling mode is determined by the state of the flip-flop comprised of the cross-coupled NAND gates 548 and 550. When the output of NAND gate 548 is low, the priority polling mode is enabled and when the output of NAND gate 550 is low, the non-priority polling mode is enabled. When the polling operation is first initiated, the Force Priority Poll line 543 is selected. Thus, on clock phase 4, NAND gate 544 is enabled and NAND gate 550 is disabled. This establishes the priority polling mode. Next, the Reset Poll List line 553 is selected. Hence, on clock phase 4, the AND gate 554 is fully enabled, causing the Non-priority Counter 520 to clear via the output from NOR gate 570, the Non-priority Sub-cycle Counter 536 to clear due to the control signal applied thereto from the output of NOR gate 572 and the Priority Counter 506 to clear due to the control signal emanating from NOR gate 574. The foregoing events cause the first poll to be accessed from address 0 of the Priority Poll List Memory 518. When that poll is complete, the Advance Poll List line 563 is selected. Because the output of NAND gate 550 is high at this time, a clock phase 4 signal will enable AND gate 566, thus generating an Advance Priority List pulse which, when applied to the Priority List Counter 506, causes it to be incremented. The flip-flop 580 is clocked at the beginning of each cycle of the phase 1 clock pulse. Thus, its output reflects the polling mode of the previous cycle. For the priority mode, the output of flip-flop 580 is low and thus the output of inverter 560 is high. Polling proceeds sequentially to the end of the priority polling list stored in the random access memory device 518 at which time the output from AND gate 516 (FIG. 10a) generates the Priority List End Compare signal which is applied as a first input to AND gate 562. Hence, on clock phase 2 AND gate 562 will be fully enabled, causing NOR gate 574 to output the command "Cir Priority Counter" which, in turn, is applied by way of line 505 to the appropriate terminal of the Priority Counter 506 causing it to be set to all zero's. Also, NAND gate 548 will be disabled by way of the output from the inverter 546 causing the flip-flop comprised of NAND gates 548 and 550 to change to the non-priority polling mode condition.

The next poll will thus be accessed from address 0 of the Non-priority Poll List Memory 530. The output from NAND gate 548 is now high, Thus, when the Advance Poll List line 563 is selected, the phase 4 clock pulse will enable AND gate 564, thus incrementing the Non-priority Counter 520 and the 8-bit Sub-cycle Counter 536. Because the output of flip-flop 580 will now be high, AND gate 558 will be partially enabled. Then, when the Sub-cycle Counter 536 reaches its count limit, the output from comparator 538 will cause inverter 556 to output a high signal. On the next phase 2 clock pulse, AND gate 558 will be fully enabled and will cause the NOR gate 572 to output a signal for clearing the Non-priority Sub-cycle Counter 563 while simultaneously causing NAND gate 550 to be disabled via the output from inverter 552. This latter action causes the mode control flip-flop (548–550) to revert to the priority polling mode condition.

Figure 14:
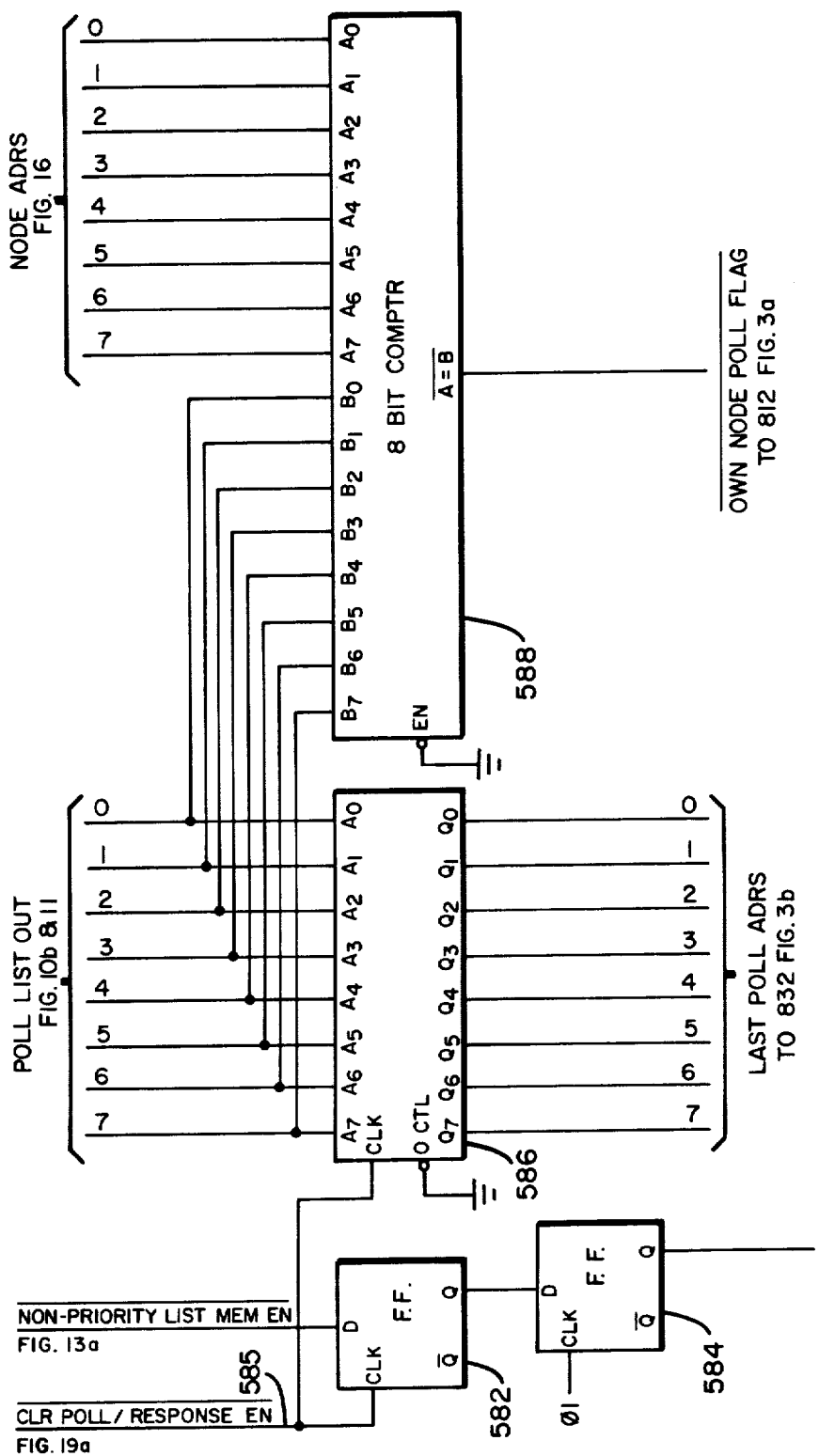
FIG. 14 shows the logic for implementing the Last Poll Address Register and the Own Node Poll Comparator.

It is to be noted that the state of the Non-priority Counter 520 remains unchanged by this action. Polling proceeds alternating between the priority and non-priority mode until the end of the non-priority list is reached at which time the output from comparator 542 causes the output of inverter 576 to go high. When this happens, on the next phase 2 clock pulse, AND gate 568 will be enabled causing the counter 520 to be cleared via the output from NOR gate 570. When the Clear Poll-/Response Enable line 585 (FIG. 14) goes high, the current output of the poll list is latched into a holding register 586 and the state of the Non-priority List Memory Enable line coming from the output of NAND gate 548 is latched into a D-type flip-flop 582. The output of this flip-flop is, in turn, latched into flip-flop 584 on the next subsequent phase 1 clock pulse to thereby yield a signal at its Q output indicative of whether the previous poll was a priority-type or a non-priority-type transaction.

The output from the holding register 586 is used to compare the address of the response to the address of the poll. The holding register is required since the next polling cycle is being set up while the response to the previous poll is being compared. The output from register 586 is also available to the Microprogrammable Controller by way of the Source Multiplexer 832 of FIG. 3.

The outputs from the Poll List Memories 518 and 530 are compared to the node address by a further 8-bit comparator 588. When equality is detected, the output from comparator 588 goes low thereby indicating that the node in question is polling itself. This polling technique maintains a very high polling rate by minimizing the processing overhead in the Microprogrammable Controller. Only a single microinstruction is required to generate the Advance Poll List signal for each poll. The high polling rate, coupled with the ability to distinguish priority from non-priority nodes, assures that the priority nodes will gain access to the bus in the minimum time.

CONTROL LINE INPUT

Figure 15A:
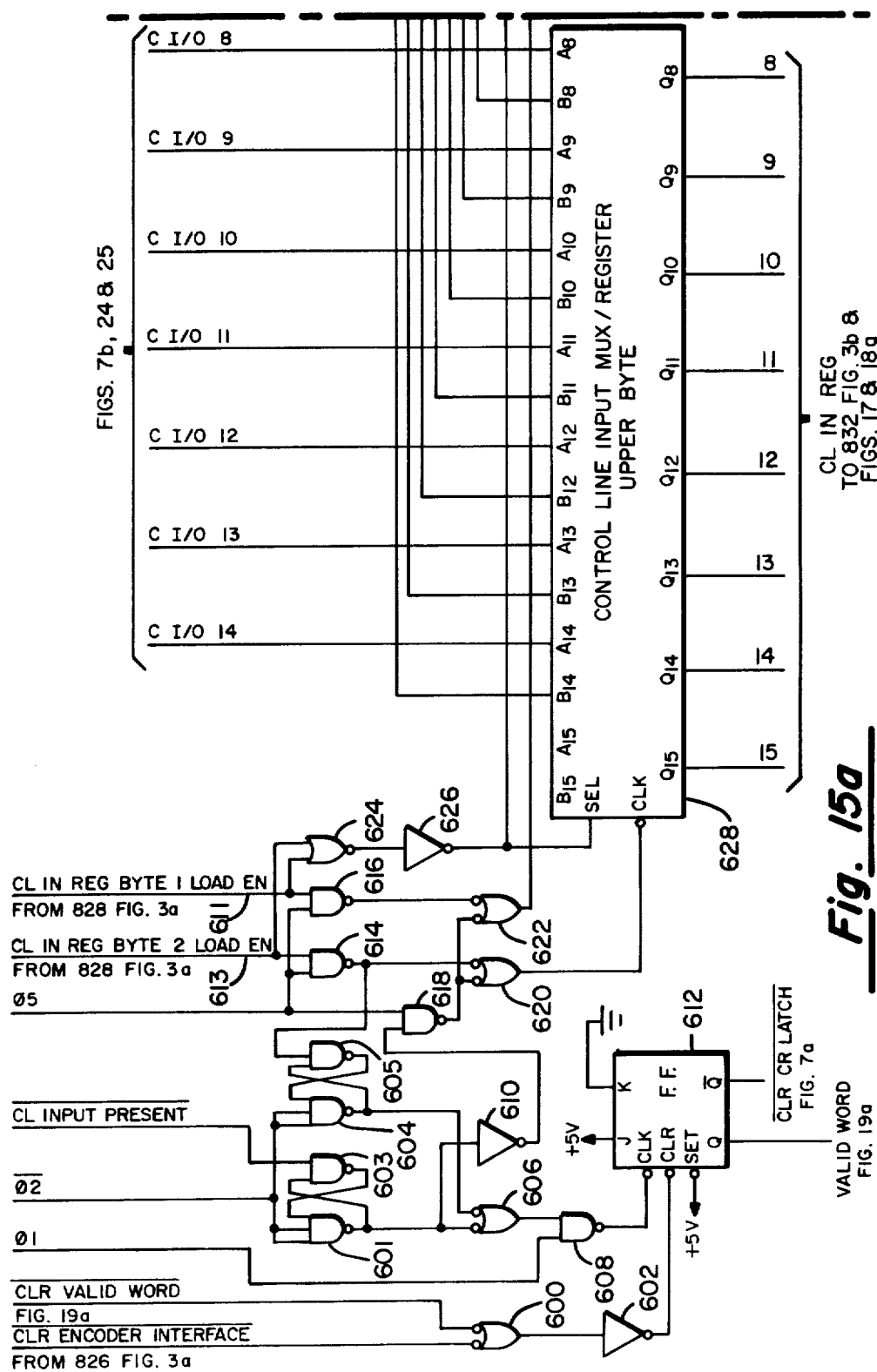
Figure 15B:
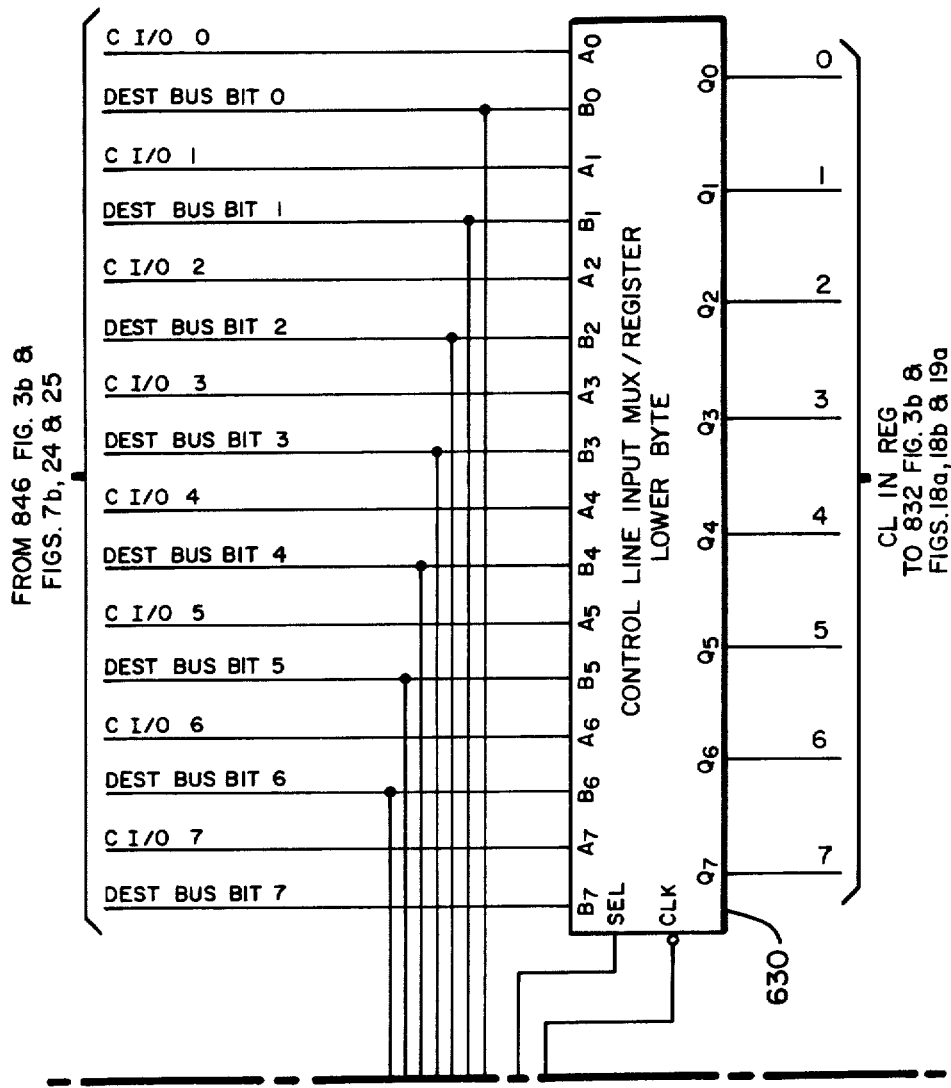

The Control Line Multiplexer/Register consists of the upper byte 628 and the lower byte 630 (FIGS. 15a and 15b). Data is entered into these registers, either from the Control Line Decoder 130 via the CIO bus 132 or from the Microprogrammable Controller via the Destination Bus 172, the former being the more normal mode of operation. When the Control Line Encoder has assembled a control word, the Control Line Input Present signal goes low, causing the output of NAND gate 603 to go high and latch via NAND gate 601. This occurs on clock phase 3. With the output from NAND gate 601 low, the output of inverter 610 is high, partially enabling NAND gate 618. Then, on the next phase 5 clock pulse, NAND gate 618 is enabled, causing clock pulses to be generated via negative OR gates 620 and 622. Since at this time both the byte 1 and byte 2 Control Line Input Register Load Enable lines 611 and 612 are low, the output of NOR gate 624 will be high. Thus, the output of inverter 626 will be low, selecting the A-inputs to the multiplexer 628 - 630. This causes the control word on the CIO bus to be latched simultaneously into both the upper and lower bytes of the Control Line Input Multiplexer/Register. At this time, NAND gate 608 is also partially enabled via NAND gate 601 and negative OR gate 606 so that on the next phase 1 clock pulse, flip-flop 612 is clocked to the set condition, indicating that a valid word is now loaded into the Control Line Input Register. Finally, the $\overline{\text{Phase 2}}$ clock pulse causes the output of NAND gate 601 to go high and latch via NAND gate 603, thus resetting the system for the next control word transfer. Either a Clear Valid Word signal or a Clear Encoder Interface signal will propagate through negative OR gate 600 and inverter 602 to clear flip-flop 612.

To load the Control Line Input Register 628–630 from the Microprogrammable Controller, the Control Line Input Register Byte 1 Load Enable signal on line 611 is selected, thus partially enabling NAND gate 616 and causing the B-inputs to the multiplexer to be selected via NOR gate 624 and inverter 626. The next phase 5 clock pulse will enable NAND gate 616 and negative OR gate 622 to generate a clock pulse which loads the contents of the Destination Bus into the lower byte register 630. Similarly, on a subsequent cycle, the Control Line Input Register Byte 2 Load Enable signal on line 613 is selected to cause the contents of the Destination Bus to be loaded into the upper byte register 628. This action also sets the flip-flop formed by cross-coupled NAND gates 604 and 605, thus enabling the next phase 1 clock pulse to set flip-flop 612 to indicate a valid word. This flip-flop is reset on the next $\overline{\text{Phase 2}}$ clock pulse.

Figure 16:
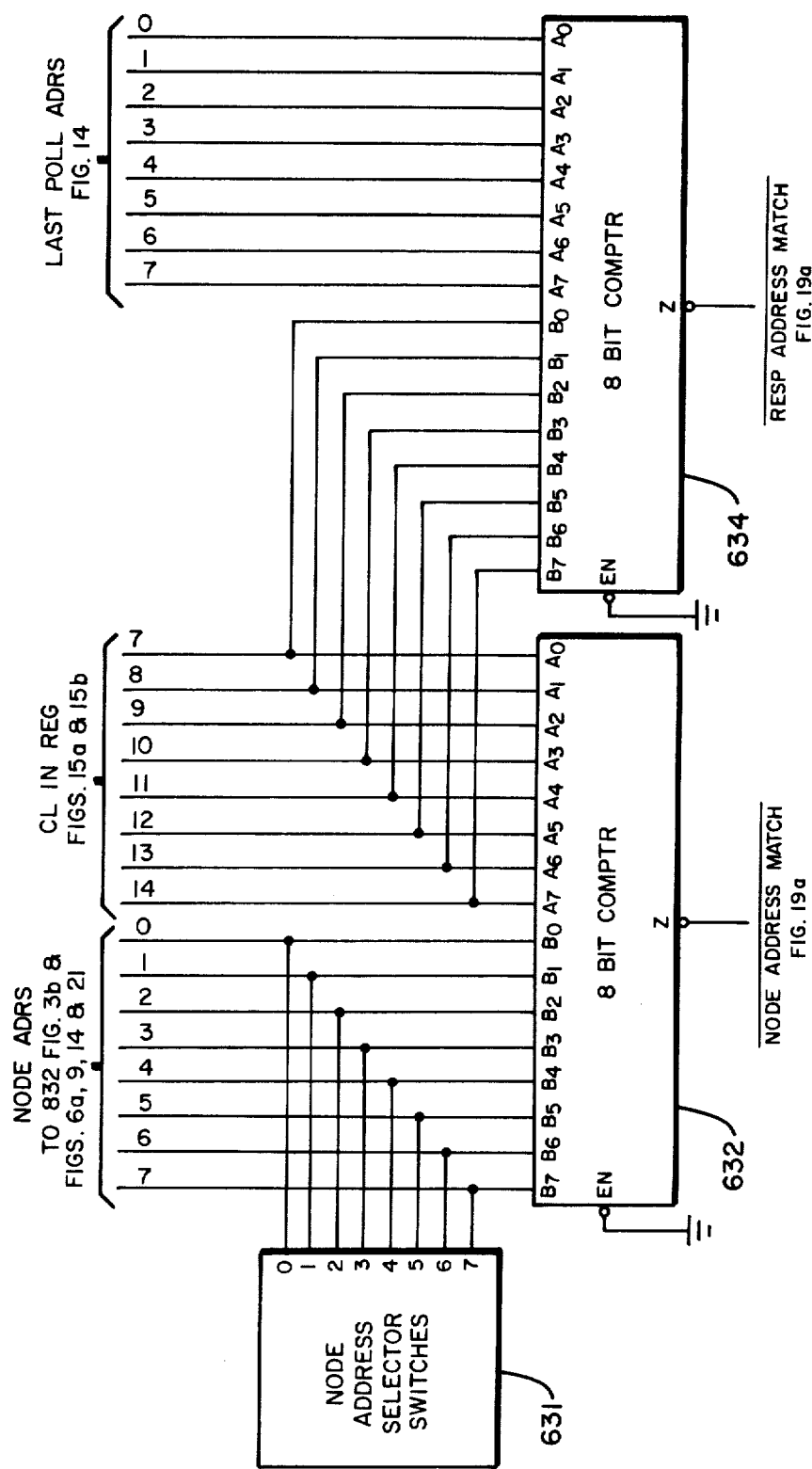
FIG. 16 depicts the logic for implementing the comparator portion of the Control Line Input Circuitry.

With reference to FIG. 16, the Node Address Selector Switches 631 are set to define an 8-bit code identifying the node address. The node address is compared to output bits 7 through 14 of the Control Line Input Register by the 8-bit comparator 632. If the node has received a poll, select or a command in which the address field of the control word matches the node address, the output of comparator 632 generates the "Node Address Match" signal. This signal is used by the Sequencer PLA when the node in question is not that designated as the Bus Controller to allow it to ignore all point-to-point transmissions which are addressed to other nodes. The address field of the Control Line Input Register is also compared to the last poll address by an 8-bit comparator 634 to generate the "Response Address Match" signal. This signal is used by the Sequencer PLA when the node in question is the Bus Controller to verify that the responding node was, in fact, the node which had been previously polled.

Figure 17:
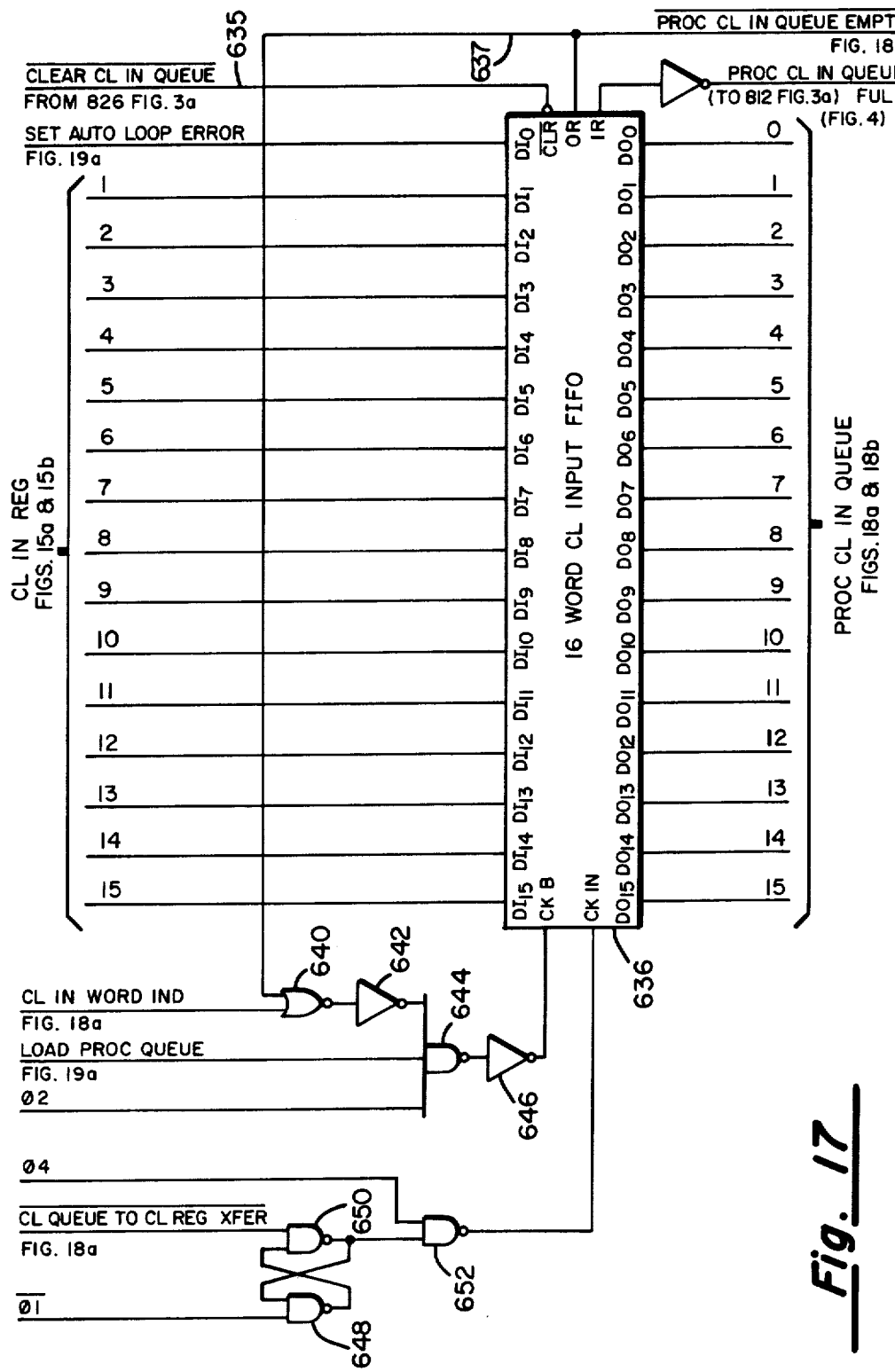
FIG. 17 depicts by means of a logic diagram the Control Line Input FIFO buffer employed in the Control Line Input Circuitry.

Since it is possible that control line inputs occur more rapidly than the Microprogrammable Controller can process them on an instantaneous basis, an elastic buffer is required. This is the function of the 16 word control line input FIFO buffer 636 of FIG. 17. The FIFO buffer is initialized by selecting the Clear Control Line Input Queue line 635 which resets both the input and output pointers in the FIFO 636. The Output Ready signal (OR) of FIFO 636 will thus be low indicating that the queue is empty. The FIFO buffer is loaded by the positive transition of the Clock B input and is unloaded by the positive transition of the Clock In input.

Figure 18:
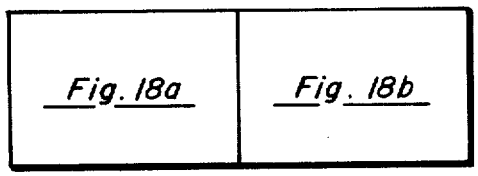
FIGS. 18a and 18b, when arranged as shown in FIG. 18, depict the Processor Control Line Input Register portion of the Control Line Input Circuitry.
Figure 19:
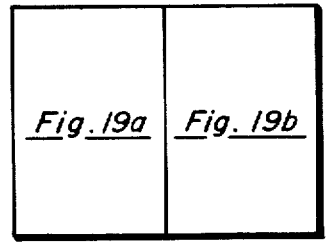
FIGS. 19a and 19b, when arranged as shown in FIG. 19, depict the logic for implementing the Control Line Sequencer PLA.

With reference also to FIG. 18a, consider first the case where the queue is empty and the flip-flop formed by NAND gates 670 and 672 is reset, such that the Control Line Input Word Indicator line 675 is low. When the Control Line Sequencer PLA detects a control word which is relevant to the node, it generates a Load Processor Queue signal which functions to partially enable NAND gate 664. Since inverter 662 and NAND gate 670 are both high at this time, the next phase 3 clock pulse will fully enable NAND gate 664, thus disabling Negative OR gate 668. On the leading edge of the phase 3 clock pulse, the contents of the Control Line Input Register 628-630 are loaded into Register 676. Since the Processor Control Line Input Queue is empty, the selection of inputs for the Processor Control Line Input Multiplexer/Register 676 will be its A-inputs.

The output of Negative OR gate 668 also causes the output of NAND gate 672 to go high and latch via NAND gate 670. This indicates to the Mapping PLA that there is a new control word present and the Microprogrammable Controller is vectored to the appropriate processing task to deal with this control word. When the Microprogrammable Controller has completed branching to the specified processing task, it initiates the Clear Control Line Input Indicator signal on line 659 which is AND'ed with a phase 4 clock signal to reset the CONTROL Line Input Word Indicator flip-flop 674. If the Microprogrammable Controller completes this response before the next Load Processor Queue command appears on line 663, it effectively keeps up and the queue is completely by-passed with the data flowing directly from the Control Line Input Register 628-630 to the Processor Control Line Input Mux/Register 676. Note that outputs Q2 through Q6 of register 676 provide the control line inputs to the Mapping PLA and also that all outputs of register 676 are available to the Microprogrammable Controller via the source multiplexer.

With continued reference to FIG. 18a, consider next the case where a Load Processor Queue Command on line 663 occurs before the flip-flop comprised of cross-coupled NAND gates 670 and 672 can be reset. In this case, the output of NAND gate 670 is low, thus disabling NAND gates 664 and 666. Since the output of NAND gate 672 is high, NAND gate 644 (FIG. 17) is partially enabled via inverter 642 and NOR gate 640. Thus, on the phase 2 clock pulse, the NAND gate 644 is fully enabled generating a Load FIFO signal via inverter 646. This causes the Processor Control Line Input Queue Empty line 637 to go high. At this time, the output of FIFO 636 corresponds to the output of the Control Line Input Register 628-630 of FIGS. 15a and 15b. Once there is a word in the queue, subsequent control line input words will continue to be directed into the queue since the FIFO output enables NAND gate 644 via inverter 642 and NOR gate 640. It is to be noted that, now, NAND gate 664 is disabled via inverter 662 and that NAND gate 666 is partially enabled. Hence, when the Control Line Input Word Indicator flip-flop 670-672 is reset, the next phase 3 clock pulse will enable NAND gate 666 which disables Negative OR gate 668 so that on the leading edge of this clock pulse register 676 is loaded. Since the Select line 677 is now high, the data is taken from the B-inputs, which correspond to the output of FIFO 636, thus loading the first control word queued into the register. At the same time, the Control Line Input Word Indicator flip-flop is again set. The output of NAND gate 666 also sets the flip-flop formed by NAND gates 648 and 650 (FIG. 17) thus partially enabling NAND gate 652 so that on the next phase 4 clock pulse a FIFO Unload clock pulse is generated, advancing the pointer in the FIFO such that the output now corresponds to the next queued control word. This flip-flop is then reset on the next phase 1 clock pulse. This process of sequentially unloading the queue continues until the Microprogrammable Controller catches up, at which time the circuit reverts to the queue by-pass mode.

CONTROL LINE SEQUENCER

Figure 20:
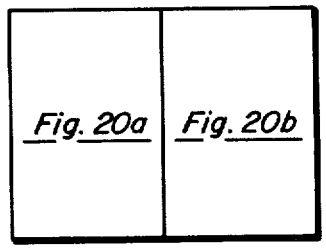
FIGS. 20a and 20b when arranged as shown in FIG. 20 illustrate further logic circuitry used in the implementation of the Control Line Sequencer PLA.
Figure 22:
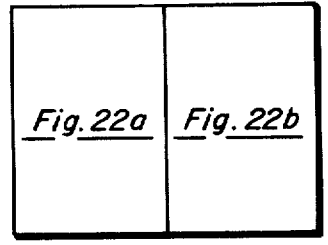
FIG. 22a and 22b, when arranged as shown in FIG. 22, depict the Priority and Non-Priority Dispatch FIFO buffers comprising a portion of the Control Line Input Queue.
Figure 19A:
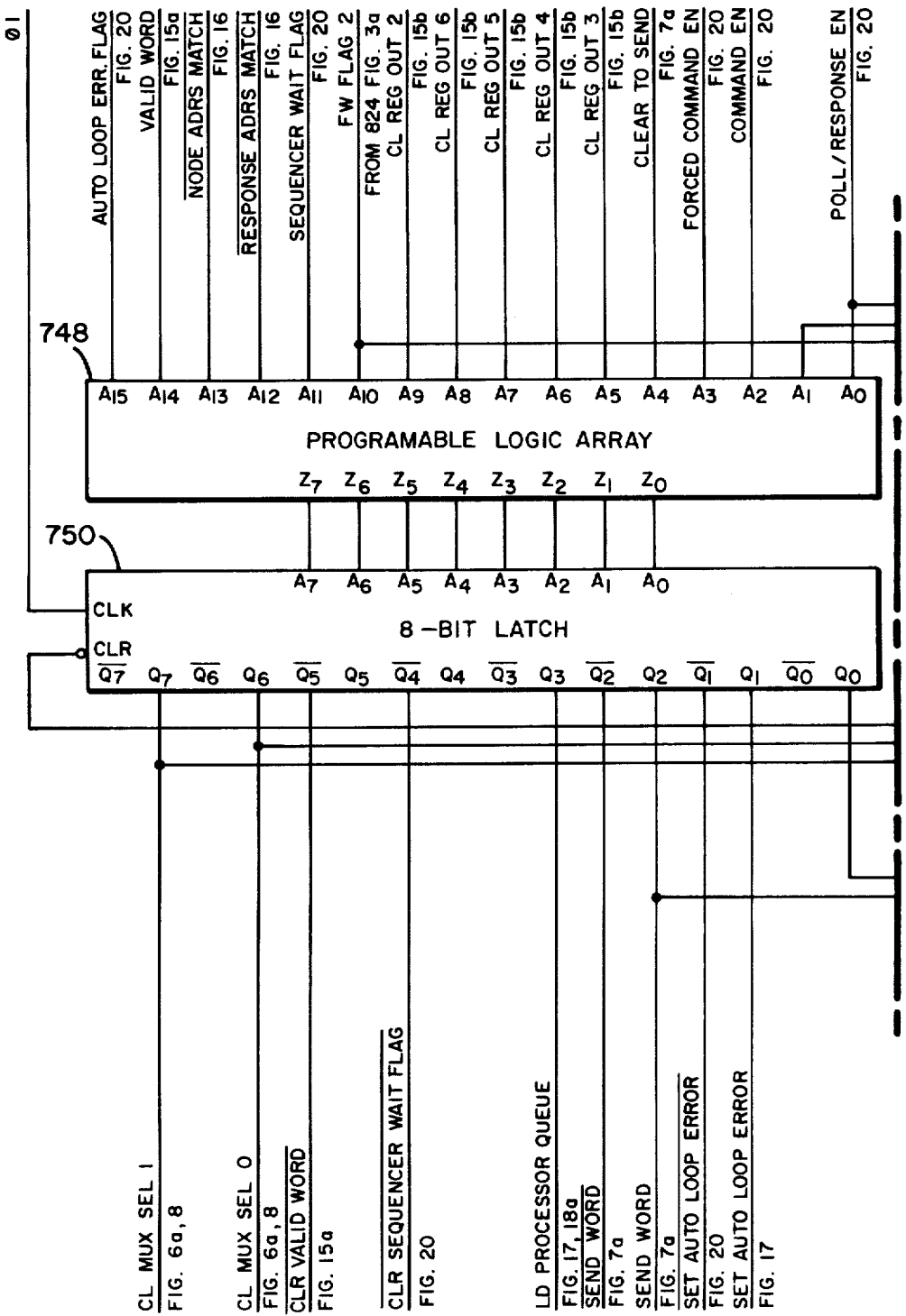
Figure 19B:
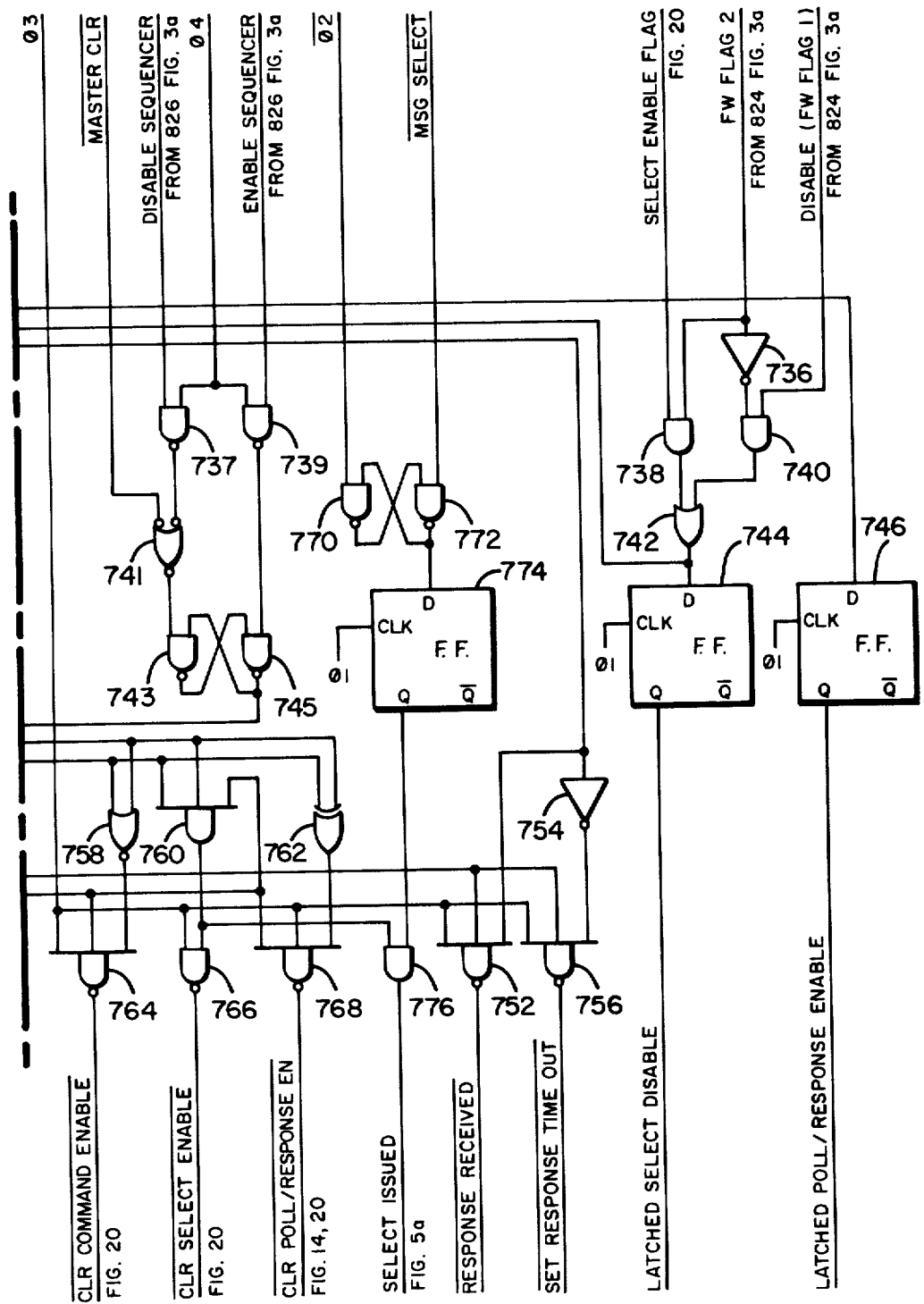
Figure 20A:
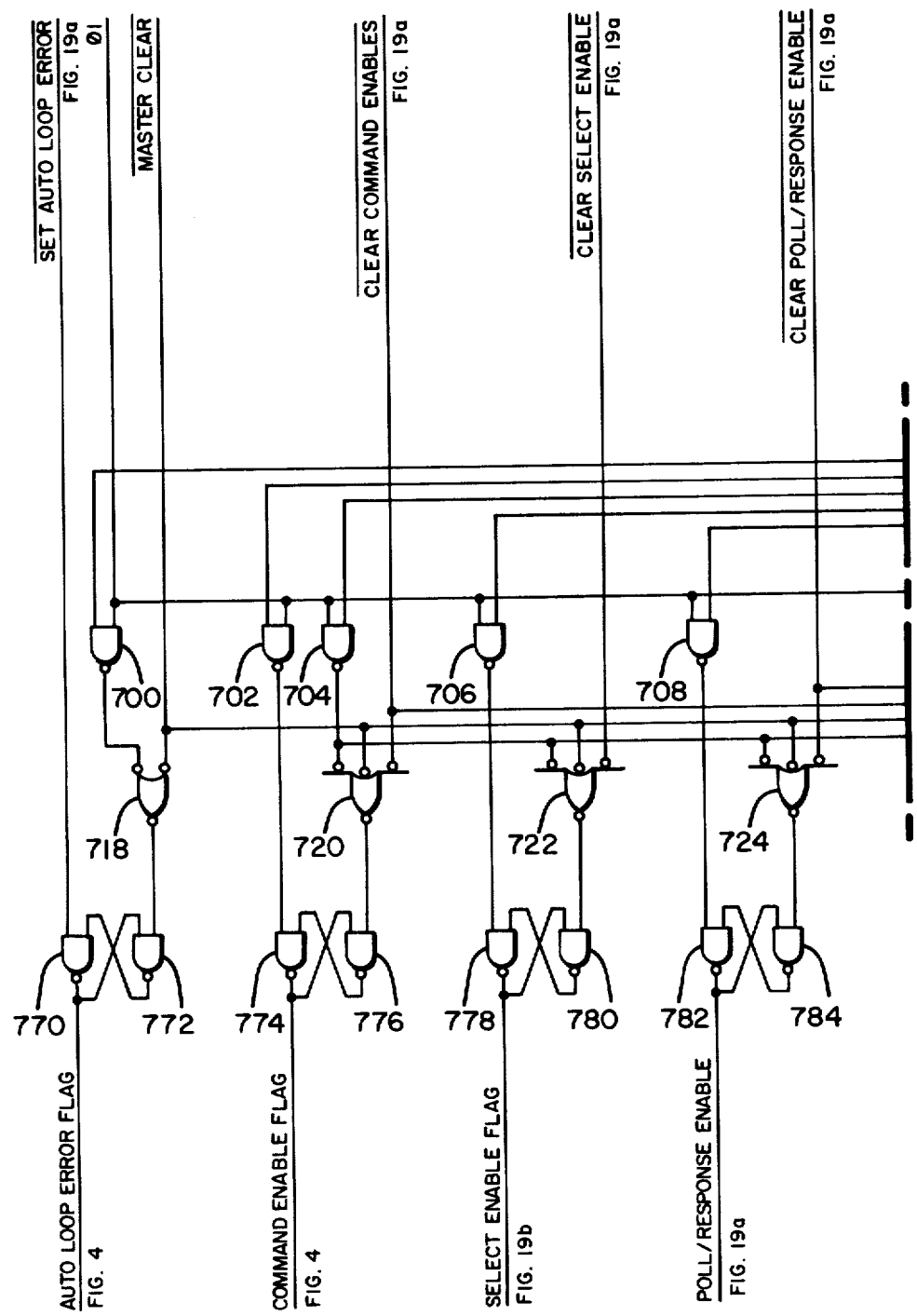
Figure 20B:
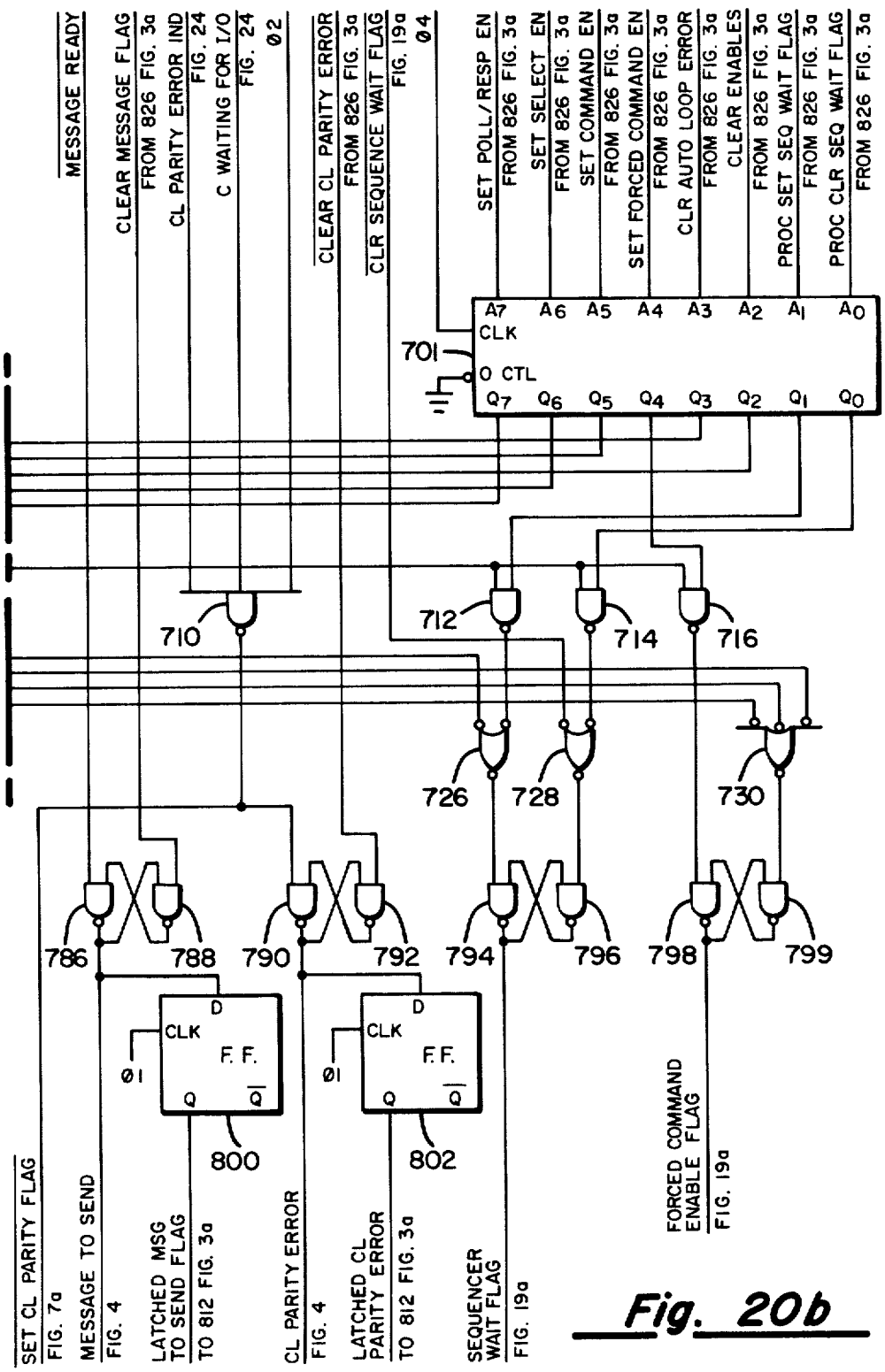

The Control Line Sequencer 144 in FIG. 2 is set out in greater detail in FIGS. 19a, 19b and 20 and serves to control the node's interface with the data bus system control line. It performs a pre-processing function on all control line inputs and sorts out all words that are irrelevant to this node. Only the control line words of importance to this particular node will be passed on to the node's Microprogrammable Controller for further processing. This pre-processing function provides the prompt response necessary to maintain a high polling rate. The Control Line Sequencer can initiate the next appropriate transmission on the control line generally within less than 1.5 microseconds after receipt of the previous transmission. If all of the necessary processing were to be performed solely within the Microprogrammable Controller, it would take significantly longer and would thus reduce the efficiency of the bus control system. The key to the high speed operation of the Control Line Sequencer is the fact that it can do many operations in parallel. For example, in a single 250 nanosecond machine cycle, it can recognize that a control line input has occurred, decode the function code, check the address field to see if it is relevant to this node and check to see if a word should be sent out in response. Another significant feature of the Control Line Sequencer is its ability to handle all types of control line transmissions, either as a Bus Controller or as a non-bus controller.

The central element of the Control Line Sequencer is the Programmable Logic Array 748 (FIG. 19a). The Truth Table for the PLA is shown in Table VIA below. A description of the 36 possible output terms generated is shown in Table VIB and a description of the A-inputs and Z outputs is shown in Table VIC.

TABLE VI A

| | CONTROL LINE SEQUENCER PLA TRUTH TABLE | | | | | | | | | | | | | | | | | | | | | | | |
|---|---|---|---|---|---|---|---|---|---|---|---|---|---|---|---|---|---|---|---|---|---|---|---|---|
| | A-Inputs | | | | | | | | | | | | | | | | Z-Outputs | | | | | | | |
| Term | 15 | 14 | 13 | 12 | 11 | 10 | 9 | 8 | 7 | 6 | 5 | 4 | 3 | 2 | 1 | 0 | 7 | 6 | 5 | 4 | 3 | 2 | 1 | 0 |
| 0 | 1 | 1 | X | X | X | X | X | X | X | X | X | X | X | X | X | X | 0 | 0 | 1 | 0 | 1 | 0 | 0 | 0 |
| 1 | 0 | 0 | X | X | 0 | X | X | X | X | X | X | 1 | 0 | 1 | X | X | 0 | 0 | 0 | 0 | 0 | 1 | 0 | 0 |

TABLE VI A-continued
CONTROL LINE SEQUENCER PLA TRUTH TABLE

| Term | \multicolumn{16}{c}{A-Inputs} | \multicolumn{8}{c}{Z-Outputs} |
|---|---|---|---|---|---|---|---|---|---|---|---|---|---|---|---|---|---|---|---|---|---|---|---|---|

| Term | 15 | 14 | 13 | 12 | 11 | 10 | 9 | 8 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|
| 2 | 0 | 0 | X | X | 0 | 0 | X | X | X | X | X | 1 | 0 | 0 | 0 | 1 | 0 | 1 | 0 | 0 | 0 | 1 | 0 | 0 |
| 3 | 0 | 0 | X | X | 0 | 1 | X | X | X | X | X | 1 | 0 | 0 | 1 | X | 1 | 1 | 0 | 0 | 0 | 1 | 0 | 0 |
| 4 | 0 | 0 | X | X | 0 | 1 | X | X | X | X | X | 1 | 0 | 0 | 0 | 1 | 1 | 0 | 0 | 0 | 0 | 1 | 0 | 0 |
| 5 | 0 | 1 | X | X | 0 | X | 0 | 0 | 1 | 0 | 0 | X | X | X | X | X | 0 | 0 | 1 | 0 | 1 | 0 | 0 | 0 |
| 6 | 0 | 1 | X | X | 0 | X | 1 | X | X | X | X | X | X | X | X | X | 0 | 0 | 1 | 0 | 1 | 0 | 1 | 0 |
| 7 | 0 | 1 | X | X | 0 | X | 0 | 1 | X | X | X | X | X | X | X | X | 0 | 0 | 1 | 0 | 1 | 0 | 1 | 0 |
| 8 | 0 | 1 | X | X | 0 | X | 0 | X | 0 | X | X | X | X | X | X | X | 0 | 0 | 1 | 0 | 1 | 0 | 1 | 0 |
| 9 | 0 | 1 | X | X | 0 | X | 0 | X | X | 1 | X | X | X | X | X | X | 0 | 0 | 1 | 0 | 1 | 0 | 1 | 0 |
| 10 | 0 | 1 | X | X | 0 | X | 0 | X | X | X | 1 | X | X | X | X | X | 0 | 0 | 1 | 0 | 1 | 0 | 1 | 0 |
| 11 | 0 | 0 | X | X | X | X | X | X | X | X | X | 1 | 1 | X | X | X | 0 | 0 | 0 | 0 | 0 | 1 | 0 | 0 |
| 12 | 0 | 1 | X | X | 1 | 0 | 0 | 1 | 1 | X | X | X | X | X | X | X | 0 | 0 | 1 | 0 | 0 | 0 | 0 | 0 |
| 13 | 0 | 1 | 1 | X | 1 | 0 | 1 | X | X | X | X | X | X | X | X | X | 0 | 0 | 1 | 0 | 0 | 0 | 0 | 0 |
| 14 | 0 | 1 | X | X | 1 | 0 | 0 | 0 | X | X | X | X | X | X | X | X | 0 | 0 | 1 | 0 | 1 | 0 | 0 | 0 |
| 15 | 0 | 1 | X | X | 1 | 0 | 0 | X | 0 | X | X | X | X | X | X | X | 0 | 0 | 1 | 0 | 1 | 0 | 0 | 0 |
| 16 | 0 | 1 | 0 | X | 1 | 0 | 1 | 0 | X | X | X | X | X | X | X | X | 0 | 0 | 1 | 0 | 1 | 0 | 0 | 0 |
| 17 | 0 | 1 | 0 | X | 1 | 0 | 1 | X | 0 | X | X | X | X | X | X | X | 0 | 0 | 1 | 0 | 1 | 0 | 0 | 0 |
| 18 | 0 | 1 | 0 | X | 1 | 0 | 1 | X | X | 1 | X | X | X | X | X | X | 0 | 0 | 1 | 0 | 1 | 0 | 0 | 0 |
| 19 | 0 | 1 | 0 | X | 1 | 0 | 1 | X | X | X | 1 | X | X | X | 0 | X | 0 | 0 | 1 | 0 | 1 | 0 | 0 | 0 |
| 20 | 0 | 1 | 0 | X | 1 | 0 | 1 | 1 | 1 | 0 | 0 | X | X | X | 1 | X | 0 | 0 | 1 | 0 | 0 | 0 | 0 | 0 |
| 21 | 0 | 1 | 0 | X | 1 | 0 | 1 | 1 | 1 | 0 | 1 | X | X | X | 1 | X | 0 | 0 | 1 | 0 | 0 | 0 | 0 | 0 |
| 22 | 0 | 1 | 0 | X | 1 | 0 | 1 | 1 | 1 | 0 | 0 | 1 | X | 1 | 0 | X | 0 | 0 | 1 | 1 | 1 | 1 | 0 | 0 |
| 23 | 0 | 1 | 0 | X | 1 | 0 | 1 | 1 | 1 | 0 | 0 | 1 | X | 0 | 0 | X | 0 | 1 | 1 | 0 | 1 | 1 | 0 | 0 |
| 24 | 0 | 1 | 0 | X | 1 | 0 | 1 | 1 | 1 | 0 | 0 | X | X | X | 1 | X | 0 | 0 | 1 | 0 | 1 | 0 | 1 | 0 |
| 25 | 0 | 1 | X | X | 1 | 1 | 0 | 0 | X | X | X | X | X | X | X | X | 0 | 0 | 1 | 0 | 1 | 0 | 0 | 0 |
| 26 | 0 | 1 | X | X | 1 | 1 | 0 | X | 0 | X | X | X | X | X | X | X | 0 | 0 | 1 | 0 | 1 | 0 | 0 | 0 |
| 27 | 0 | 1 | 1 | X | 1 | 1 | 1 | X | X | X | X | X | X | X | X | X | 0 | 0 | 1 | 0 | 0 | 0 | 0 | 0 |
| 28 | 0 | 1 | 0 | X | 1 | 1 | 1 | X | X | X | X | X | X | X | X | X | 0 | 0 | 1 | 0 | 1 | 0 | 0 | 0 |
| 29 | 0 | 1 | X | 0 | 1 | 1 | 0 | 1 | 1 | X | X | 0 | X | X | X | X | 0 | 0 | 1 | 1 | 1 | 0 | 0 | 1 |
| 30 | 0 | 1 | X | 0 | 1 | 1 | 0 | 1 | 1 | X | X | 1 | X | 0 | 0 | 0 | 0 | 0 | 1 | 1 | 1 | 0 | 0 | 1 |
| 31 | 0 | 1 | X | 0 | 1 | 1 | 0 | 1 | 1 | X | X | 1 | X | 1 | X | X | 0 | 0 | 1 | 1 | 1 | 1 | 0 | 1 |
| 32 | 0 | 1 | X | 0 | 1 | 1 | 0 | 1 | 1 | X | X | 1 | X | 0 | 1 | X | 1 | 1 | 1 | 1 | 1 | 1 | 0 | 1 |
| 33 | 0 | 1 | X | 0 | 1 | 1 | 0 | 1 | 1 | X | X | 1 | X | 0 | 0 | 1 | 1 | 0 | 1 | 0 | 1 | 1 | 0 | 1 |
| 34 | 0 | 1 | X | 0 | 1 | 1 | 0 | 1 | 1 | X | X | X | X | X | X | X | 0 | 0 | 1 | 0 | 1 | 0 | 1 | 1 |
| 35 | All Other Input Conditions | | | | | | | | | | | | | | | | 0 | 0 | 0 | 0 | 0 | 0 | 0 | 0 |

TABLE II B
CONTROL LINE SEQUENCER PLA STATE DESCRIPTIONS

| TERM | DESCRIPTION |
|---|---|
| 0 | AUTO LOOP ERROR SET · CONTROL LINE INPUT |
| 1 | NO INPUT · COMMAND QUEUED · WAIT · CLEAR-TO-SEND |
| 2 | NO INPUT · BUS CONTROLLER · COMMAND QUEUED · RESPONSE QUEUED · WAIT · CLEAR-TO-SEND · ENABLED |
| 3 | NO INPUT · BUS CONTROLLER · COMMAND QUEUED · SELECT QUEUED · WAIT · CLEAR-TO-SEND |
| 4 | NO INPUT · BUS CONTROLLER · COMMAND QUEUED · SELECT QUEUED · POLL QUEUED · WAIT · CLEAR-TO-SEND |
| 5 | VALID WORD · WAIT · STATUS RESPONSE |
| 6 | VALID WORD · WAIT · POINT-TO-POINT COMMAND |
| 7 | VALID WORD · WAIT · BROADCAST · STATUS RESPONSE |
| 8 | VALID WORD · WAIT · BROADCAST · STATUS RESPONSE |
| 9 | VALID WORD · WAIT · BROADCAST · STATUS RESPONSE |
| 10 | VALID WORD · WAIT · BROADCAST · STATUS RESPONSE |
| 11 | FORCED COMMAND · CLEAR-TO-SEND |
| 12 | VALID WORD · WAIT · RESPONSE · BUS CONTROLLER |
| 13 | VALID WORD · WAIT · BUS CONTROLLER · POINT-TO-POINT COMMAND · NODE ADDRESS MATCH |
| 14 | VALID WORD · WAIT · BUS CONTROLLER · BROADCAST · RESPONSE |
| 15 | VALID WORD · WAIT · BUS CONTROLLER · BROADCAST · RESPONSE |
| 16 | VALID WORD · WAIT · BUS CONTROLLER · POINT-TO-POINT |

TABLE II B-continued
CONTROL LINE SEQUENCER PLA STATE DESCRIPTIONS

| TERM | DESCRIPTION |
|---|---|
| | COMMAND · $\overline{POLL}$ · NODE ADDRESS MATCH |
| 17 | VALID WORD · WAIT · $\overline{BUS\ CONTROLLER}$ · POINT-TO-POINT |
| | COMMAND · $\overline{POLL}$ · NODE ADDRESS MATCH |
| 18 | VALID WORD · WAIT · $\overline{BUS\ CONTROLLER}$ · POINT-TO-POINT |
| | COMMAND · $\overline{POLL}$ · NODE ADDRESS MATCH |
| 19 | VALID WORD · WAIT · $\overline{BUS\ CONTROLLER}$ · POINT-TO-POINT |
| | COMMAND · $\overline{POLL}$ · NODE ADDRESS MATCH · ENABLED |
| 20 | VALID WORD · WAIT · $\overline{BUS\ CONTROLLER}$ · POINT-TO-POINT COMMAND · POLL · NODE ADDRESS MATCH · DISABLED |
| 21 | VALID WORD · WAIT · $\overline{BUS\ CONTROLLER}$ · POINT-TO-POINT COMMAND · SELECT · NODE ADDRESS MATCH · DISABLED |
| 22 | VALID WORD · WAIT · $\overline{BUS\ CONTROLLER}$ · POINT-TO-POINT COMMAND · POLL · NODE ADDRESS MATCH · COMMAND QUEUED · ENABLED · CLEAR-TO-SEND |
| 23 | VALID WORD · WAIT · $\overline{BUS\ CONTROLLER}$ · POINT-TO-POINT COMMAND · POLL · NODE ADDRESS MATCH · $\overline{COMMAND\ QUEUED}$ · ENABLED · CLEAR-TO-SEND |
| 24 | VALID WORD · WAIT · $\overline{BUS\ CONTROLLER}$ · POINT-TO-POINT COMMAND · POLL · NODE ADDRESS MATCH · $\overline{CLEAR\text{-}TO\text{-}SEND}$ |
| 25 | VALID WORD · WAIT · BUS CONTROLLER · BROADCAST · $\overline{RESPONSE}$ |
| 26 | VALID WORD · WAIT · BUS CONTROLLER · BROADCAST · $\overline{RESPONSE}$ |
| 27 | VALID WORD · WAIT · BUS CONTROLLER · POINT-TO-POINT COMMAND · $\overline{NODE\ ADDRESS\ MATCH}$ |
| 28 | VALID WORD · WAIT · BUS CONTROLLER · POINT-TO-POINT COMMAND · NODE ADDRESS MATCH |
| 29 | VALID WORD · WAIT · BUS CONTROLLER · BROADCAST · RESPONSE · RESPONSE ADDRESS MATCH · CLEAR-TO-SEND |
| 30 | VALID WORD · WAIT · BUS CONTROLLER · BROADCAST · RESPONSE · RESPONSE ADDRESS MATCH · CLEAR-TO-SEND · NOTHING QUEUED |
| 31 | VALID WORD · WAIT · BUS CONTROLLER · BROADCAST · RESPONSE · RESPONSE ADDRESS MATCH · CLEAR-TO-SEND · COMMAND QUEUED |
| 32 | VALID WORD · WAIT · BUS CONTROLLER · BROADCAST · RESPONSE · RESPONSE ADDRESS MATCH · CLEAR-TO-SEND · $\overline{COMMAND\ QUEUED}$ · SELECT QUEUED |
| 33 | VALID WORD · WAIT · BUS CONTROLLER · BROADCAST · RESPONSE · RESPONSE ADDRESS MATCH · CLEAR-TO-SEND · $\overline{COMMAND\ QUEUED}$ · SELECT QUEUED · POLL QUEUED |
| 34 | VALID WORD · WAIT · BUS CONTROLLER · BROADCAST · RESPONSE · $\overline{RESPONSE\ ADDRESS\ MATCH}$ |
| 35 | IDLE (all other input conditions) |

TABLE VI C
CONTROL LINE SEQUENCER PLA INPUTS & OUTPUTS

| INPUTS | |
|---|---|
| A15 | AUTO LOOP ERROR FLAG |
| A14 | VALID WORD |
| A13 | 0 = NODE ADDRESS MATCH |
| A12 | 0 = RESPONSE ADDRESS MATCH |
| A11 | SEQUENCER WAIT FLAG |
| A10 | FIRMWARE FLAG 1 (BUS CONTROLLER) |
| A9 | CONTROL LINE INPUT REGISTER OUT BIT 2 (ADDRESSING MODE) |
| A8 | CONTROL LINE INPUT REGISTER OUT BIT 7 (FUNCTION CODE 3) |
| A7 | CONTROL LINE INPUT REGISTER OUT BIT 6 (FUNCTION CODE 2) |
| A6 | CONTROL LINE INPUT REGISTER OUT BIT 5 (FUNCTION CODE 1) |
| A5 | CONTROL LINE INPUT REGISTER OUT BIT 4 (FUNCTION CODE 0) |
| A4 | CLEAR-TO-SEND |
| A3 | FORCED COMMAND ENABLE |
| A2 | COMMAND ENABLE |
| A1 | SELECT ENABLE/DISABLE |

TABLE VI C-continued
CONTROL LINE SEQUENCER PLA INPUTS & OUTPUTS

| A0 | POLL/RESPONSE ENABLE |
|---|---|
| OUTPUTS | |
| Z7 | CONTROL LINE MULTIPLEXER SELECT 1 |
| Z6 | CONTROL LINE MULTIPLEXER SELECT 0 |
| Z5 | CLEAR VALID WORD |
| Z4 | CLEAR SEQUENCER WAIT FLAG |
| Z3 | LOAD PROCESSOR CONTROL LINE INPUT QUEUE |
| Z2 | SEND WORD |
| Z1 | SET AUTO LOOP ERROR FLAG |
| Z0 | POLL/RESPONSE TIMEOUT CONTROL |

PLA input term A15, "Auto Loop Error Flag" is set by PLA output Z1 and is cleared by a control signal from the Microprogrammable Controller. PLA input A14, "Valid Word" is set whenever a new control word has been loaded into the Control Line Input Register and is cleared by output Z5 when the Control Line Sequencer has processed the word. Inputs A13 and A12, the "Node Address Match" and "Response Address Match" signals, have been previously described. Sequencer input A11, "Sequencer Wait Flag", is set and cleared by control signals from the Microprogrammable Controller. Additionally, it can be cleared by PLA output Z4 and is set by hardware when a poll is sent by the Bus Controller or a response is sent by a Non-Bus Controller node. Its function is to indicate to the Control Line Sequencer that a control word is expected. Input A10 is the "Microprogrammable Controller Firmware Flag 1". When it is in the 0 state it indicates to the Control Line Sequencer that the node is not the Bus Controller. When it is in the 1 state, it indicates that the node is the Bus Controller. Input A9 is the "Control Line Input Register Output Bit 2" which indicates the addressing mode of the received control word. PLA inputs A5 through A8 correspond to Control Line Input Register Outputs 4 through 7, respectively, which comprise the Control Word Function Code bits 0 through 3, respectively. Input A4, "Clear-to-Send" indicates that the control line is available for transmission. Inputs A0 through A3 are flags which are set or cleared by the Microprogrammable Controller via the hardware control signals.

PLA outputs Z7 and Z6 perform the selection of the source for the control line output word as previously described. They are used in conjunction with the "Clear-to-Send" word to cause a transmission of either a poll, response, select or command. Output Z3, "Load Processor Control Line Input Queue", causes the transfer of the control word in the Control Line Input Register either into the Control Line Input Queue or into the Processor Control Line Input Register as previously described. Output Z0, "Poll/Response Timeout Control", is used to reset the Timeout Control Counter initiated by the last poll. It can thus be seen that the PLA outputs perform three simultaneous functions - transmission of the appropriate control word (bits Z7, Z6 and Z2), hand-off of relevant control words to the Microprogrammable Controller (bits Z5, Z3) and error detection (bits Z4, Z1 and Z0). Input pre-processing is only performed if PLA input A14 is set and output words are transmitted only if PLA input A4 is set. Thus, if both of these inputs are 0, the PLA output Term 35 will be generated which is an idle or do-nothing state. If the Auto Loop Error Flag is set, each valid word is passed onto the Control Line Input Queue, however all other sequencer functions are suppressed. This feature permits the Microprogrammable Controller to assume all functions of the Control Line Sequencer, albeit at a degraded level of performance. Sequencer output terms 1 through 4 generate command, response, select or poll transmissions, respectively, while output term 11 generates a forced command, irrespective of the state of the Sequencer Wait Flag. Output terms 5 through 10 are generated for various illegal or illogical control word transmissions. Each of these terms causes the Auto Loop Error Flag to be set. Output terms 12 through 24 are involved with processing control line inputs for the non-bus controller mode while output terms 25 through 34 perform the same function for the bus controller mode. Output terms 12 and 13 are examples of the Control Line Sequencer screening out irrelevant control line words and effectively ignoring them by not activating output Z3.

The parallel operation of the Control Line Sequencer is exemplified by output term 33 in which a response has been interpreted, verified, and the response address has been matched. Thus, the response is passed onto the input queue, the next poll is transmitted and the poll response timeout is reset. With this action performed by the Control Line Sequencer, the Microprogrammable Controller can now use the time of transmission of the poll and its associated response to generate the next control word to be transmitted without incurring any processing overhead in the bus arbitration cycle.

With reference to FIG. 19a, upon each phase 1 clock pulse, the output terms of the Control Line Sequencer PLA are latched into 8-bit latch 750. The outputs of this latch direct the execution of the current control line sequence while the inputs to the PLA are being set up for the next control line sequence. If the $\overline{Q1}$ output of latch 750 is low, indicating a Set Auto Loop Error condition, it will set one of the flip-flops in the Quad Latch 770 to generate the PLA input term A15, "Auto Loop Error Flag". If the Microprogrammable Controller selects the "Clear Auto Loop Error Command" signal on the next phase 1 clock pulse, NAND gate 700 will be enabled and the Auto Loop Error Flag will be cleared via NAND gate 718. Alternately, this flip-flop can be cleared by a Master Clear signal.

PLA input A-11 "Sequencer Wait Flag", is generated by a flip-flop in the Quad Latch circuit 786. This flip-flop can be set by the Microprogrammable Controller by selecting the Processor Set Sequencer Wait Flag which propagates through NAND gate 712 and Negative OR gate 726. Alternately, the flip-flop can be set by the Clear Poll/Response Enable Signal. The "Sequencer Wait Flag" can be cleared by PLA output Z4 via Negative OR gate 728 or, alternately, it may be cleared by the Microprogrammable Controller via NAND gate 714 and Negative OR gate 728. PLA input A2, "Command Enable Flag", is generated by the output of another flip-flop in the Quad Latch 770. This flip-flop is set by the microprogrammable controller via NAND gate 702. When this flag causes a command to be generated, e.g., PLA term 1, the outputs of latch 750 will be as follows:

Q7=0.
Q6=0.
Q2=1.

Thus, the phase 3 clock pulse will enable NAND gate 764 (FIG. 19a) which will clear the command enable flag via Negative OR gate 720. Alternately, the flag can be cleared by the Microprogrammable Controller via NAND gate 704 and Negative OR gate 720. PLA input A1, "Select Enable Flag" is generated by two other flip-flops in Quad Latch 770. This flag can also be set and cleared by the Microprogrammable Controller in the manner previously described. When the Select Enable Flag generates a select, e.g., PLA term 3, the outputs Q7, Q6 and Q3 of latch 750 will be all 1's. Thus, the phase 3 clock pulse will enable NAND gate 766 to clear the Select Enable Flag via Negative OR gate 722. PLA input AO, "Poll/Response Enable" is generated by still another flip-flop in Quad Latch 770. This flip-flop may be set or cleared by the Microprogrammable Controller in the manner previously described. If a poll is generated, e.g., PLA term 4, the outputs Q7, Q6 and Q2 of latch 750 will be 1,0,1, respectively. Since Exclusive OR gate 762 is enabled, NAND gate 768 will also be enabled on clock phase 3, causing the Poll/Response Enable Flag to be reset via Negative OR gate 724. If a response is generated, e.g., PLA term 2, the outputs Q7, Q6 and Q2 of latch 750 will be 0,1,1. Again, Exclusive OR gate 762 is enabled and the flag is cleared as before. The aforementioned flag resets assure that the PLA will execute each event only once each time the respective flag is set. Finally, PLA input A3, "Forced Command Enable Flag", is generated by another flip-flop in Quad Latch 786. It is set and cleared in the same manner as a Command Enable line. All of the flags employed by the PLA can be cleared by the $\overline{\text{Master Clear}}$ signal via Negative OR gates 720, 722, 724, 726, 728 and 730. If the output of NAND gate 745 (FIG. 19b) is low, the Control Line Sequencer is disabled since latch 750 is maintained in a cleared condition, This will be accomplished by a $\overline{\text{Master Clear}}$ signal via Negative OR gate 741 or from the Microprogrammable Controller via NAND gate 737. Alternately, the Microprogrammable Controller can enable the Control Line Sequencer via NAND gate 739.

THE CONTROL LINE DISPATCH QUEUE

Referring to FIG. 21, the Dispatch Queue Input Multiplexer 800 is used to control the selection of the source of the queue input data. Specifically, selection is accomplished by two control signals from the Microprogrammable Controller, i.e., the "Load Request Queue with Destination Bus" signal and the "Load Request Queue with Node Address" signal. When both of these aforementioned signals are low, the normal source is selected, i.e., the Processor Control Line Input Register. This causes bits 7 through 14 of the Processor Control Line Input Register 628 (FIG. 15a) to appear at the outputs 0-7 of the Dispatch Queue Input Multiplexer 800. Bits 7 through 14 of the Processor Control Line Input Register correspond to the node address field of the responding node. If the "Load Request Queue with Destination Bus" signal is selected, the outputs of Multiplexer 800 will correspond to the contents of the Destination Bus Holding Register 856 (FIG. 23) and if the "Load Request Queue with Node Address" signal is selected, the outputs of multiplexer 800 will correspond to the data represented by the Node Address Switch Register The output from multiplexer 800 provides the input for two first-in, first-out (FIFO) buffer memories, one being for priority queues and the other for non-priority queues. All data transfers in and out of these queues is under the control of the Microprogrammable Controller.

Figure 22A:
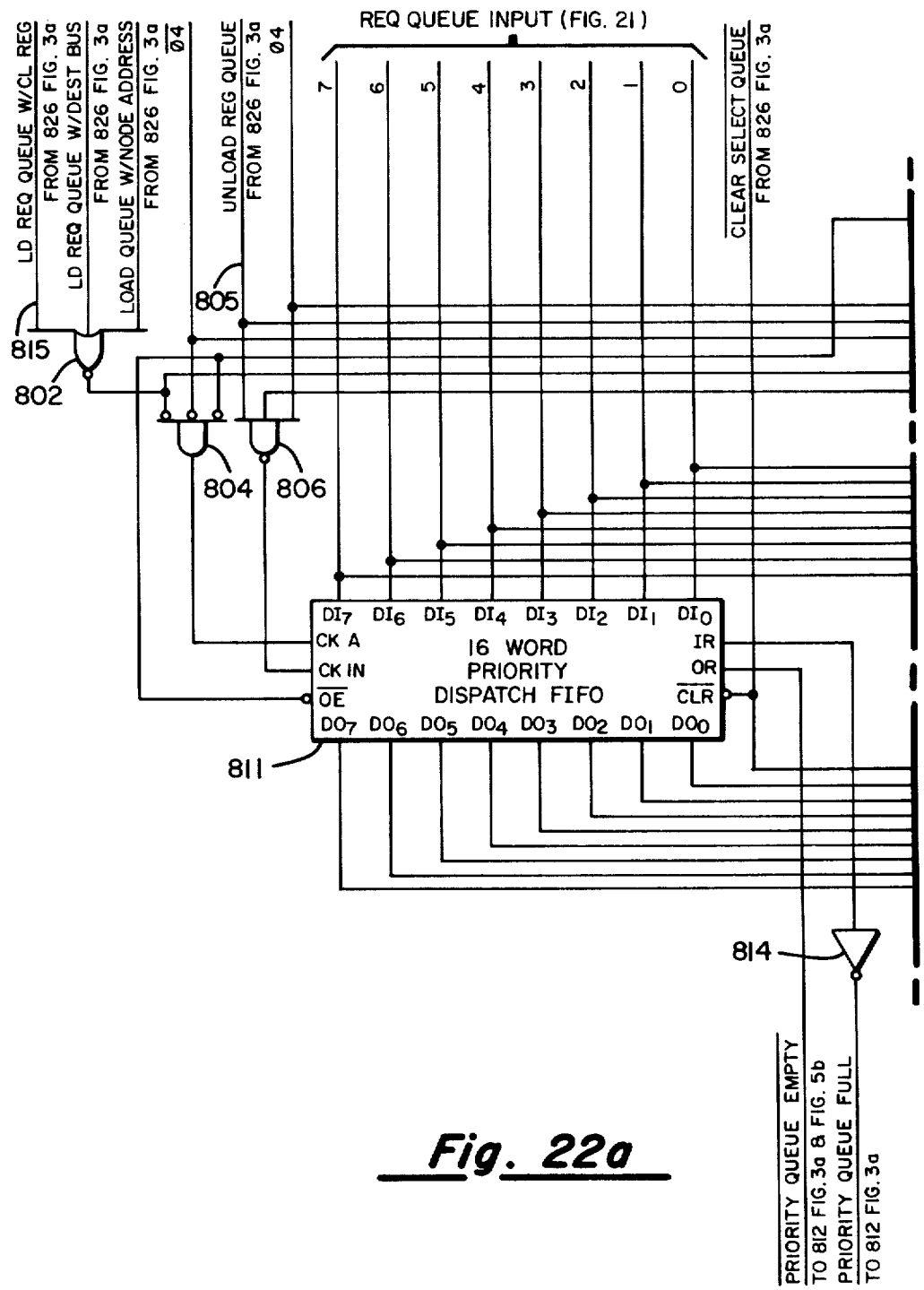
Figure 22B:
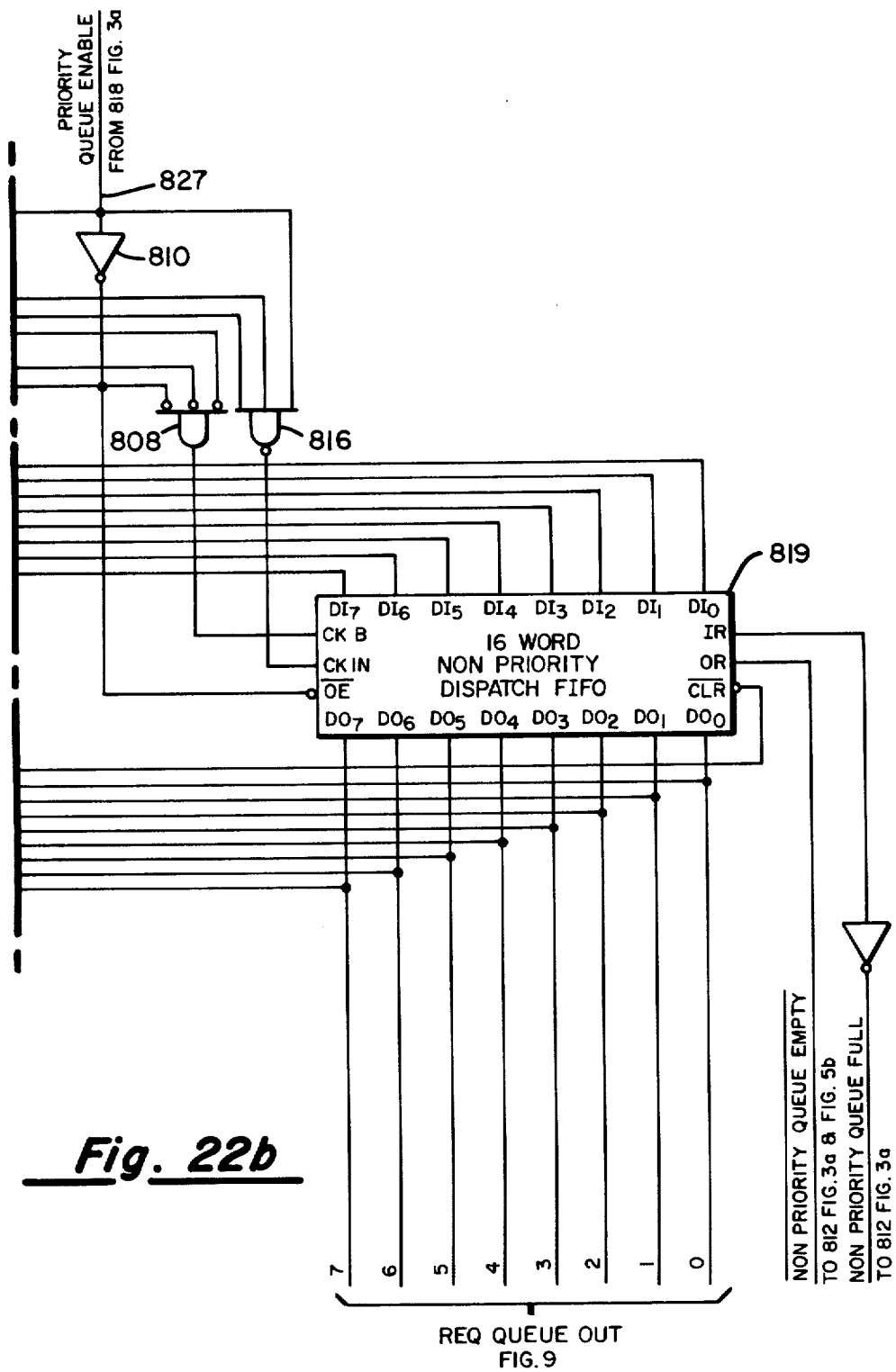

With reference to FIGS. 22a and 22b, the case where data is being loaded into the 16-word Priority Dispatch FIFO 811 will first be considered. In this case, a microinstruction is executed which causes the Priority Queue Enable line 813 to go low and the Load Register Queue with Control Line Register line 815 to go high. It is to be recalled at this point that the former signal is determined by microinstruction bit 51 while the latter signal is determined by a decode of bits 41 to 50 of the microinstruction. Thus, both conditions can be simultaneously and independently selected. These conditions partially enable the negative NAND gate 804 such that on the leading edge of clock phase 4, the output of gate 804 goes positive, to thereby clock the FIFO store 812 which loads the data from the Multiplexer 800 into the next address of the buffer. The same type of action will occur by way of NOR gate 802 if either the destination bus or the node address are selected as data sources. Should the Priority Queue Enable line 813 be high, negative NAND gate 804 will be disabled and, instead, negative NAND gate 808 will be enabled, causing the data to be loaded into the 16-word Non-priority Dispatch Queue 819. (See FIG. 22b).

The foregoing arrangement permits the addresses of nodes requiring service to be sorted on a priority and on a non-priority basis and to be buffered so as to wait for available time on the Data Bus to be selected. This method of queuing assures a high utilization of the Data Bus and also assures that the response time for priority nodes will be unaffected by non-priority traffic.

To unload data from the Priority Dispatch FIFO 811, the Priority Queue Enable line 813 must be low, thus enabling the DO$_0$ to DO$_7$ outputs of the FIFO buffer 811. The output data will, thus, be the first word entered into the FIFO stack. If the Unload Request Queue line 805 is selected, then on the leading edge of the next phase 4 clock pulse, the output of NAND gate 806 will go low and on the trailing edge of that same clock pulse, the FIFO will be advanced causing the next word contained therein to be read out.

If the Priority Queue Enable line 813 is high and the Unload Register Queue line 805 is selected, NAND gate 816 (FIG. 22b) will be enabled instead of the NAND gate 806. This causes the output to be generated by the Non-priority FIFO 819. Each of the FIFO stacks 811 and 819 have tri-state outputs, and, as such, the output lines can be wire OR'ed together and presented as inputs to the Select Register 480 of FIG. 9.

DESTINATION BUS HOLDING REGISTER

In certain cases, it is not possible for the Microprogrammable Controller to transfer data to a node register in a single microinstruction. In this case, the data is developed in the first microinstruction and transferred to the Destination Bus Holding Register 856 (FIG. 23) by selecting the Destination Bus Holding Register Load Enable line 855. The data is thus latched into this register and a subsequent microinstruction can issue the necessary control signal for routing it to its ultimate destination.

CONTROL LINE ACTIVITY MONITORING

Figure 31:
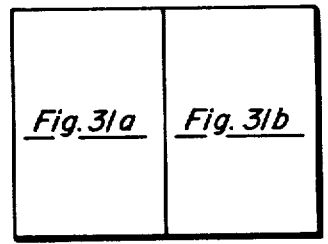
FIGS. 31a and 31b, when arranged as shown in FIG. 31, illustrate the Control Line Activity Detector Circuitry of the node.

The Control Line Activity circuit determines which of the six Stub Transceivers 100–110 is transmitting control information. This information is required to permit reconfiguration if a fault on any of the active channels isolates the Bus Controller from all or part of the rest of the system. Alternately, it permits a node to automatically lock onto the active control cable after a master clear. Discrimination between message and control transmissions is possible since all control transmissions are 16 bits long while message transmissions are between 32 and 4096 bits long. One-shot type timing components 1054 and 1056 (FIG. 31) are chosen such that one-shot 1052 will generate a 1.4 microsecond output pulse, while timing components 1060 and 1062 are set such that one-shot 1058 will develop a 500 nanosecond output pulse. A transmission on cable 6 will cause the $\overline{\text{Stub Receive Envelope 6}}$ signal to be low, thus triggering one-shot 1052. Subsequently, 1.4 microseconds later, one-shot 1052 resets and one-shot 1058 is triggered by the positive transition of the $\overline{Q}$ output of one-shot 1052. Then, 500 nanoseconds after this event, one-shot 1058 resets. At the end of the $\overline{\text{Transmission Stub Receive Envelope 6}}$, line 1063 goes positive, clocking latch 1064. If the length of the transmission is less than 1.4 microseconds, one-shot 1052 will still be set when latch 1064 is clocked. Thus, output $Q_B$ will be high, indicating a noise hit. This signal is optional and is not used in this particular configuration.

If the length of the transmission is greater than 1.4 microseconds but less than 1.9 microseconds, one-shot 1058 will be set at the time that latch 1064 is clocked, thus the output $Q_C$ will be high, indicating control activity on cable 6, since control transmissions are nominally 1.6 microseconds in width. If the transmission is longer than 1.9 microseconds, one-shot 1058 will have reset before latch 1064 has clocked. Thus, the output $Q_D$ will be high, indicating message activity. This is an optional signal which is not used in this configuration. Circuits 1068 through 1076 are replications of the aforementioned Activity Monitoring circuit which serve to sense the conditions of cables 1 through 5. The outputs of these six circuits are logically combined with the Control Line Activity Mask Register 852 (FIG. 23) to develop the Control Line Activity Indicator Flag at the output of Negative NOR gate 870. The outputs can also be individually sensed by the Microprogrammable Controller via the Source Multiplexer 832 (FIG. 3b).

If the Activity Mask Register Load Enable line 857 is selected, AND gate 850 will be enabled on the next clock phase 5 to thereby clock the contents of the Destination Bus into the Activity Mask Register 852. It can be seen that the outputs of this last-mentioned register control the NAND gates 858, 860, 862, 864, 866 and 868 to selectively mask the six Control Line Activity Indicator lines shown enclosed by bracket 859.

In normal operation, only one Control Line is active at any given time. In this case, the Activity Mask Register 852 is set such that only the NAND gate corresponding to the active line is disabled. With no activity on the other lines, the output of NAND gate 870 is low. If control line activity occurs on an unmasked line, the corresponding NAND gates 858, 860, etc., will be enabled, thus causing the output of Negative NOR gate 870 to go high, generating a so-called Control Line Activity Indicator Flag at its output. In the event of a malfunctioning line indicating a false control line activity, the Mask Register 852 can be altered to additionally mask out the malfunctioning line. These features are employed in the reconfiguration of the overall bus system. On the leading edge of clock phase 1, the output from NAND gate 870 is latched into a flip-flop 871 to thereby form the Latched Control Line Activity Indication Flag at the Q output thereof.

CONTROL LINE DECODER

Figure 24:
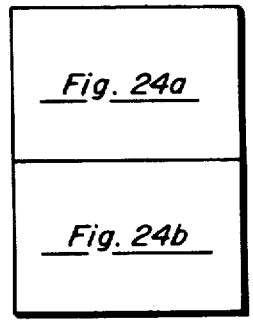
FIGS. 24a and 24b, when arranged as shown in FIG. 24, depict by means of a block diagram the Control Line Decoder portion of the node, FIG. 25 illustrated by means of a block diagram the Control Line Encoder portion of the node.

The Active Bus Number (ABN) register 922 controls the vectoring of the stub transmit and receive signals for both the Control Line and the Message Line. It is reset to 0 by a $\overline{\text{Master Clear}}$ pulse. If the ABN Register Load Enable signal is selected, the phase 5 clock pulse will fully enable NAND gate 920, causing the contents of the Destination Bus to be loaded into register 922. Outputs Q0 through Q2 of register 922 determine the selection of the Control Line Stub cable while outputs Q3 through Q5 determine the selection of the Message cable. The outputs of register 922 perform the selection of the Stub Receive Envelope signal from the designated Control Line cable via a Control Envelope Multiplexer 924. The same outputs select the stub Manchester Data Signal from the same stub receiver via Control Data Multiplexer 926. The envelope and data signals are converted into data and clock signals by the Manchester Decoder 928. Since the implementation and the functions performed by circuits 928 through 936 are well understood by those skilled in the art, they are shown in block diagram form in FIG. 24 for the sake of brevity.

Figure 26:
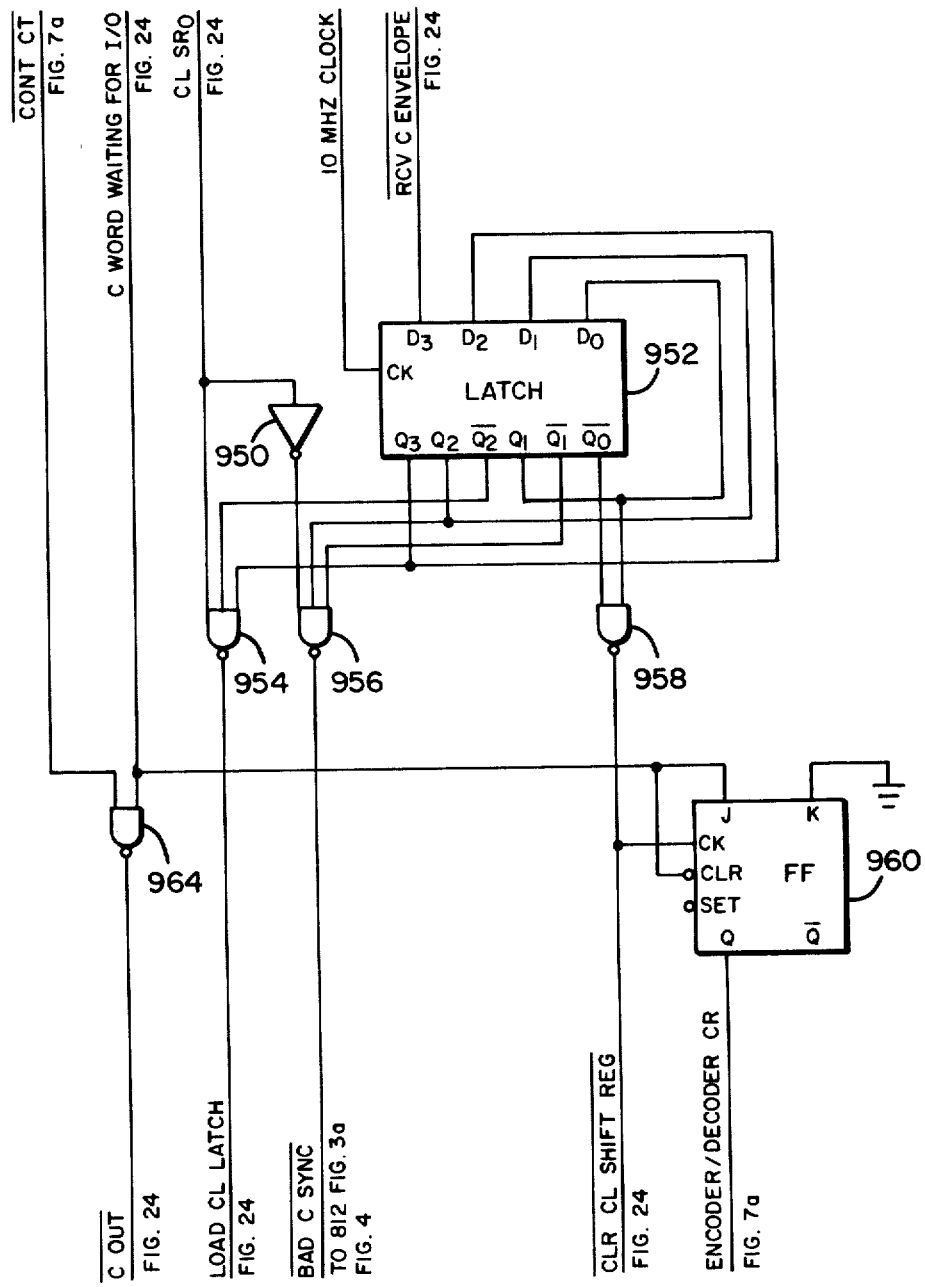
FIGS. 26, 27 and 28 together illustrate the control circuitry for the Control Line Encoder/Decoder apparatus of FIGS. 24 and 25.

Initially, the 16-bit shift register 930 is cleared and the clock is enabled. When a Control Line input is received, data is shifted into shift register 930 until on the 16th clock pulse the "sync" bit is shifted into the last bit of the shift register, stage SRO. This action disables the clock and freezes the word in the shift register 930. The $\overline{\text{Receive C Envelope}}$ signal is also presented to the input of a further shift register 952 (FIG. 26). This circuit is clocked by a 10 MHz clock signal in which the leading edge thereof corresponds to the trailing edge of a 20 MHz clock. Shift register 952 is used to generate three control signals which are delayed from the trailing edge of the Receive C Envelope signal. The first clock pulse after the trailing edge of the Control Line Envelope causes output Q3 of 952 to set. If the "sync" bit is properly positioned in the register 930, NAND gate 954 will be enabled. Then, on the next clock pulse, output $\overline{Q2}$ of shift register 952 will go low, thus disabling NAND gate 954 and causing the contents of register 930 to be latched in the 18-bit latch 934. Also, flip-flop 962 is clocked at this time. Normally the J input of this flip-flop should be low at this time. If it is not, it indicates that the previous word has not been unloaded by the Control Line Sequencer and therefore flip-flop 962 sets to generate the $\overline{\text{Bad C Word Overlap}}$ signal. With outputs Q3 and Q2 of shift register 952 both equal to "1" at this time, the NAND gate 956 will be enabled if the "sync" bit is missing, thus generating the $\overline{\text{Bad C Sync}}$ signal. On the next clock pulse output, Q1 of shift register 952 goes high. Since the $\overline{Q0}$ output is also high at this time, NAND gate 958 is enabled, generating the $\overline{\text{Clear Control Line Shift Register}}$ signal which clears shift register 930, thus initializing it for the next input.

On the next clock pulse, the $\overline{Q0}$ output of shift register 952 goes low thus disabling NAND gate 958 and clocking flip-flop 960. The least significant bit of latch 934 is forced to a 1. Thus, if it has been clocked the "C Word Waiting for IO" signal will be high and flip-flop 960 will therefore be set generating the "Encoder/Decoder CR" signal. The "Control $\overline{CT}$" signal is normally high at this time. Hence, the tri-state buffer 936 is enabled via NAND gate 964 such that the data in the upper 16-bits of latch 934 is present on the CI/O Bus.

Figure 27:
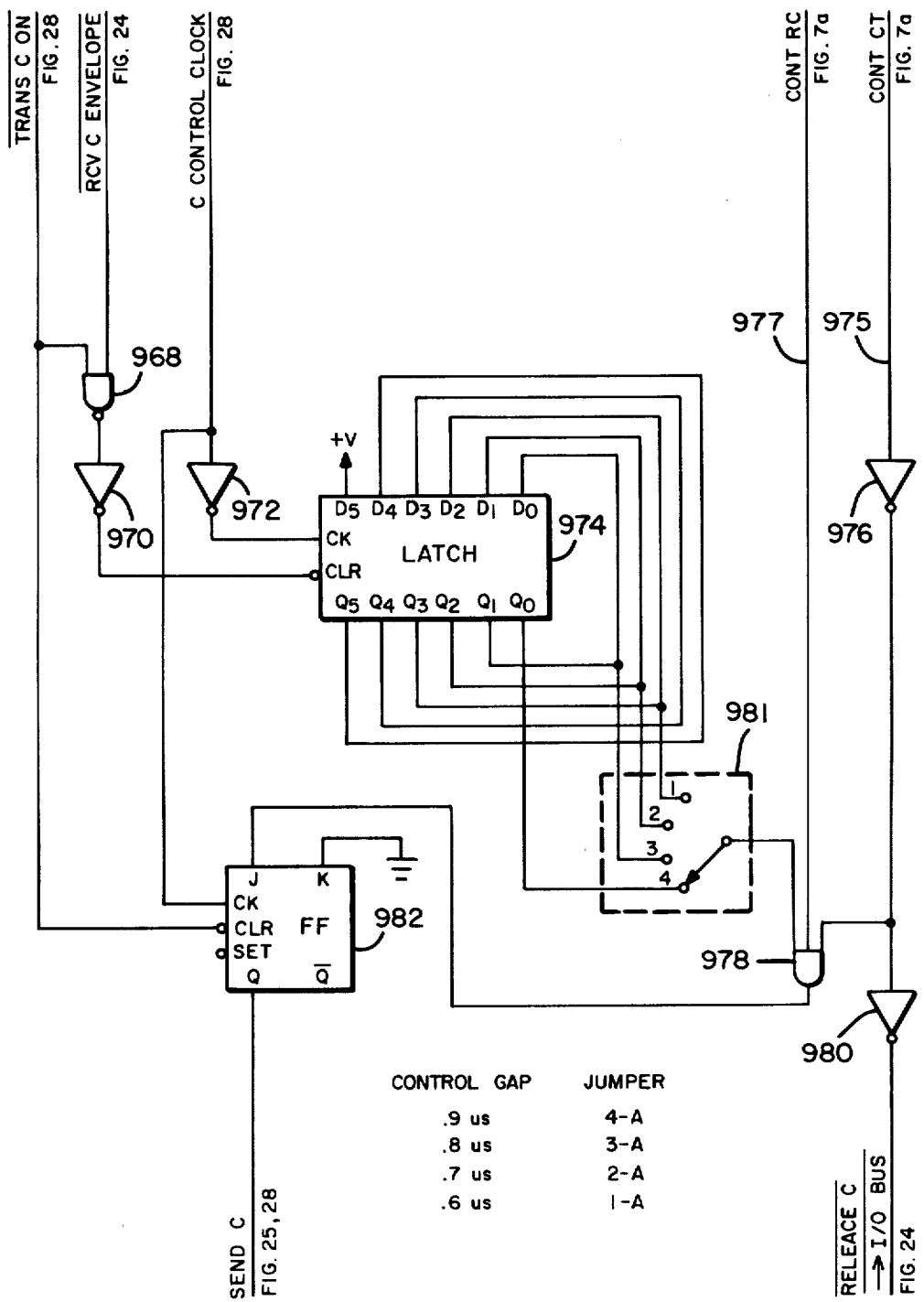

When the Control Sequencer has captured the control word, the "Control $\overline{CT}$" signal goes low thus causing the "Release C to IO Bus" signal to also go low via inverters 976 and 980 (FIG. 27). This causes the data in latch 934 to be cleared, initializing it for the next input word.

Again with reference to FIG. 24, the control word parity is checked by Parity Check circuit 932 and this data is latched along with the control word in the bit 1 position of an 18-bit latch 934 to generate the "Bad Parity" signal. To transmit a control word, the Control Line Sequencer first sets the "Control $\overline{CT}$" line to 0. This disables buffer 936 and permits the Control Line Sequencer to place the control word to be transmitted on the CI/O bus.

Shift register 974 (FIG. 27) assures that the required time gap is maintained between control words. If a control word envelope is detected or if the control word transmitter is on, the output of NAND gate 968 will be high, thus maintaining shift register 974 in a cleared condition via inverter 970. When the control line next goes inactive, NAND gate 968 is enabled and the Clear of shift register 974 is released. The shift register is then clocked on the trailing edge of the C Control Clock pulse which is a 10 megahertz signal in which the leading edge corresponds to the trailing edge of alternate 20 megahertz clock pulses. Each successive clock pulse will then cause the stages of shift register 974 to set, starting with output Q5 and proceeding to output Q0. Outputs Q3 to Q0 of shift register 974 are connected to poles 1 through 4 of a switch 981, respectively. Output Q0 becomes one of the inputs to AND gate 978. If the Control Line Sequencer has a word ready to send, the "Control $\overline{CT}$" line 975 will be low and the Control RC line 977 will be high. Thus, six clock pulses after the control line has become idle, AND gate 978 will be enabled. On the leading edge of the next clock pulse, flip-flop 982 is set generating the "Send C" signal. In this manner, switch 981 permits the control word gap to be set from 0.6 nanoseconds to 0.9 nanoseconds in 100 nanosecond increments depending on the jumper connection used as indicated in the legend adjacent the switch in FIG. 27. The "Send C" signal causes the data on the C/IO bus to be loaded into Control Line Transmit Register 940. It also causes flip-flop 986 to be set on the next clock pulse, thereby generating the "Transmit Sequencer Enable" signal via inverter 988.

Figure 25:
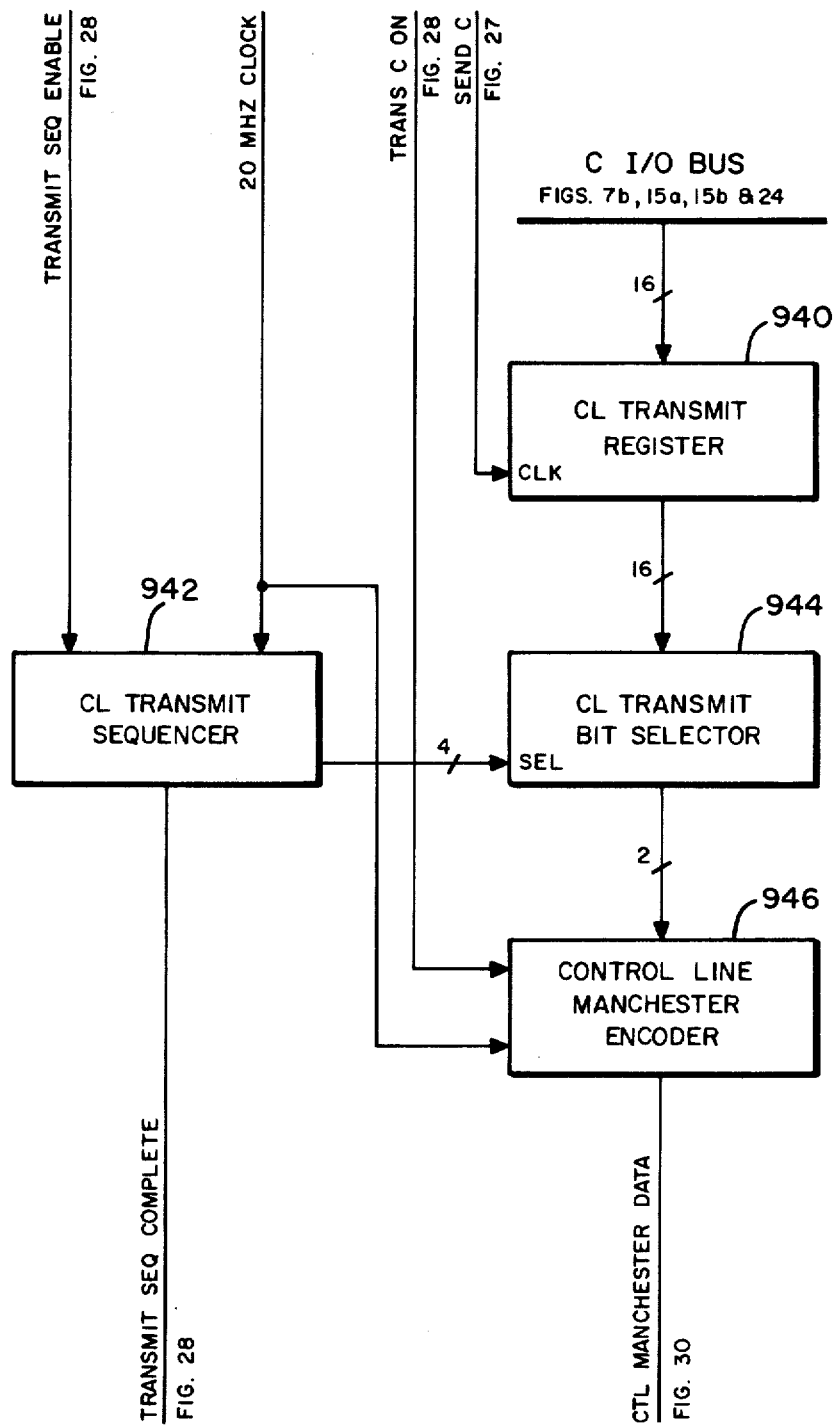

On the next clock pulse, flip-flop 990 is set, generating the "Transmitter C On" signal. Upon the generation of each clock pulse, Control Line Transmit Sequencer 942 (FIG. 25) generates a new 4-bit select code, causing the Control Line Transmit Bit Selector 944 to successively select each bit of the control word from the lowest order to the highest order. This data is presented to the Control Line Manchester Encoder 946 which converts it to the well-known Manchester biphase data format.

Figure 28:
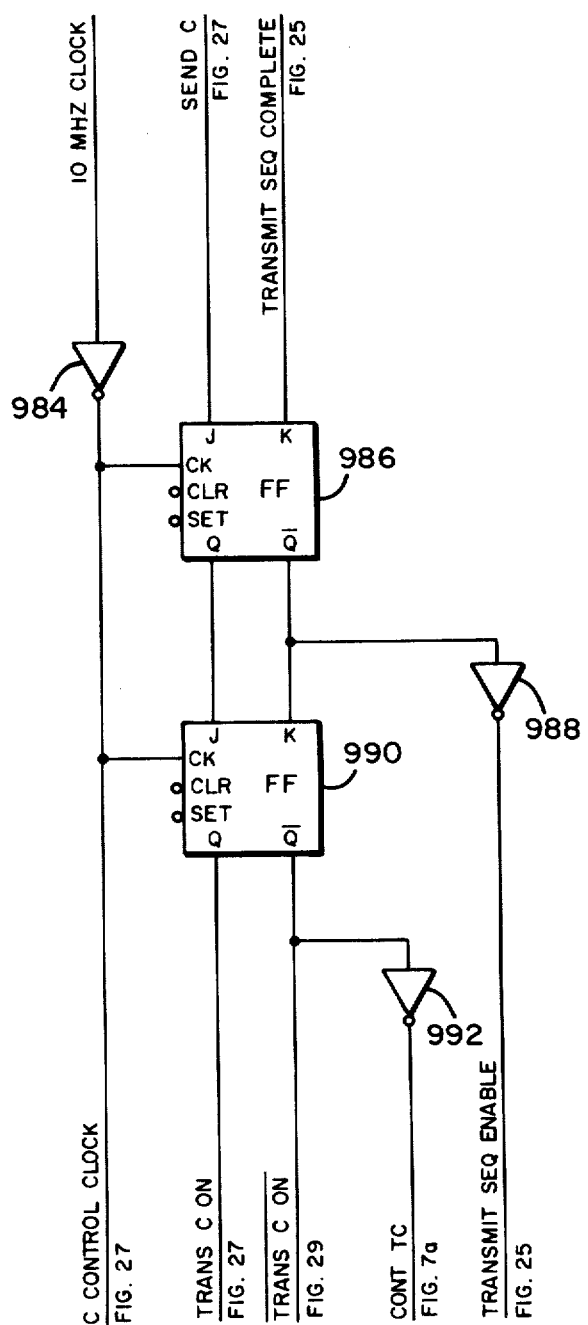
Figure 29A:
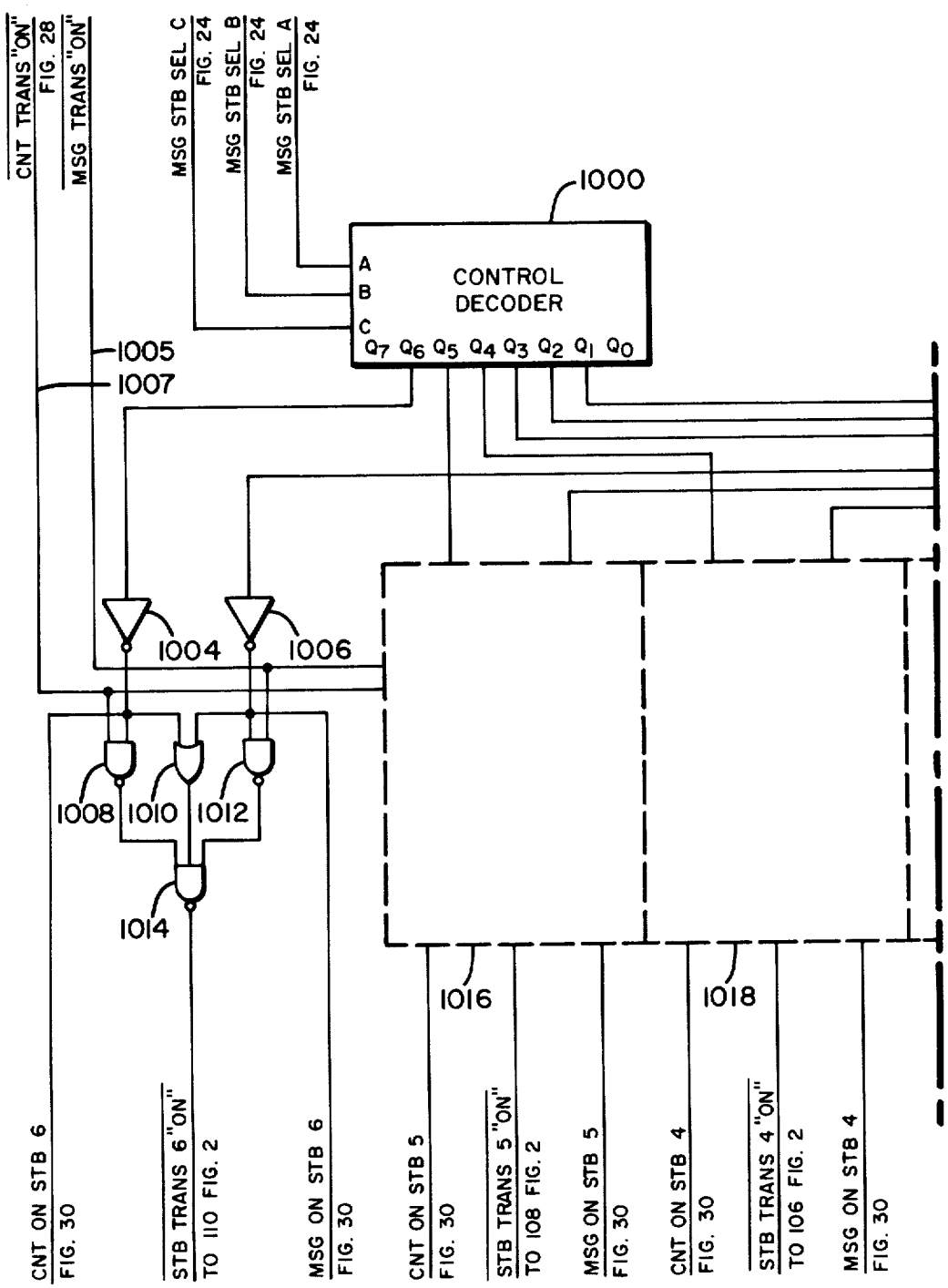
Figure 29B:
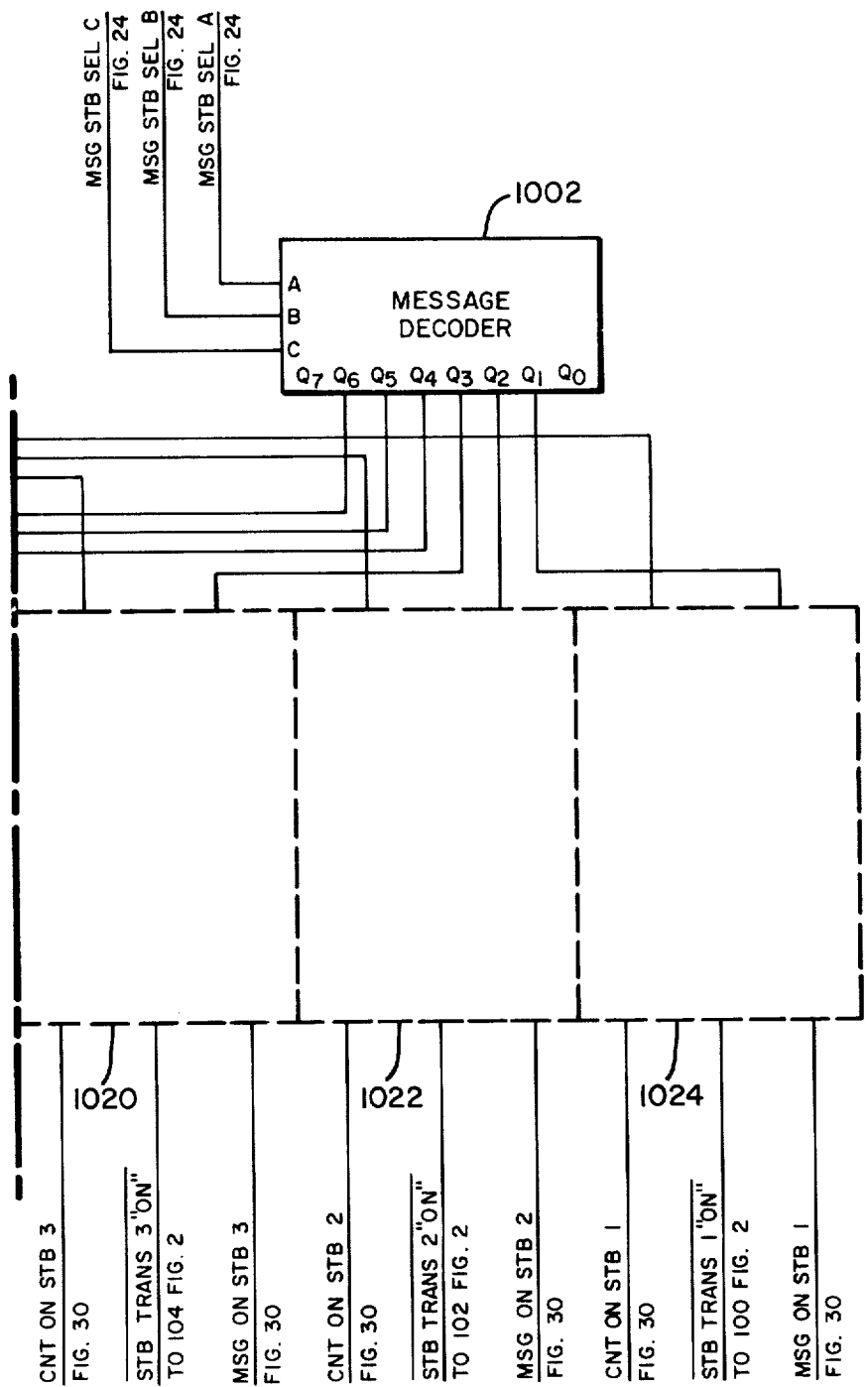

When all 16 bits have been selected, the Control Line Transmit Sequencer 942 generates the transmit "Sequence Complete" signal which subsequently causes flip-flops 986 and 990 (FIG. 28) to reset and thus turn off the transmitter. The "Transmit C On" signal is resynchronized with the 20 megahertz clock within the encoder 946 to generate the Control Transmitter On signal.

Figure 29:
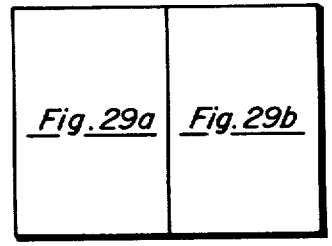
FIGS. 29a and 29b, when arranged as shown in FIGS. 29, and 30, together illustrate by a logic diagram the stub vectoring logic portion of the node.

Control Decoder 1000 (FIG. 29) provides the signals which route the control transmission to the designated stub transmitter. Control Stub Selects A, B and C form a 3-bit code which causes the corresponding decoder 1000 output to go low. If, for example, the select code were 1,1,0, output 6 of the decoder 1000 would cause the output of inverter 1004 to go high, thus selecting Stub Transmitter #6 for control transmissions. Message Decoder 1002 performs the same function, i.e., to select the transmitter for message data. Assuming this decoder has selected a line other than output 6, inverter 1006 will be low. Thus, when the Control Transmitter ON line 1007 goes low, the output of NAND gate 1008 will go high, thus enabling NAND gate 1014 to generate the "Stub Transmitter 6 On" signal. If output 6 is selected by the Message Decoder 1002 but not by the Control Decoder 1000, then the output of inverter 1006 will be high and the output of inverter 1004 will be low. This will result in NAND gate 1014 being enabled when the Message Transmit On line 1005 goes low. If line 6 is not selected by either the Message or the Control Decoder, NAND gate 1014 will be disabled via QR gate 1010. If line 6 is selected by both the Control Decoder and the Message Decoder, NAND gate 1014 will be disabled by either NAND gate 1008 or 1012 since both the Message Transmit On line 1005 and the Control Transmit On line 1007 cannot both be low at the same time. Thus, transmission is inhibited for this condition. Circuits 1016 through 1024 constitute five other replications of logic gates 1004 through 1014 and provide the selection signals required for the other five stub transmitters. Because of their identical construction, a detailed explanation of their operation is deemed unnecessary.

Figure 30:
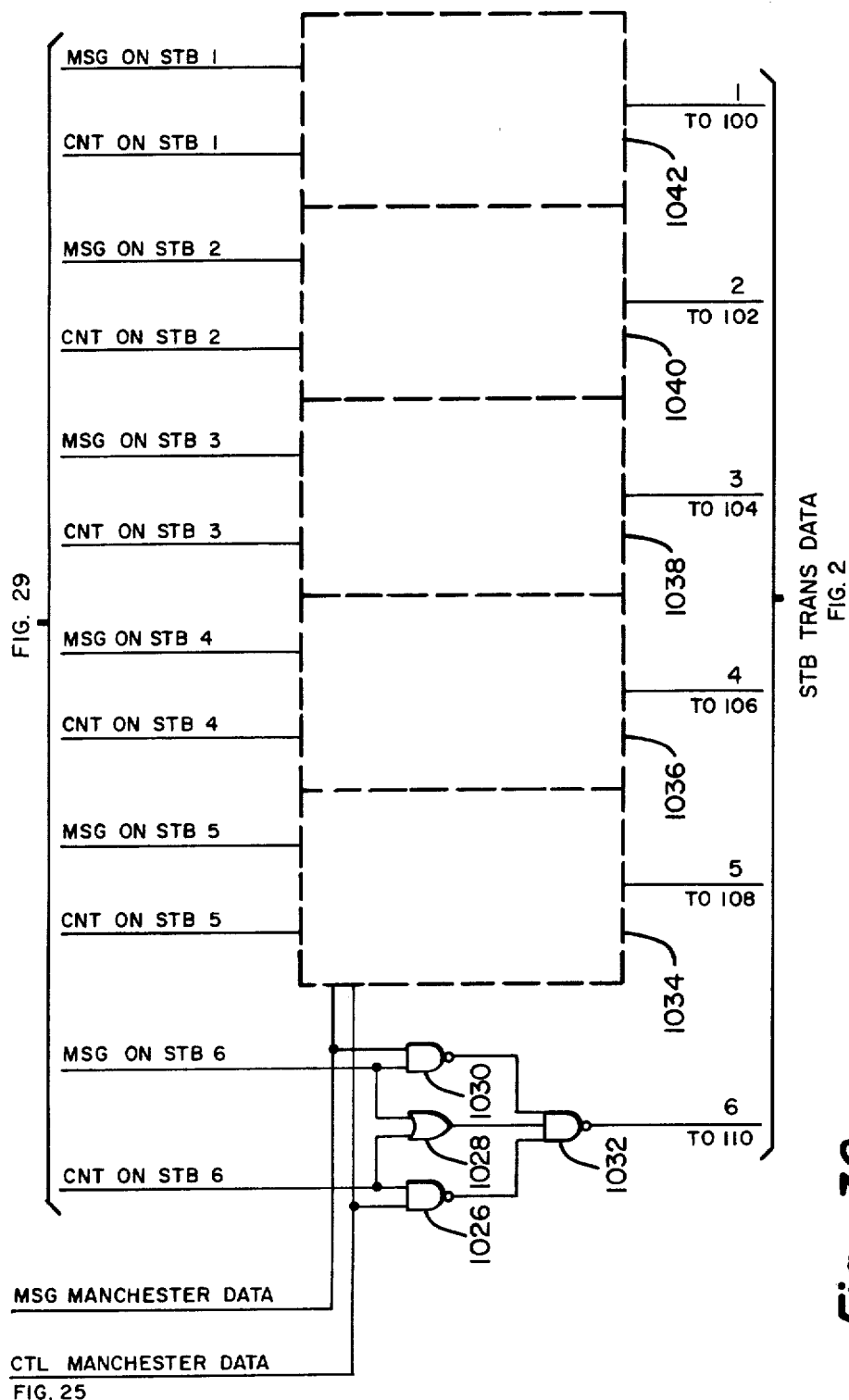
Figure 31A:
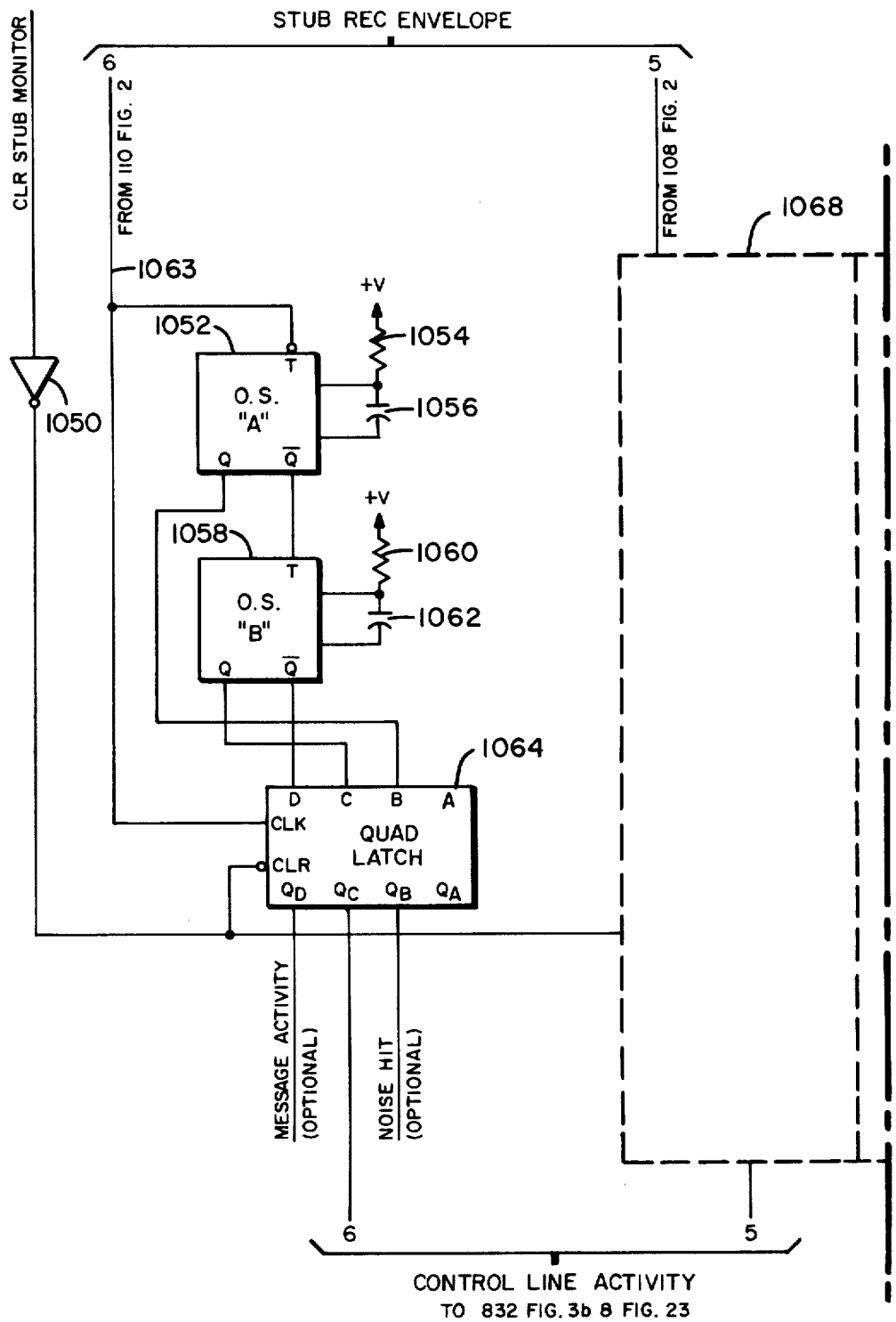
Figure 31B:
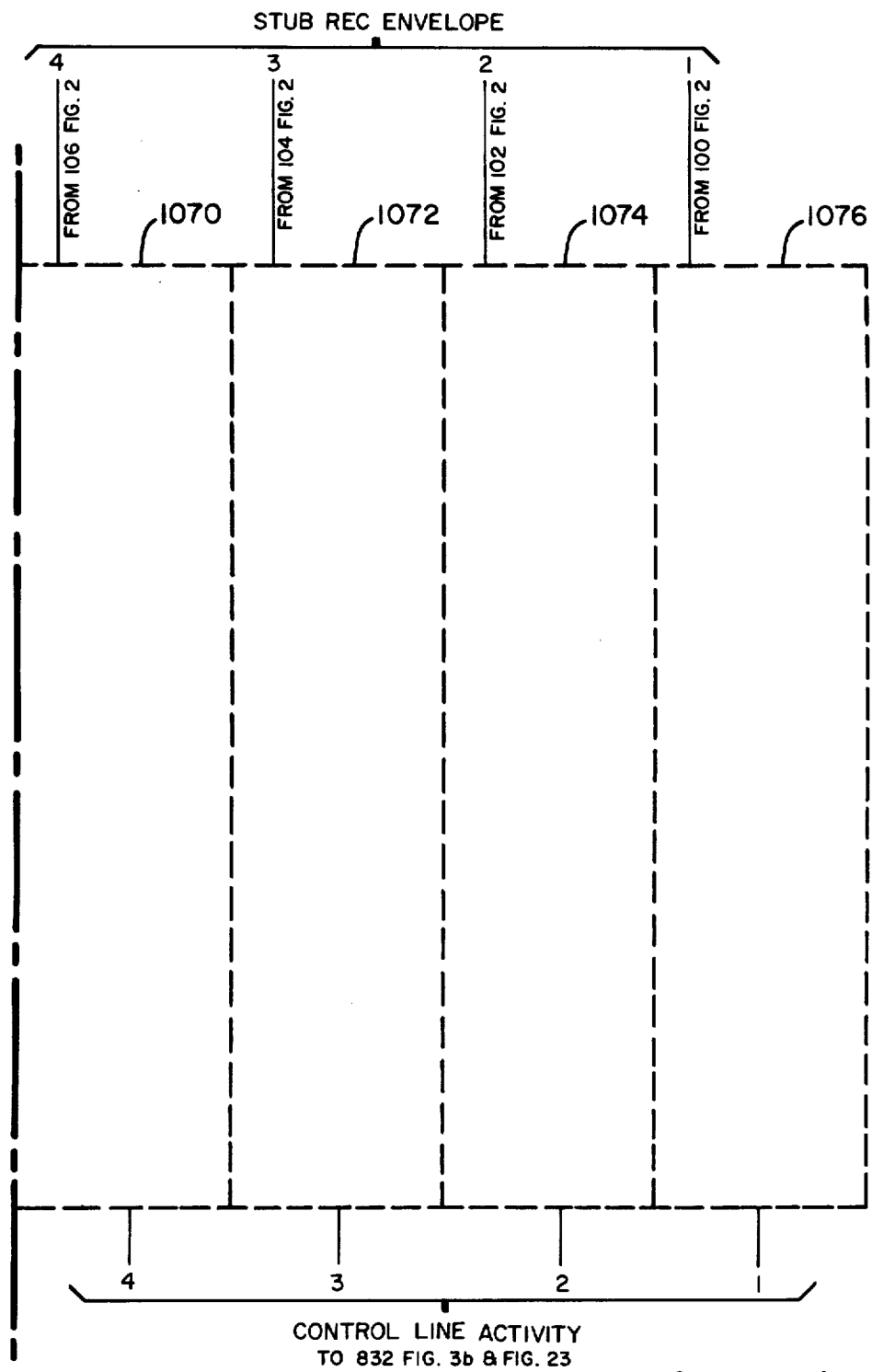
Figure 32A:
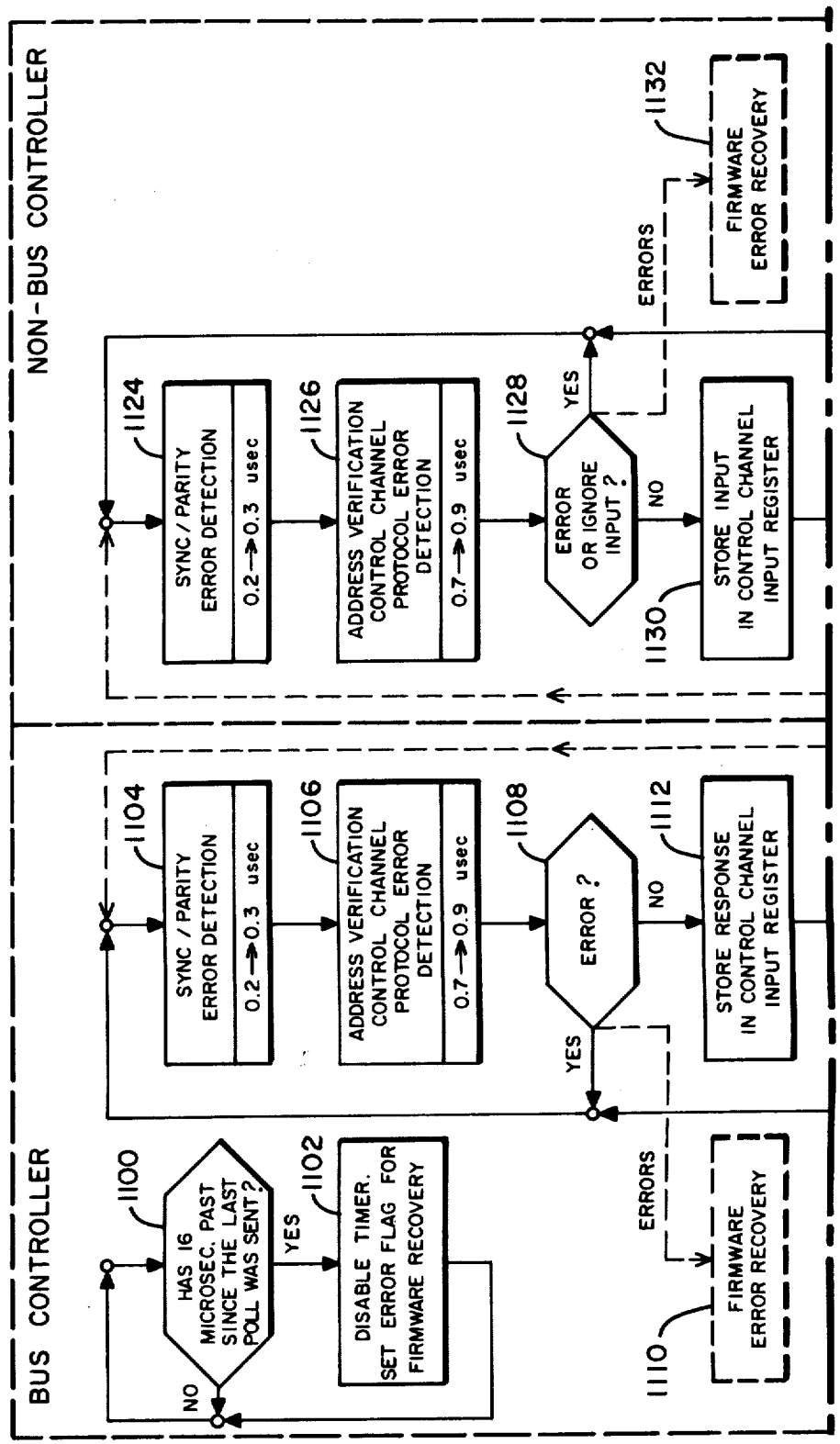
Figure 32B:
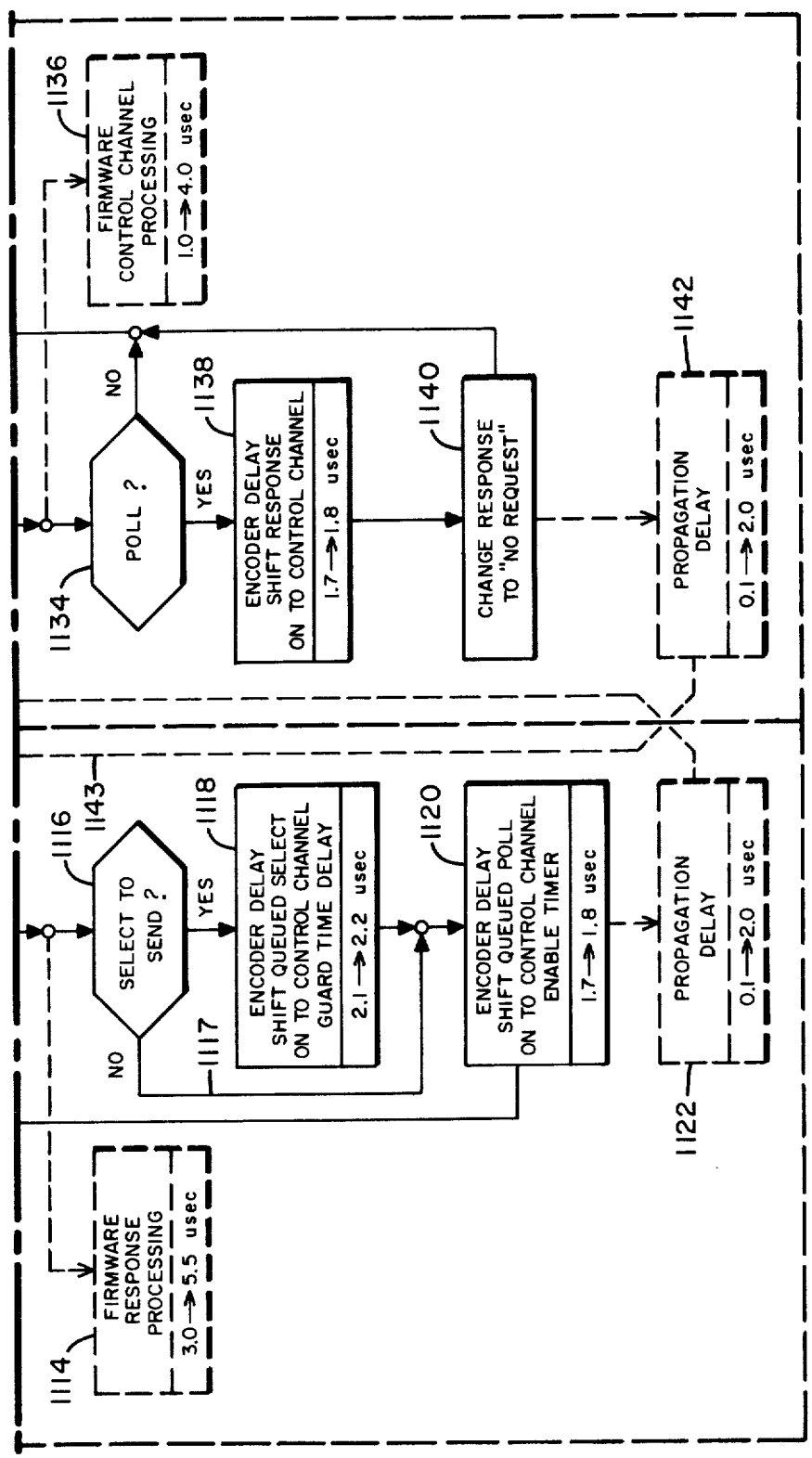

If stub 6 is selected by the Control Decoder 1000, the Manchester control data is routed via NAND gate 1026 and AND gate 1032 (FIG. 30) to Stub Transmitter 6. If stub is selected by the Message Decoder 1002, the Manchester message data is routed via NAND gate 1030 and AND gate 1032 to Stub Transmitter 6. If stub 6 is not selected by either decoder, NAND gate 1032 is disabled via OR gate 1028. Circuits 1032 through 1040 are replications of logic gates 1026 through 1032 which provide the data routing for the other five stub transmitters. The details of the communicastion and control for the Message Encoder/Decoder are virtually identical to those of the Control Decoder/Encoder, the only distinction being the additional features required to handle the multiple word transmissions for the message Encoder/Decoder. Therefore, a detailed discussion of this circuitry is not deemed necessary.

BUS ARBITRATION SEQUENCE

Figure 32:
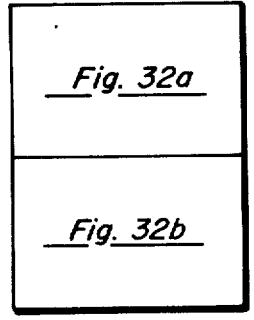
FIGS. 32a and 32b, when arranged as shown in FIG. 32, are flow diagrams illustrating the bus arbitration methodology.

FIG. 32 shows a flow diagram of the diagram of the sequence of events which occurs principally in hardware to accomplish the bus arbitration while FIG. 33 is a flow diagram of the firmware running in the Microprogrammable Controller which supports the bus arbitration. This separation of hardware and firmware into two flow diagrams has been done to clarify the operation, however it should be understood that the firmware and hardware operate very interdependently and concurrently. This description will relate the events described in the two flow diagrams to the relevant circuitry of the node starting with the first event for the Bus Controller node, i.e., the Sync/Parity Error Detection represented by block 1104. The arbitration cycle is entered at the point where the Bus Controller is receiving a response from a responding node. The data passes through one of the six Stub Transceivers, for example, Stub Transceiver 100 of FIG. 2a, through the Data Multiplexer 926 of FIG. 24, the Manchester Decoder 928, the 16-bit shift register 930, the parity is checked on Parity Checker 932 and the data and parity is assembled in 18-bit latch 934. The control word is then transmitted via buffer 936 and the CIO bus 132 to the Control Line Input Multiplexer/Register 628 and 630 (FIG. 15a). When the control word has been latched into registers 628 and 630, the address verification and control channel protocol error detection step represented by block 1106 of FIG. 32 can commence. The control line address field is compared by the Response Address Match Circuit 634 (FIG. 16) to provide an input to A13 of the Control Line Sequencer PLA 748 to perform the address verification test. The instruction field of the control word is presented to inputs A5 through A9 of PLA 748 which are examined to perform the protocol error detection test. Circuits 952, 956, 958, 960, 962 of FIG. 26, 444, 446, 448, 450, 452, 454 of FIG. 7a, 600, 602, 606, 608 and 612 of FIG. 15a are employed in the manner previously described to determine that a valid error-free control word has been generated. This status signal is presented to input A14 of PLA 748 (See Table VI C). The block 1108 of FIG. 32 labeled "Error or Ignore Input" comprises a test performed by PLA 748. As has been previously described, the various A-input terms to this PLA will cause the corresponding output terms shown in Table VI C to be generated to thereby initiate various node actions. If PLA 748 (FIG. 19a) detects an error, the so-called Auto Loop Error Flag will be set via the output of stage Q1 of latch 750. The process loops back to the event represented by block 1104, in which the firmware error recovery is initiated as represented by block 1110. All error conditions, including the Auto Loop Error Flag, are OR'ed together via gates 200, 202, 204, 206, 208, 210 of FIG. 4 and D-type latch 220 to provide the Error Flag input A15 of Mapping PLA 224. Thus, any error flag will cause the firmware to branch to the error recovery routine.

If a valid error-free response has been received, the operation entitled "Store Response in Control Channel Input Register" (block 1112) will be executed. PLA 748 generates a "Load Processor Queue" signal via Q3 of latch 750 (FIG. 19a). This causes the control word bytes in registers 628 and 630 (FIGS. 15a and 15b) to be loaded into the Control Line Input FIFO 636 of FIG. 17. If the FIFO is empty, the control word bypasses the FIFO and is loaded directly into the processor Control Line Input Multiplexer/Register 676 as previously described. Either of these events initiates the "Firmware Response Processing" indicated by block 1114. This operation will be examined in greater detail in the description of the arbitration algorithm flow diagram of FIGS. 33a and 33b. The "Select-to-Send" decision indicated by block 1116 is performed by PLA 748 as previously described. If the firmware processing of a previous response has queued a select, the event 1118, which is the transmission of this select, is initiated. As previously described, selects are unloaded from the Dispatch Queue, first in order of priority, then in order of age. Thus, the address of the next node to be selected will be present at the output of either Dispatch Queue 811 or 819. This address is transferred to the Select Register 480 and passes via Control Line Output Multiplexer 400 and CIO bus 132 to the Control Line Transmit Register 940. Bits 2 through 6 of the Control Line Output Multiplexer 400, which represent the function code, are forced to a 11011 code indicating a select. Parity and sync bits as well as addressing mode bits are added to complete the formation of the control word in the Control Line Transmit Register 940 of FIG. 25. The Control Line Transmit Bit Selector 944 converts the control word to a serial bit stream which is passed through Manchester encoder 946 to generate the biphase Manchester data format. This propagates through the selected data path, for example, gates 1026 and 1032 in FIG. 30, to the selected Stub Transceiver, as, for example, transceiver 100, to its associated BAM and thus it is transmitted to the other nodes.

If there is no select to be sent, event 1118 is bypassed as represented by line 1117 and the node operation proceeds to the next event represented by block 1120 which is the transmission of the poll. This is similar to the previous event except that the source of data for the node address field is either Poll List 518 or 530, depending upon whether priority or non-priority polls are being generated. In this case, the control word function code is set to binary value 11001 which corresponds to the poll command. The control word is passed from the Control Line Output Multiplexer 400 to the selected BAM in the same manner as previously described. This completes the description of all events associated with the Bus Controller node.

Propagation delay block 1122 is indicative of the delay encountered on the serial data bus before a message is received by the addressed non-bus controller node. The delay, typically in the range of from 0.1 to 2 microseconds corresponds to nodes which are nearest or furthest from the Bus Controller, respectively. The non-bus controller nodes have the identical hardware and firmware structure as the Bus Controller. The only difference between the two is that the Bus Controller Flag is not set in the case of the non-bus controller nodes. This results in the generation of different output for both the Control Line Sequencer PLA and the Mapping PLA. Thus the Sync/Parity Error Detection represented by block 1124 is identical in all respects to the event described above in connection with block 1104.

The next event, "Address Verification Control Channel Protocol Error Detection" (block 1126) is very similar to the event described for block 1106, the only difference being that protocol errors are detected in the context of a non-bus controller. For example, if event 1106 detects a poll, that would be considered an error while the detection of a response by event 1126 would likewise be considered an error. While address verification described in connection with event 1106 involved comparing the response to the previously polled address, address verification in event 1126 comprises the comparison of the address in the control word to the node address via Comparator 632. In the normal mode of operation, the Bus Controller would generally expect to get a previous address response match, while the non-bus controller would expect to get many transmissions which do not match the node address. The Error or Ignore Input decision block 1128 signifies an operation essentially identical to that represented by block 1108 causing the node to loop back to operation 1124 when there is not an address match and thus ignore all polls or selects which are no addressed to that particular node. Similarly, an error invokes both the loop back operation just mentioned as well as initiating Firmware Error Recovery as represented by block 1132, all in the same manner as described for the event represented by block 1110.

Event 1130, "Store Input in Control Channel input Register" is identical in all respects to the previously described event 1112. Event 1136, Firmware Control Channel Processing is similar to event 1114, but is again performed in the different context of a non-bus controller. The control word function code is tested as indicated by decision block 1134 to determine whether or not it is a poll. As before, this decision is performed by generating appropriate output terms from the Control Line Sequencer PLA 748. If the control word is not a poll, no further action is required by the Controller Line Sequencer, although the word is passed on to the Microprogrammable Controller for processing. (See FIG. 33.) Therefore, the output term thus generated effectively causes the non-bus controller to loop back to the beginning of operation 1124 and to wait for the next control line transmission. If a poll is detected, the event represented by block 1138 is executed to generate the required response. This event is similar to event 1120 except that bits 2, 5 and 6 of the control word are forced to 0, 1, 1 respectively to indicate that this is a "response" format and the two bits of the Response Register 138 of FIG. 2a are inserted in control word bit positions 3 and 4. Response codes 0,0; 0,1; 1,0 and 1,1 indicate node fault, no request, normal request and immediate request, respectively. Once the response has been transmitted, the Response Register is reset to an 0,1 code to indicate "no request" (see block 1140). This assures that the node makes only one request for service even though that request may still be in a queue at the Bus Controller at the time the node is again polled. Event 1142 (Propagation Delay) is identical in all respects with event 1122 previously explained. The response is received by the Bus Controller in block 1104 as represented by the broken line path 1143, thus completing the arbitration cycle.

The effect of this arbitration cycle is to create a control linkage between firmware running in the Bus Controller and firmware running in the polled node. This linkage is established between the Bus Controller node and all other nodes on the serial data bus. It is to be noted that none of the firmware processing is an in line event in the arbitration cycle. Each transmission by either node is queued and ready to go by processing which has been done in the time required for the previous transmission. Since the firmware processing time is always less than the time required to execute the arbitration cycle, the firmware processing does not contribute any time delay. The high degree of symmetry between the functions performed in the Bus Controller node and the non-bus controller node permit the mode of any given node to be easily switched by merely changing the state of a single firmware flag. This permits the Bus Controller function to be reassigned to any of the plural nodes on the serial data bus, a feature which will be discussed in more detail in the section entitled System Reconfiguration.

Figure 33A:
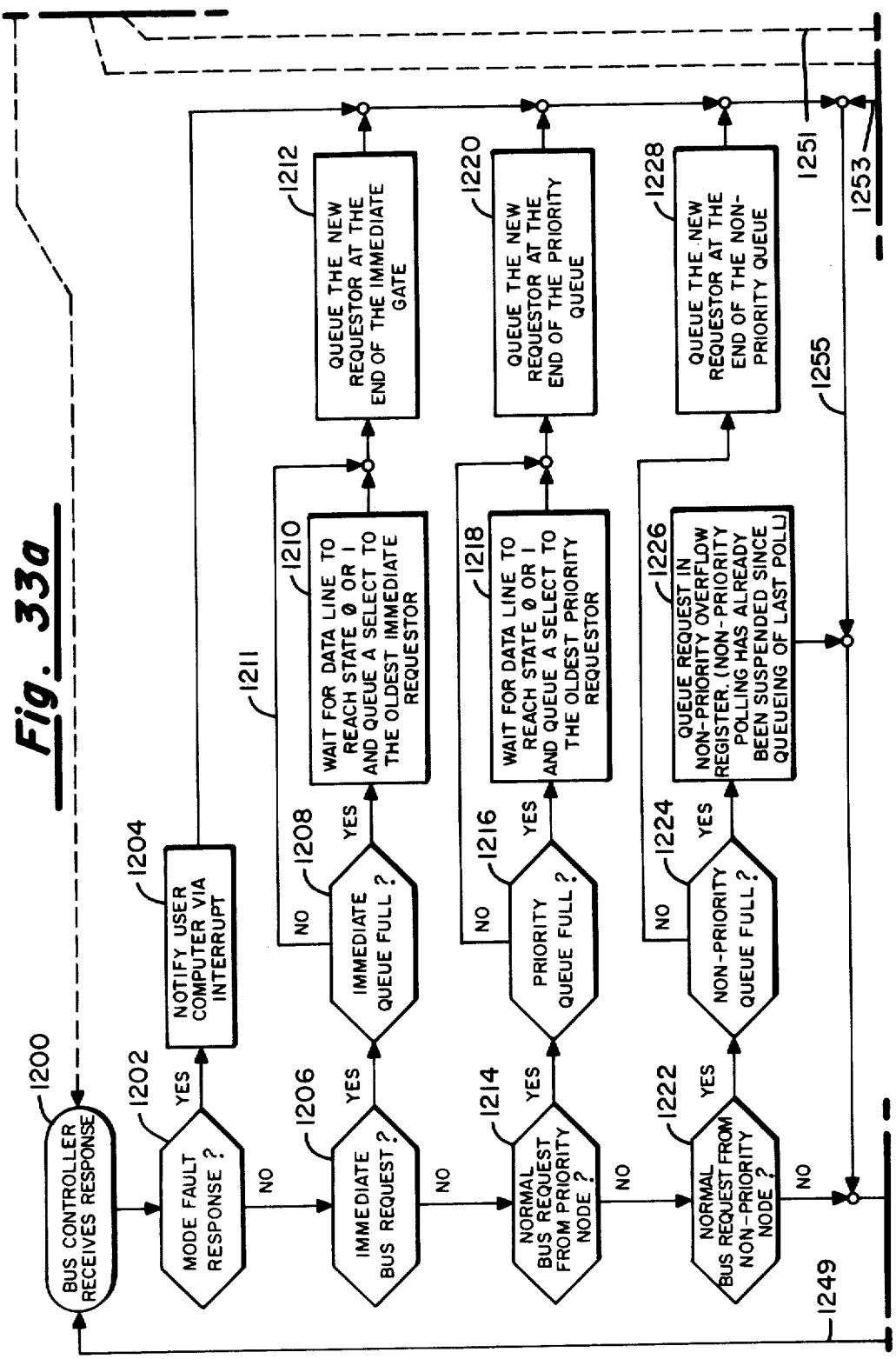
Figure 33B:
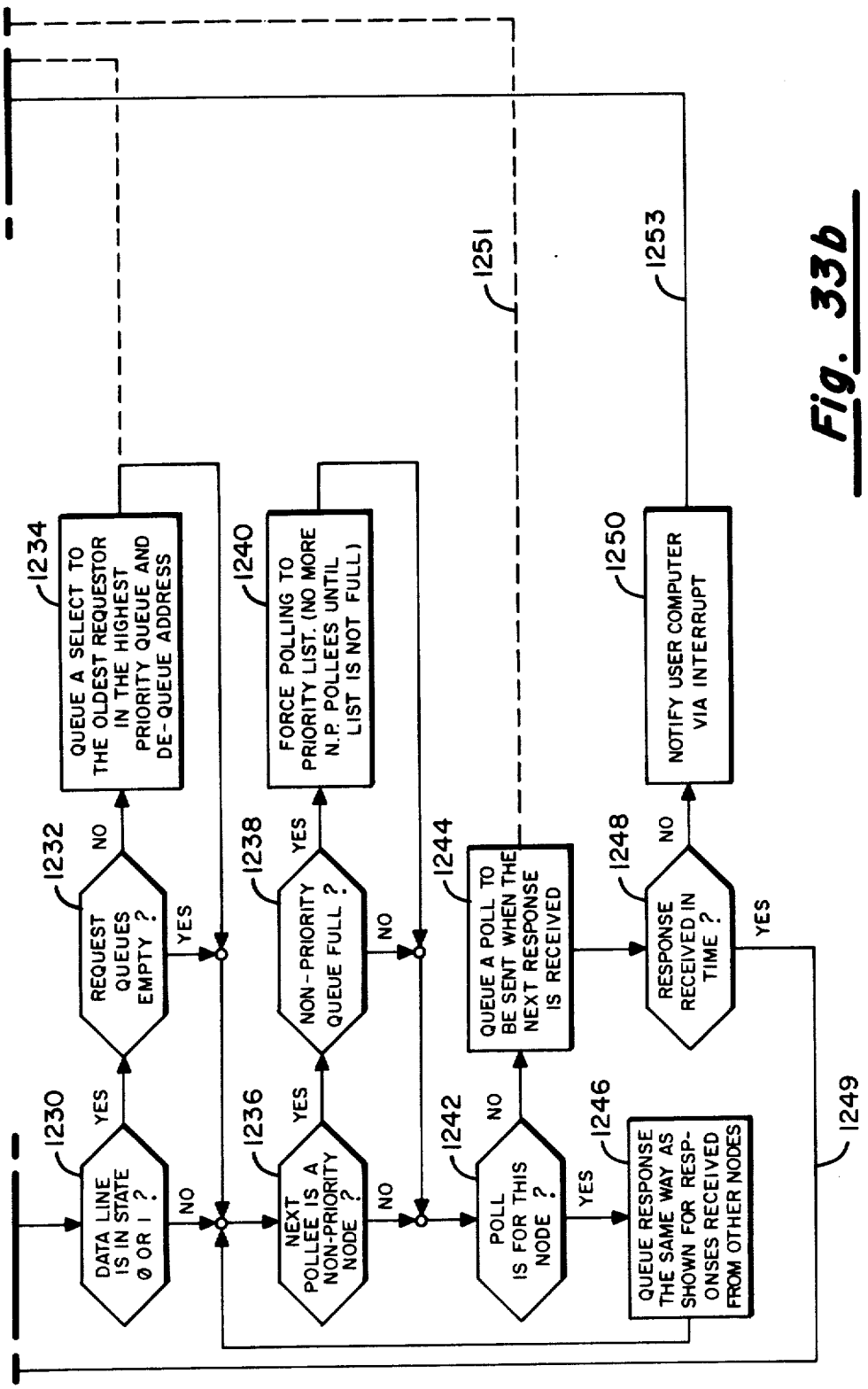
Figure 33C:
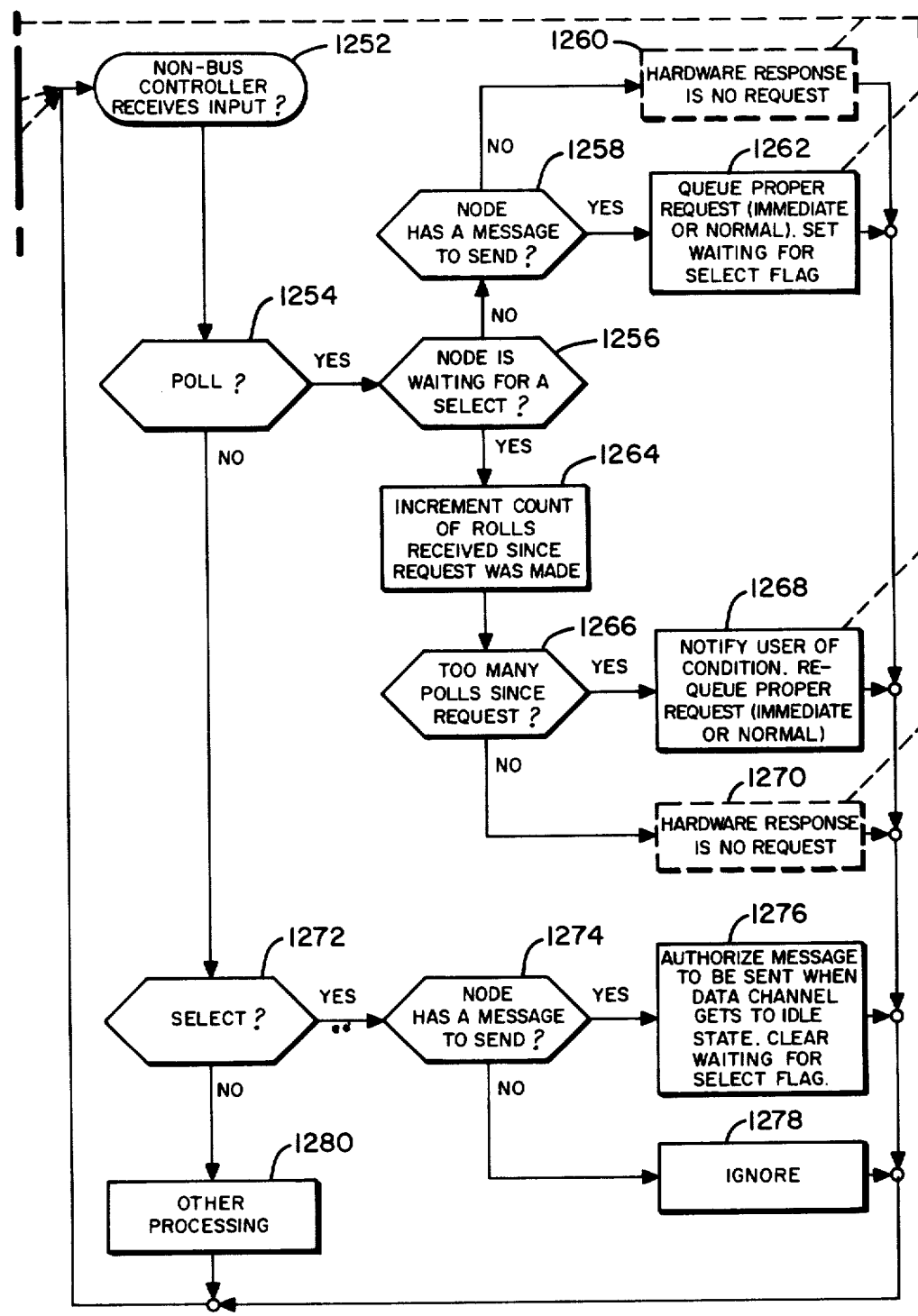

Next to be considered is the operation of the firmware associated with the so-called "Arbitration Algorithm" and in this regard, reference will be made to FIGS. 33a and 33b. Events labeled 1200 through 1250 correspond to the "Firmware Response Processing" 1114 in the flow diagram of FIG. 32 while events 1252 through 1280 correspond to the "Firmware Control Channel Processing" operation 1136. Firmware Response Processing is initiated when the Bus Controller receives a response as represented by event 1200. The Control Line Input Multiplexer/Register 628, 630 (FIGS. 15a and 15b) contains the response. It is transmitted conditionally through FIFO 636 into the Processor Control Line Input Register 676 as already described. The control word function field is propagated through latches 220 and 222 (FIG. 4) and presented to inputs A4 through A8 of Mapping PLA 224. These inputs in conjunction with other inputs, cause specific PLA output terms to be generated which, in turn, cause the firmware to branch and thus execute the required processing task as previously described. The Tables VA-VC set forth the structure of the Mapping PLA. While the decisions represented by the diamond-shaped blocks 1202, 1206, 1214 and 1222 are shown diagrammatically as sequential decisions, they are actually performed simultaneously by the Mapping PLA 224 by the generation of the appropriate output term. If a Node Fault response is received, output Term 22 (Table VB) initiates event 1204 to notify the user computer of the fault, via an interrupt. If an "Immediate Bus Request" is received, output Term 25 is generated by the Mapping PLA. Unlike the other select queues, the immediate queue is contained within the firmware. The status of the queue is determined by testing an associated firmware flag as represented by decision block 1208. If the immediate queue is full, event 1210 is initiated. The address of the node to be selected is sent via the Destination Bus 848 (FIG. 3b) to the Select Multiplexer/Register 480 in FIG. 9 and the "Select Enable" flag is set. (Reference Table I)

Referring again to the flow diagram of FIG. 33, if there is room in the immediate queue, event 1210 is bypassed as represented by line 1211 and the new request is queued at the end of the immediate queue as indicated by event 1212. This is accomplished totally within the firmware. If a normal request is received from a priority node (test 1214), Mapping PLA 224 generates its output Term 24. The status of the priority queue is tested as indicated by block 1216. This is accomplished by testing the priority queue full line which is the output of inverter 814 in FIG. 22a. (Reference Table IV) If the priority queue is full, operation 1218 is initiated to make room for the new request in the queue. The state of the data line is determined by the Data Channel State Register 267 in FIG. 5b. When the data line reaches a 0 or 1 state, the output of flip-flop 276 sets to create the "Latched Time for Select" flag (reference Table IV). Next, the oldest priority request is unloaded from the Priority Dispatch FIFO 811 and transmitted in the manner previously described. Next, the event 1220 is initated which transfers the current request from the Processor Control Line Input Multiplexer/Register 676 into the Priority Dispatch FIFO 811. If the priority queue is not full, event 1218 will be bypassed. This is the normal mode of operation in that the purpose of the dispatch queue is to eliminate any delay in the response processing while waiting for the data line to become available.

When processing a request from a non-priority node, the tests represented by blocks 1222 and 1224 perform the equivalent functions described above for tests 1214 and 1216, respectively, while events 1226 and 1228 correspond to events 1218 and 1220, respectively. All firmware response processing thus far described funnels into a further test 1230 which is accomplished by testing the condition of the Latched Time for Select flag. If this flag is set, test 1232 is performed. This is accomplished by testing the state of the Priority Queue Empty flag and the Non-priority Queue Empty flag (reference Table IV). Thus, if it is time for select and there is a request in either queue, event 1234 will be executed. The oldest Immediate Request will be unloaded from the Immediate Request Queue and transmitted as previously described. If the Immediate Request Queue is empty, the oldest priority request will be unloaded from the Priority Queue and transmitted as previously described. If the priority queue is empty, the oldest non-priority request will be transmitted. Note that on each pass through this loop only one select is generated. If it is either not time for a select or there is no request to be selected, event 1234 is skipped and the test represented by block 1236 is next performed. The Poll List is advanced by the control signal "Advance Poll List" (see Table I). This is accomplished by testing the status of the Latched Previous Polled Priority/Non-priority Indicator (reference Table IV) which is generated by the output of flip-flop 584 in FIG. 14. If this flag is not set, the test indicated by block 1238 is next performed. Test 1238 is identical to test 1224. If both tests 1236 and 1238 are passed, the polling is forced to the Priority List as indicated by block 1240. This is accomplished by the control signal, "Force Priority Poll" (Reference Table I). If either of tests 1236 or 1238 fail, event 1240 is bypassed as indicated. Test 1242 is accomplished by testing the state of the output of Comparator 588 in FIG. 14, i.e., the "Own Node Poll" flag (Reference Table IV). If this test fails, the output of the poll list then contains the address of the next node to be polled, thus effectively queuing the poll and preparing the controller such that event 1120 of FIG. 32 can be initiated without delay. This is depicted diagrammatically in FIG. 33 by the dotted line 1251 leading from event 1244 to event 1252.

Each time a poll is initiated, a timeout timer is also initiated. When the response is received, this timer is reset. If the response associated with the poll is not received in the prescribed amount of time, nominally 16 microseconds, the Poll/Response Timeout flag is set forcing the MPC into the error processing loop via the Mapping PLA. Test 1248 tests the status of this flag and if the response has not been received in time, event 1250 is executed to notify the user computer via an interrupt. As indicated by the lines 1253 and 1255, the firmware program then loops back to test 1230 to continue the select and poll process. If test 1248 passes, i.e., the response is received within the prescribed time, the firmware program loops back to event 1200 as indicated by line 1249. If there is another word to be processed in the input queue, this is loaded into the Processor Control Line Multiplexer/Register 628–630 and the next response is processed. If the input queue is empty, the firmware effectively waits at event 1200 for the next response.

If the condition for test 1242 is met, the poll is not transmitted, but instead the event represented by block 1246 is executed whereby the Bus Controller effectively responds to its own poll. This is accomplished by loading the node address of the Bus Controller into the proper Select Queue via the Destination Bus. The program then loops back to perform the test indicated by block 1236 so that the next poll can be transmitted. This completes the discussion of the firmware response processing. Next to be considered is the firmware control channel process.

Event 1252 is equivalent to event 1200, the only exception being that now the node is in the non-bus controller mode. As before, the function code of each received input is presented to the Mapping PLA 224. If the code indicates a poll corresponding to decision 1254, the Mapping PLA generates as its output Term 29, causing the program to proceed to decision block 1256. Test 1256 is accomplished by sampling the "Waiting for Select Firmware Flag" (reference Table IV). If the node is not waiting for a select, the program proceeds to decision block 1258 which is accomplished by testing the "Message" flag (reference table IV). If the flag is not set, the hardware response is a "No Request" (event 1260). Since this corresponds to the 0,1 state to which the Response Register is always reset, no action is required and, thus, the firmware processing is complete and the next time the node is polled, event 1138 (FIG. 32) can be immediately executed. If the node has a message to send, event 1262 is executed which differs from event 1260 only in that the response code is now changed to either a 1,0 or 1,1 code to queue the proper request as previously described. The "Waiting for Select Firmware Flag" is set at this time. During periods of heavy message traffic, it is possible that the node will not be selected prior to the issuance of the next poll. In this case, test 1256 causes event 1264 to be executed, which increments the count of the number of polls received since the request was made. This count is developed and tested directly in the firmware decision 1266. If the number of polls received since the request exceeds a prescribed number, event 1268 is executed to notify the user of an abnormal condition. The request is re-queued in the same manner as event 1262. If the number of polls since the last request has not exceeded the specified threshold, no action is required and, thus, the response will be a "No Request".

If the control word received by the node is a select, the Mapping PLA will generate as an output Term 30, corresponding to test 1272. The test 1274 is identical to test 1258 previously described. If the node has a message to send, event 1276 is executed which is the culminating event of the bus arbitration cycle. Event 1280 corresponds to all Mapping PLA output terms other than 29 or 30 which direct the firmware to other processing tasks as required.

SYSTEM RECONFIGURATION

System casualty and fault scenarios for a large computer network pose complex design problems. The Serial Data Bus System in which the present invention finds use has features which have been incorporated so that it is possible to re-structure the system, within a minimum time period, to recover full or reduced capability. Generally speaking, the Serial Data Bus System does not do any automatic reconfiguration independently. However, it provides the community of users with very powerful command and status information with which to detect and diagnose system problems and subsequently to effect recovery procedures to thereby eliminate or minimize the problem. The following features are considered to be important features in the overall system design:

1. Bus Controller Integrity

2. Serial Data Bus Status Information
3. Transmission System Reconfiguration Commands
4. Idle Channel Monitoring These features will be described in detail in the ensuing paragraphs.

A. BUS CONTROLLER INTEGRITY

The node serving as the Bus Controller performs the arbitration algorithm and is the access point for system configuration control. Since the Bus Controller function is so critical to system operation in structuring the preferred embodiment, the following features are implemented:
1. The Bus Controller node is the only node which may issue commands on the active control channel during system operation; and
2. The Bus Controller node will not interpret any command (excepting responses to polls and status responses) which it receives from the control channel. It does note this event, i.e., the receipt of a command, for transmission to the user as an error condition, however.

These features preclude the Bus Controller function from being erroneously deleted by false command generation on the control channel (e.g. two nodes transmitting at the same time can cause unwanted control channel commands to be generated due to the mixing of the Manchester biphase signals). The drawback in protecting the Bus Controller in this fashion is that there is apparently no way for an alternate system controller to seize the system on the active control channel. However, a convenient mechanism (Idle Channel Monitoring) has been provided to solve this problem.

B. SERIAL DATA BUS STATUS INFORMATION

Detection of problems in the Serial Data Bus elements is facilitated by interrupt status data supplied by the node. Specifically, the following discrete events are reported to the user computer:
1. Control Channel Parity and Sync Errors—these types of errors, if they occur at a high frequency, are generally caused by flaws in the transmission media (open/shorted cable, missing termination) or erroneous transmissions by another node (such as a second Bus Controller).
2. Control Channel Timeout to Poll—this error indicates that the Bus Controller is not receiving a response to a poll from a particular node. It may indicate problems in the transmission system and/or the target node.
3. Control Channel Illegal Function Code—this error indicates that the node has received a function code which is not defined or which it cannot process. This event may indicate flaws in the transmission media or erroneous transmissions by another node.
4. Data Channel Parity Errors—these errors, if they occur at a high frequency, indicate a flaw in the transmission media (open/shorted cable, missing termination).
5. Data Channel Streaming—this error indicates that a data message envelope has exceeded, by at least 3.2 microseconds (32 bits), the actual length specified for the message. If the error occurs frequently it could indicate a flaw in the transmission media (open/shorted cable, missing termination) or a flaw in a particular node.
6. Data Channel Intermessage Timeout—this error is only detectable by the node acting as the Bus Controller. It indicates the failure of a different node to begin transmitting its message on the data channel within a specified period of time (64 usecs). Depending on how often the event occurs and whether one or more nodes are involved, the error may indicate several types of problems in the transmission system or a problem in a node.

There are other error interrupts and status indications presented to the user computers from their nodes. However, the ones just mentioned form the nucleus of errors from which reconfiguration decisions are made. The power of this status data is that it allows the user computer to symptomatically diagnose problems in the Serial Data Bus system and to take appropriate measures to reconfigure around the problem(s).

C. RECONFIGURATION COMMANDS

Reconfiguration of the Serial Data Bus is controlled by the user through the Bus Controller with the following commands:
1. Disable—this command causes the node to assume an initialized state but to retain existing channel numbers, poll RAM contents, and screen RAM contents. The node will ignore all of the bus arbitration commands.
2. Start—this command causes the node to participate in the bus arbitration process by responding to polls or, in the case of the node currently serving as the Bus Controller, by initiating the first poll.
3. Assume Bus Control—this command is issued by the user to declare the node to which it is assigned to be the Bus Controller, or being the user node attached to the Bus Controller, to direct that the Bus Controller function be transferred to the node address specified in the command.
4. Channel Control Command—this command allows the user computer to perform two actions:
   (a) Declare a new control or data channel for the node to use.
   (b) Activate or deactivate the channel monitoring function for any of the system channels.
   The Bus Controller broadcasts the Channel Control command for the benefit of all users. Additionally, any time a control channel assignment is made the Bus Controller sends this command ten times at 20 microsecond intervals. This supports the Idle Channel Monitoring function of the nodes.
5. Load RAM—this command is only available at the node/user interface. It provides the user with the capability to load the Poll RAM's and the message Screen RAM.

D. CHANNEL MONITORING

All nodes perform continuous channel monitoring as a normal activity. The purpose of this monitoring function is to support system reconfiguration in cases where a main control channel fault has isolated the Bus Controller from all or part of the rest of the system. The recovery technique is to switch control channels at the Bus Controller node (via a command from the user to the node), at which time that node broadcasts the command 10 times spaced 20 microseconds apart. Other nodes in the system are designed to have a rigid sequence of steps that must be satisfied in order to change channels. The timing, event counting, and signal decoding approach utilized eliminates the possibility of noisy cables causing unwanted channel changes and yet provides the necessary reconfiguration method which is required to ensure system recovery from a faulty bus channel.

Channel monitoring initially consists of examining the envelope on all channels (other than the current control channel) to see if it conforms approximately to the timing for a control line signal, e.g., 1.4–1.9 microseconds in width. If it does, a flag is set for that channel which indicates the event has occurred. The node performs an AND function of these activity indicators with a bit mask. The bits in this mask are controlled by the Channel Control Command; a binary one signal signifying the channel is activated for monitoring, and a binary zero signal signifying the channel is not to be monitored.

Because the firmware operation is dependent on the condition of its node prior to a reconfiguration, the description is divided into appropriate categories. With reference to the channel monitoring flowchart of FIG. 34, the following operations are of interest:

1. Master Clear (Block 1302) (including power-on condition)

A Master Clear ultimately causes the firmware to load the Mask Register with all ones (all cables monitored) as indicated by block 1308. If the rest of the system is active (one cable already has control activity), the hardware detects this and informs the firmware. This operation is indicated by block 1314 in FIG. 34. The firmware determines the cable number and also clears the monitor latches. After two more detections on that cable, the firmware clears that bit in the mask register and assigns that cable as the active control cable. No further monitoring of the activity detector of that channel is necessary nor desired. Further operation related to that cable is simply receiving control frames and sending response frames.

If all nodes are master clearing or powering up, each enables all cable monitoring devices and once the Bus Controller node has been designated at the system level, the Control Cable is also assigned and will be locked onto by the other nodes in the system.

2. Reconfiguration

A. Bus Controller Assigned to Reconfigure System on a Different Control Cable

The Bus Controller switches control cables and broadcasts ten Channel Control commands, one every 20 microseconds, to the other nodes.

B. Non-Bus Controller Nodes

A non-bus controller node will detect the control activity on the new cable (assuming the Mask Register allows it). See Block 1314. The firmware must note three detections and the detections must occur within a 320 microsecond period. See operation block 1316 and decision blocks 1318, 1320. This condition is a method used by the firmware to decide if the detections were caused by the substantial noise or a faulty cable. If the threshold condition is met, then the firmware temporarily abandons the control cable it had previously considered as active and it changes the I/O vectoring so that the control frames on the new cable can be interpreted. The firmware then requires that two cable change commands be received on this new cable in no more than 256 microseconds. See the operations represented by blocks 1326, 1328, 1330 in FIG. 34. If this requirement is not met, the firmware will clear that cable's "Monitor Enable" bit in the Mask Register, disabling further monitoring of that cable (block 1332). The net result is that the cable has been determined to be faulty and it will no longer be capable of distracting the node, so-to-speak.

The firmware then reverts back to the "abandoned" active control cable. If the above requirement is met, however, the firmware formally switches the active control cables by modifying the Mask Register to disable monitoring of the new cable and to re-enable monitoring of the old cable all as represented or indicated by operation block 1334.

C. Bus Controller Previous to Reconfiguration

Reference is made to 2. A. above if the Bus Controller that had been controlling the bus prior to reconfiguration is to continue as the Bus Controller following the switching of the Control Cables. However, if the previous Bus Controller detects control activity on a new cable, it follows the same procedure as the non-bus controller nodes (see paragraph 2. B. above) except that it also deletes the Bus Controller function since another Bus Controller initiated the reconfiguration process.

SUMMARY

Thus it can be seen that there has been shown and described a serial data bus system wherein communications within the system are accomplished by assigning control of the bus to one of a plurality of nodes, which then controls transmission of messages on a Data Cable within the bus. Contention between bus users is resolved by selectively polling the users and then granting bus access to the highest priority user desiring to utilize the bus for message transmission purposes. Addressing within the data bus system uses both physical and logical addresses, with each node having a manually selectable address register.

As mentioned, in the system of the preferred embodiment, one of the nodes in the data bus system has the responsibility as being the Bus Controller, although the particular node designated as the Bus Controller may be reassigned. Users with time-critical communication requirements are polled more frequently by the Bus Controller than other non-priority users. A polling algorithm is implemented through software so that the priority structure can be readily modified to adapt to any application.

When a node is polled, a response is transmitted to the Bus Controller indicating the needs of the node being polled and also its current status. In this manner, a problem on the serial bus can be detected within the time required for one full system poll cycle.

Further in accordance with the present invention, poll commands, responses, and other types of system commands are transmitted on the control cable of the bus. The Data Cable is reserved for data messages only. Traffic on both cables is asynchronous, enabling polling and queuing of users concurrently with data messages being transmitted on the cable.

Data bus system users communicate by transferring variable length messages. A set of commands and interrupts are utilized for communications between the users and the data bus system. External Function (EF) commands are originated by the user and External Interrupts (EI) are generated by the devices on the bus system. The manner in which digital devices may communicate using EF and EI signals is set out in the Burkholder et al U.S. Pat. No. 3,251,040 and reference may be made thereto by those desiring further information concerning this communication protocol.

The poll cycle consists of command (poll and select) and response messages sent on the Control Cable and information messages sent on the Data Cable of the then active ones of the data bus lines. The information messages may vary in length and may contain up to 127 32-bit words. As mentioned, bus control is accomplished by the exchange of command and response words and each complete data message transmitted contains 32-bits of control data. These 32-bits of control data represent the overhead of the system and in the design thereof, a conscientious effort is made to minimize the overhead in order to obtain high data throughput.

As was further set out in complete detail above, the serial data bus of the present invention employs multiple nodes, each capable of performing the bus control function when appropriately selected to do so as well as the data transmission function. Only one node at a time performs the bus control function during a given time interval. Bus control responsibility is transferable automatically in the event of a casualty situation by software control. The Bus Controller node controls the use of the data channel by using a polling and assigning technique on a control channel. As has been set out, polling consisting of the Bus Controller making inquiry of the nodes in a preselected sequence, evaluating the node's response, and assigning individual node usage of the data channel in a preselected priority arrangement. The polling and assigning is accomplished automatically and in parallel with the transmission of information on the data channel. In the preferred embodiment, a two level priority capablity has been described and serves to (1) assign the data channel to nodes based on node priority and (2) provide all nodes the capability of transmitting high priority messages in advance of a higher priority node. Further, the serial data bus of the present invention allows the queuing of bus requests to assure that no requests are lost by the Bus Controller while performing the polling sequence.

Thus there has been described the preferred embodiment of the present invention and the best mode contemplated for practicing the invention. Those skilled in the art will readily discern from the accompanying drawings and the explanation set forth herein how various changes and modifications may be made to the overall structure. Hence, it is intended that the true spirit and scope of the invention be determined from the accompanying claims.

What is claimed is:

1. In a serial data bus transmission system of the type used to interconnect a plurality of user devices for message intercommunication over transmission cables, said system including a plurality of cables, one of which acts as an active control cable and one of which acts as an active message cable at a given time, with at least one bus access module coupled to each of said plurality of cables, a plurality of node devices for coupling said user devices to said bus access modules, each of said node devices comprising in combination:
   (a) bus input/output means including data format conversion means coupled to said bus access modules for selecting said active ones of said control cable and said message cable and for transmitting or receiving digital messages and control signals therethrough;
   (b) a control bus coupled to said bus input/output means;
   (c) a message bus coupled to said bus input/output means;
   (d) control line sequencer means coupled to said control bus for receiving control signals therefrom and including logic means for performing preprocessing functions relative to said control signals for determining whether said control signals are intended to affect that node device and are of a proper format;
   (e) controller means adapted to receive preprocessed data signals from said control line sequencer and to develop command signals in accordance with said preprocessed data signals, and further status indicators;
   (f) means including said control bus and said bus input/output means for sending said command signals on said active control cables to other of said plurality of nodes coupled to said active control cable; and
   (g) means responsive to said command signals for controlling the flow of messages over said message bus and between said plurality of user devices.

2. Apparatus as in claim 1 wherein said data format conversion means comprises a serial-to-parallel and a parallel-to-serial converter coupled between said bus access module and said control bus or said message bus.

3. The system as in claim 1 wherein each of said nodes further includes:
   (a) a storage unit associated with said controller means, a source bus coupling plural register means to said controller storage unit, a destination bus coupling said controller storage unit to further plural storage means associated with said control bus, and a user connection, said user connection being coupled to receive control and message words from a user device;
   (b) means coupling said user connection to said source bus; and
   (c) means coupling said message bus to said user connection for two-way data transmission therebetween.

4. The serial data bus transmission system of claim 3 wherein said controller means comprises a microprogrammable controller.

5. The serial data bus transmission system of claim 3 wherein said user connection comprises a user bus.

6. Apparatus as in claim 1 wherein said bus input/output means includes:
   (a) multiplexer means coupled between said control bus and message bus and said plurality of cables;
   (b) an active bus number register having an input and an output, said output being connected to said multiplexer means; and
   (c) means coupling said controller means to said input of said active bus number register whereby said active control and message cables are definable by digital data originated by said controller means.

7. The serial data bus transmission system of claim 6 wherein said controller means comprises a microprogrammable controller.

8. Apparatus as in claim 6 and further including means in said node for causing new information to be loaded from said controller means into said active bus number register upon detection of a fault on the one of said plurality of cables previously acting as said control cable or said message cable, such that a different one of said plurality of cables is substituted for the one on which the fault was detected.

9. Apparatus as in claim 8 wherein said bus input/output means further includes:
   (a) activity monitoring means coupled to each of said plurality of cables for detecting the time relationships of signal patterns detected on said plurality of cables and thereby determining whether a cable is carrying control or message type information;

(b) means in said activity monitoring means for developing a control flag indicative of control type activity;

(c) masking means connected to receive said control flag and further control signals from said controller means for selectively causing one or more of said control flags to be ignored; and (d) means coupling the output of said masking means to said controller means for causing it to enter a new word into said active bus number register.

10. The serial bus transmission system of claim 9 wherein said controller means comprises a microprogrammable controller.

11. The serial data bus transmission system of claim 8 wherein said controller means comprises a microprogrammable controller.

12. Apparatus as in claim 1 wherein said control line sequencer comprises:

(a) register means connected to said control bus for at least temporarily storing control words carried by said control bus and applying said control words to said logic means; and (b) buffer means coupled to the output of said logic means for receiving and at least temporarily holding one or more logic output control codes from said logic means and for transmitting said logic control codes sequentially to said control bus or to said controller means.

13. Apparatus as in claim 12 wherein the sequential transmission of said logic control codes is controlled by said controller means.

14. The serial data bus transmission system of claim 12 wherein said logic output control codes are stored in said logic array.

15. The serial data bus transmission system of claim 14 wherein said logic output control codes are stored in said logic means.

16. The serial data bus transmission system as in claim 1 wherein one of said plurality of nodes is a bus controller node and wherein said command signals from said bus controller node include poll and select commands directed to other nodes in said system.

17. Apparatus as in claim 16 and further including a first list and a second list in said bus controller node, each of said lists connected for control by said controller means and storing the address of all predetermined nodes in the system with the address of those nodes having a priority stored in said first list and with the addresses of those nodes having no priority stored in said second list; means for sequentially applying poll commands to those nodes pointed to by the address in said first list; and means for subsequently sequentially applying poll commands to those nodes pointed to by the addresses in said second list.

18. The apparatus as in claim 17 and further including sub-cycle counter means adapted to receive an initial value from said controller means; means for incrementing said sub-cycle counter at a fixed rate in synchronism with the addressing of said second list; comparator means for detecting when the count in said sub-cycle counter reaches a predetermined limit; and means coupled to said comparator means to reinitiate addressing of said first list upon the generation of an output by said comparator means.

19. The apparatus as in claim 17 wherein at least one of said first and second lists comprises a register stack.

20. Apparatus as in claim 16 and responsive to the receipt of a poll command signal from said bus controller node for initiating the return of a predetermined response control word over said control cable to said bus controller node.

21. Apparatus as in claim 20 and further including means in said bus controller node for sensing the time delay between the sending of a poll command by said bus controller and the subsequent receipt of said response control code by said bus controller; and means for signaling the particular user device associated with said bus controller node when said sensing means indicates a time delay greater than a predetermined value.

22. Apparatus as in claim 21 and further including:

(a) a control line input queue device coupled to said control bus for storing the node addresses of those node devices responding to a poll control word from said bus controller node;

(b) a select queue device connected to said control line input queue device and controlled by said control line sequencer for applying select codes to said control cable; and (c) means responsive to the receipt of a select control code by an addressed node for entering or receiving data messages from said active message cable by way of said bus input/output means.

23. Apparatus as in claim 22 wherein said last-mentioned means operates simultaneously with transmission of said poll control words, said response control codes and said select control codes on said active one of said control cables.

24. The serial data bus transmission system of claim 1 wherein said logic means comprises a programmable logic array.

25. Apparatus for coupling a plurality of digital data processing and handling user devices through a communications bus, certain of said user devices having a first priority status and other of said user devices being of a non-priority status, such that said user devices may communicate on a non-contentious basis, comprising in combination:

(a) a plurality of node devices associated with said user devices, one of which being assigned bus controller responsibility, said bus controller node device having means for issuing polling control words to said plurality of node devices over control lines contained in said communication bus on a predetermined frequency basis, the nodes associated with said user devices having priority status receiving polling control words more frequently than said node devices associated with user devices having non-priority status;

(b) priority response queuing means and non-priority response queuing means in said bus controller node device, said priority and non-priority queuing means adapted to store response-type control words return from said plurality of node devices in response to the receipt of said poll control words from said bus controller node;

(c) control means for said queuing means for generating select control words for transmission from said bus controller node to selected ones of said node devices previously sending predetermined response control words to said bus controller node, said select means honoring node devices associated with said priority users in preference to said node devices associated with non-priority users; and (d) means including data lines contained in said communications bus for transmitting messages of predetermined differing lengths from said priority and non-priority node devices in response to its receipt of said select control words from said bus controller.

* * * * *